United States Patent
Kumashiro

(10) Patent No.: US 6,240,395 B1
(45) Date of Patent: May 29, 2001

(54) DEVICE AND METHOD FOR PROJECT MANAGEMENT

(75) Inventor: Jyunji Kumashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/208,472

(22) Filed: Dec. 10, 1998

Related U.S. Application Data

(62) Division of application No. 08/499,683, filed on Jul. 7, 1995, now Pat. No. 5,974,391.

(30) Foreign Application Priority Data

| Jul. 12, 1994 | (JP) | 6-159861 |
| Jul. 12, 1994 | (JP) | 6-159862 |
| Jul. 12, 1994 | (JP) | 6-159863 |
| Jul. 12, 1994 | (JP) | 6-159864 |
| Jul. 12, 1994 | (JP) | 6-159865 |

(51) Int. Cl.⁷ ........................... G06F 17/60
(52) U.S. Cl. ............................ 705/7; 705/11
(58) Field of Search ............. 345/433, 435, 345/440; 705/7, 8, 9, 11; 707/1, 10, 100, 104, 200, 201, 202, 203, 500, 511

(56) References Cited

U.S. PATENT DOCUMENTS

| 3,862,615 | | 1/1975 | Liou | 116/135 |
| 4,525,780 | * | 6/1985 | Bratt et al. | 711/163 |
| 4,586,125 | | 4/1986 | Takagawa | 364/176 |
| 5,101,340 | | 3/1992 | Nonaka et al. | 364/200 |
| 5,208,765 | * | 5/1993 | Turnbull | 702/84 |
| 5,216,593 | | 6/1993 | Dietrich et al. | 364/402 |
| 5,233,513 | * | 8/1993 | Doyle | 705/7 |
| 5,247,438 | | 9/1993 | Subas et al. | 364/419 |
| 5,414,809 | | 5/1995 | Hogan et al. | 395/155 |
| 5,490,097 | | 2/1996 | Swenson et al. | 364/578 |
| 5,548,506 | | 8/1996 | Srinivasan | 364/401 R |
| 5,659,768 | | 8/1997 | Forbes et al. | 395/779 |
| 5,749,080 | * | 5/1998 | Matsumoto et al. | 707/100 |
| 5,809,512 | * | 9/1998 | Kato | 707/502 |
| 5,818,715 | * | 10/1998 | Marshall et al. | 364/402 |
| 5,862,223 | * | 1/1999 | Walker et al. | 705/50 |
| 5,870,733 | * | 2/1999 | Bass et al. | 707/2 |
| 5,914,919 | * | 6/1999 | Fosler et al. | 369/34 |
| 5,918,222 | * | 6/1999 | Fukui et al. | 707/1 |
| 5,974,391 | * | 10/1999 | Hongawa | 705/7 |

FOREIGN PATENT DOCUMENTS

| 57-141714 | | 9/1982 | (JP) . |
| 62-160565 | * | 7/1987 | (JP) . |
| 2-127765 | | 5/1990 | (JP) . |
| 8-235002 | * | 9/1996 | (JP) . |

OTHER PUBLICATIONS

Bunning: "Action learning: Developing managers with bottom–line pay–back"; Executive Development, 1994, v7, n4, pp. 3–6.*

Heck, Mike; "Microsoft Project 3.0", MacWorld, vol. 10, No. 1, Jan. 1993.*

McDonald, Donald F., Jr., "Software Review—Texim v1.1", Cost Engineering, vol. 34, No. 4, Apr. 1992.*

Picard, Michele; "Working Under An Electronic Thumb", Training, vol. 31, No. 2, Feb. 1994.*

Pfleeger, Shari; "Software Engineering The Production of Quality Software", 2nd Edition, MacMillian Publishing Company, New York, 1991, pp. 42–50 & 90–97.*

* cited by examiner

*Primary Examiner*—Edward R. Cosimano
(74) *Attorney, Agent, or Firm*—Staas & Halsey LLP

(57) ABSTRACT

A device generating a Gantt chart, made up of at least on schedule bar, includes, a display showing the Gantt chart, an input unit receiving an input to point at a position on the display, a Gantt-chart-generation processing unit generating a schedule bar having a start point and an end point by setting the start point at a first position indicated by the input unit and setting the end point at a second position indicated by the input unit, and a work-step-division processing unit dividing the schedule bar into a plurality of work steps at a plurality of third positions indicated by the input unit.

15 Claims, 71 Drawing Sheets

| | |
|---|---|
| (a) | 12/21    2/13    3/31    5/11  6/10  7/11  8/11<br>\| A \| B \| C \| D \| E \| F \| |
| (b) | 2/21    4/16    6/1    7/12  8/11  9/11  10/12<br>\| A \| B \| C \| D \| E \| F \| |
| (c) | 1/21    2/21    4/8    5/19  6/18  7/19  8/19<br>\| A \| B \| C \| D \| E \| F \| |
| (d) | 1/21          4/16    6/1    7/12  8/11  9/11  10/12<br>\| A \| B \| C \| D \| E \| F \| |
| (e) | 1/21    2/21    4/8    5/19  6/18  7/19  8/19<br>\| A \| B \| C \| D \| E \| F \| |
| (f) | 1/21    3/15    4/16    6/1    7/12  8/11  9/11  10/12<br>\| A \| \| B \| C \| D \| E \| F \| |
| (g) | 1/21    3/16  4/8    5/19  6/18  7/19  8/19<br>\| A \| B \| C \| D \| E \| F \| |
| (h) | 1/21    3/16          6/1    7/12  8/11  9/11  10/12<br>\| A \| B \| C \| D \| E \| F \| |
| (i) | 1/21    3/16    5/1    6/11  7/11  8/1  9/1<br>\| A \| B \| C \| D \| E \| F \| |
| (j) | 1/21    3/16    5/1    6/11  7/11  8/1           9/11 10/12<br>\| A \| B \| C \| D \| E \|                    \| F \| |
| (k) | 1/21    3/16    5/1    6/11  7/11  8/11 8/31<br>\| A \| B \| C \| D \| E \| F \| |
| (l) | 1/21    3/16    5/1    6/11  7/11  8/11            10/12<br>\| A \| B \| C \| D \| E \| F \| |

FIG.15A

| 1/21 | 3/16 | 5/1 | 6/11 | 7/11 | 8/11 | 9/11 |
|---|---|---|---|---|---|---|
| A | B | C | D | E | F | |

FIG.15B

| | | | | | | | |
|---|---|---|---|---|---|---|---|
| (m) | 12/21 | 3/16 | 5/1 | 6/11 | 7/11 | 8/11 | 9/11 |
| | A | B | C | D | E | F | |
| (n) | 2/21 3/16 | 5/1 | 6/11 | 7/11 | 8/11 | 9/11 | |
| | A | B | C | D | E | F | |
| (o) | 1/21 2/28 3/16 | 5/1 | 6/11 | 7/11 | 8/11 | 9/11 | |
| | A | B | C | D | E | F | |
| (p) | 1/21 | 4/1 5/1 | 6/11 | 7/11 | 8/11 | 9/11 | |
| | A | B | C | D | E | F | |
| (q) | 1/21 | 2/26 | 5/1 | 6/11 | 7/11 | 8/11 | 9/11 |
| | A | B | C | D | E | F | |
| (r) | 1/21 | 3/16 4/1 5/1 | 6/11 | 7/11 | 8/11 | 9/11 | |
| | A | B | C | D | E | F | |
| (s) | 1/21 | 3/16 4/18 5/1 | 6/11 | 7/11 | 8/11 | 9/11 | |
| | A | B | C | D | E | F | |
| (t) | 1/21 | 3/16 | 5/15 6/11 | 7/11 | 8/11 | 9/11 | |
| | A | B | C | D | E | F | |
| (u) | 1/21 | 3/16 | 5/1 | 6/11 | 7/11 7/25 | 9/11 | |
| | A | B | C | D | E | F | |
| (v) | 1/21 | 3/16 | 5/1 | 6/11 | 7/11 | 8/11 9/1 9/11 | |
| | A | B | C | D | E | F | |
| (w) | 1/21 | 3/16 | 5/1 | 6/11 | 7/11 | 8/11 9/1 | |
| | A | B | C | D | E | F | |
| (x) | 1/21 | 3/16 | 5/1 | 6/11 | 7/11 | 8/11 | 10/12 |
| | A | B | C | D | E | F | |

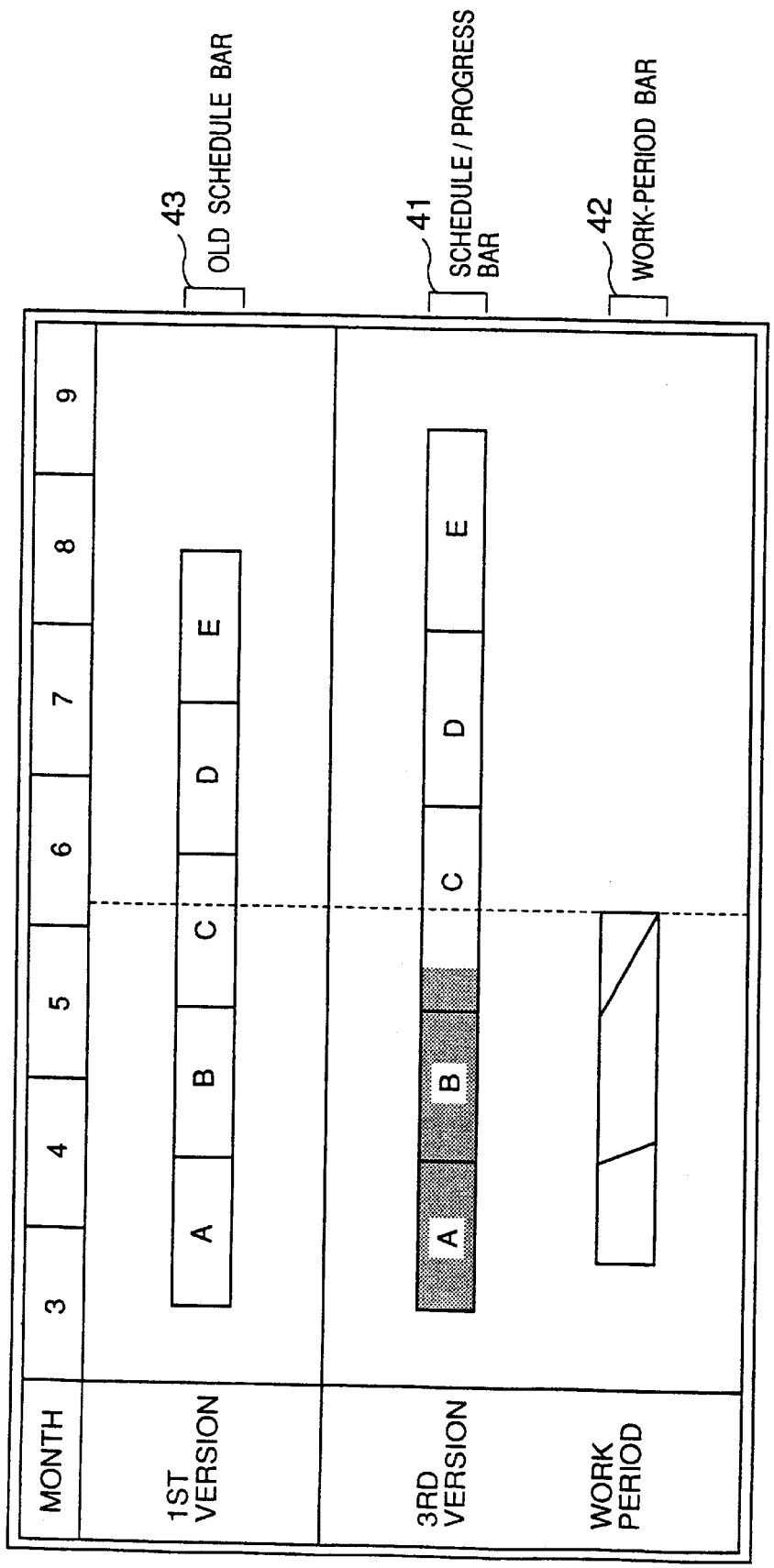

FIG. 26A

32 WORK-SCHEDULE TABLE

| WORK-STEP NAME | STARTING DATE AND FINISHING DATE | | STARTING-HORIZONTAL COORDINATE AND END-HORIZONTAL COORDINATE | | PROGRESS RATE | STARTING-HORIZONTAL-COORDINATE AND END-HORIZONTAL-COORDINATE OF PROGRESS | |
|---|---|---|---|---|---|---|---|
| A | 1994. 3.16 | 1994. 4.15 | 50 | 150 | 1.0 | 50 | 150 |
| B | 1994. 4.16 | 1994. 5.15 | 150 | 250 | 1.0 | 150 | 250 |
| C | 1994. 5.16 | 1994. 6.15 | 250 | 350 | 0.2 | 250 | 270 |
| ... | ... | ... | ... | ... | ... | ... | ... |
| E | 1994. 8. 1 | 1994. 9.15 | 500 | 650 | 0 | 0 | 0 |

$(40+20)/(40+20) = 1.0$ $100/100 = 1.0$ $(10+0)/(30+20) = 0.2$

31 WORK TABLE

| WORK-STEP NAME | TASK NAME | SCHEDULE | PROGRESS |
|---|---|---|---|
| A | a1 | 40 | 40 |
| A | a2 | 20 | 20 |
| B | b1 | 100 | 100 |
| C | c1 | 30 | 10 |
| C | c2 | 20 | 0 |
| D | d1 | 30 | 0 |
| ... | ... | ... | ... |
| E | e2 | 50 | 0 |

FIG.30A
| WORK STEP NAME | STARTING DATE | FINISHING DATE |
|---|---|---|
| A | 1994. 2.17 | 1994. 4.3 |
| B | 1994. 3.25 | 1994. 5.5 |
| C | 1994. 4.15 | 1994. 5.10 |
~33
FIG.30B
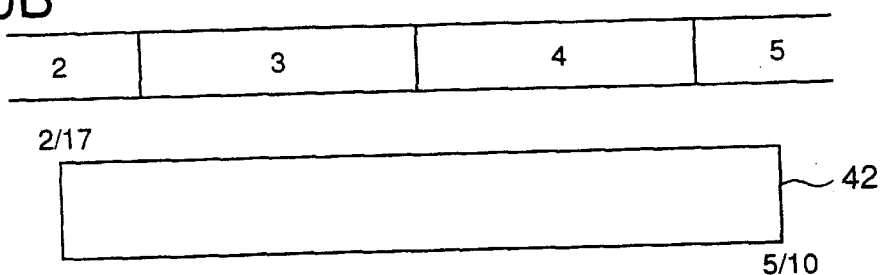
FIG.30C
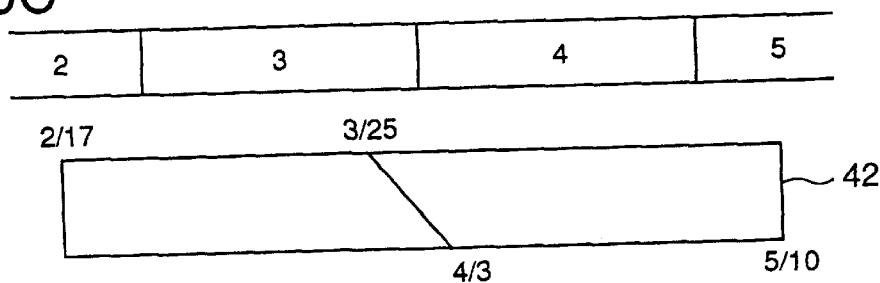
FIG.30D
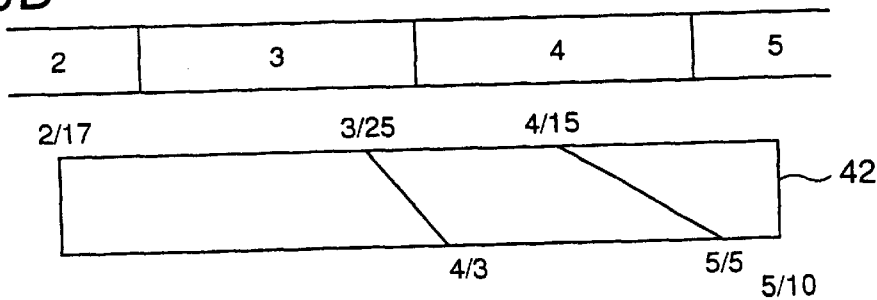

FIG. 31
3 2 WORK-SCHEDULE TABLE
| WORK STEP | STARTING DATE | FINISHING DATE |
|---|---|---|
| A | 1994. 2.10 | 1994. 3.31 |
| B | 1994. 4. 1 | 1994. 5.15 |
| C | 1994. 5.16 | <u>1994. 6.20</u> |
(1)
(A)
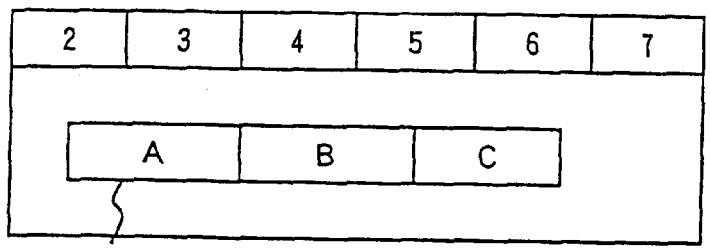
40
3 4 VERSION-INFORMATION TABLE
| VERSION NUMBER | WORK STEP | FLAG | MODIFIED INFORMATION |
|---|---|---|---|
| 1 | C | E | 1994. 6.20 |
(4)
(2)
(B)
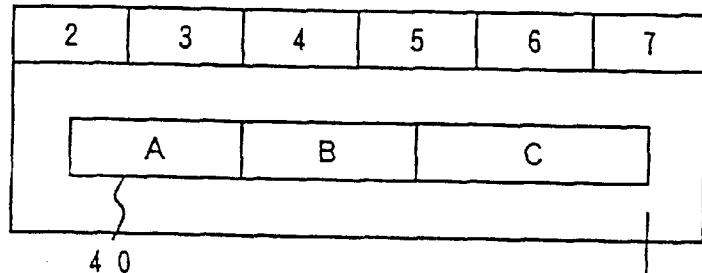
40
(3)
3 2' WORK-SCHEDULE TABLE
| WORK STEP | STARTING DATE | FINISHING DATE |
|---|---|---|
| A | 1994. 2.10 | 1994. 3.31 |
| B | 1994. 4. 1 | 1994. 5.15 |
| C | 1994. 5.16 | <u>1994. 7.15</u> |

FIG. 33

32 WORK-SCHEDULE TABLE

| WORK STEP | STARTING DATE | FINISHING DATE |
|---|---|---|
| A | 1994. 2.10 | 1994. 3.31 |
| B | 1994. 4. 1 | 1994. 5.15 |
| ⋮ | ⋮ | ⋮ |
| N | YYYY.MM.DD | YYYY.MM.DD |

34 VERSION-INFORMATION TABLE

| VERSION NUMBER | WORK STEP | FLAG | MODIFIED INFORMATION |
|---|---|---|---|
| 1 | C | E | 1994. 6.20 |
| 2 | B | S | 1994. 4.10 |
| ⋮ | ⋮ | ⋮ | ⋮ |
| n | N | E | YYYY.MM.DD |

POINTER $P_1$

MODIFICATION

COMPARISON

32' NEW WORK-SCHEDULE TABLE

| WORK STEP | STARTING DATE | FINISHING DATE |
|---|---|---|
| A | 1994. 2.10 | 1994. 3.31 |
| B | 1994. 4. 1 | 1994. 5.15 |
| ⋮ | ⋮ | ⋮ |
| N | YYYY.MM.DD | YYYY.MM.DD |

COUNTER $C_2$

FIG. 36

3 2 WORK-SCHEDULE TABLE

| WORK STEP | STARTING DATE | FINISHING DATE |
|---|---|---|
| A | 1994. 2. 10 | 1994. 3. 31 |
| B | 1994. 4. 1 | 1994. 5. 15 |
| ⋮ | ⋮ | ⋮ |
| N | YYYY. MM. DD | YYYY. MM. DD |

3 4 VERSION-INFORMATION TABLE

| VERSION NUMBER | WORK STEP | FLAG | MODIFIED INFORMATION |
|---|---|---|---|
| 1 | C | E | 1994. 6. 20 |
| 2 | B | S | 1994. 4. 10 |
| ⋮ | ⋮ | ⋮ | ⋮ |
| n | N | E | YYYY. MM. DD |

COMPARISON — POINTER $P_2$

COUNTER $C_3$

3 5 VERSION-SCHEDULE TABLE

| WORK STEP | STARTING DATE | FINISHING DATE |
|---|---|---|
| A | 1994. 2. 10 | 1994. 3. 31 |
| B | 1994. 4. 1 | 1994. 5. 15 |
| ⋮ | ⋮ | ⋮ |
| N | YYYY. MM. DD | YYYY. MM. DD |

COUNTER $C_4$

COMPARISON

SUBSTITUTING

FIG. 39A
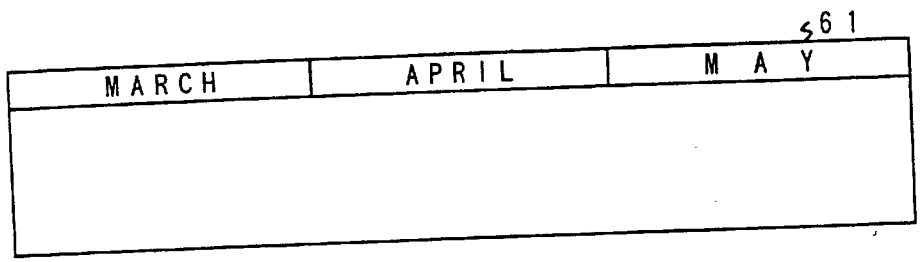
FIG. 39B
| 4/1 | APRIL FOOL'S DAY |
| 3/10 | ORDINARY DAY |
| 5/4 | HOLIDAY OF CITIZEN |
| 4/29 | GREEN DAY |
| 5/5 | CHILDREN'S DAY |
FIG. 39C
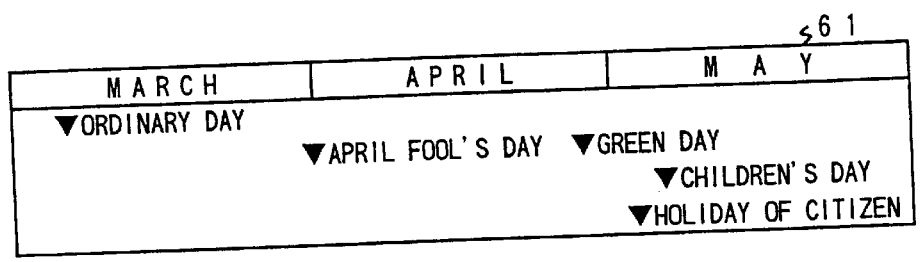
FIG. 39D
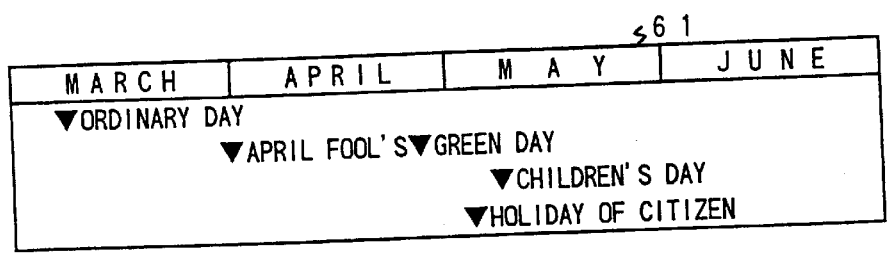
FIG. 39E
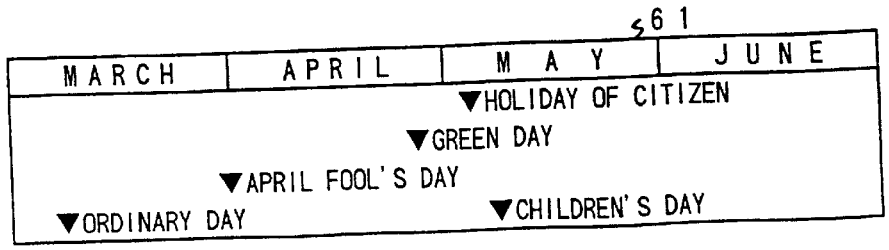

FIG. 41A

| DATE | CHARACTER INFORMATION |
|------|-----------------------|
| 3/10 | DELIVERY OF ORDERED IBM COMPUTER |

FIG. 41B

| MARCH | APRIL | M A Y ₆₁ | J U N E |
|-------|-------|----------|---------|

▼HOLIDAY OF CITIZEN
▼GREEN DAY
▼APRIL FOOL'S DAY
▼DELIVERY OF ORDERED IBM  ▼CHILDREN'S DAY

FIG. 41C

| MARCH | APRIL | M A Y ₆₁ | J U N E |
|-------|-------|----------|---------|

▼HOLIDAY OF CITIZEN
▼GREEN DAY
▼APRIL FOOL'S DAY  ▼CHILDREN'S DAY
▼DELIVERY OF ORDERED IBM COMPUTER

F I G. 4 2
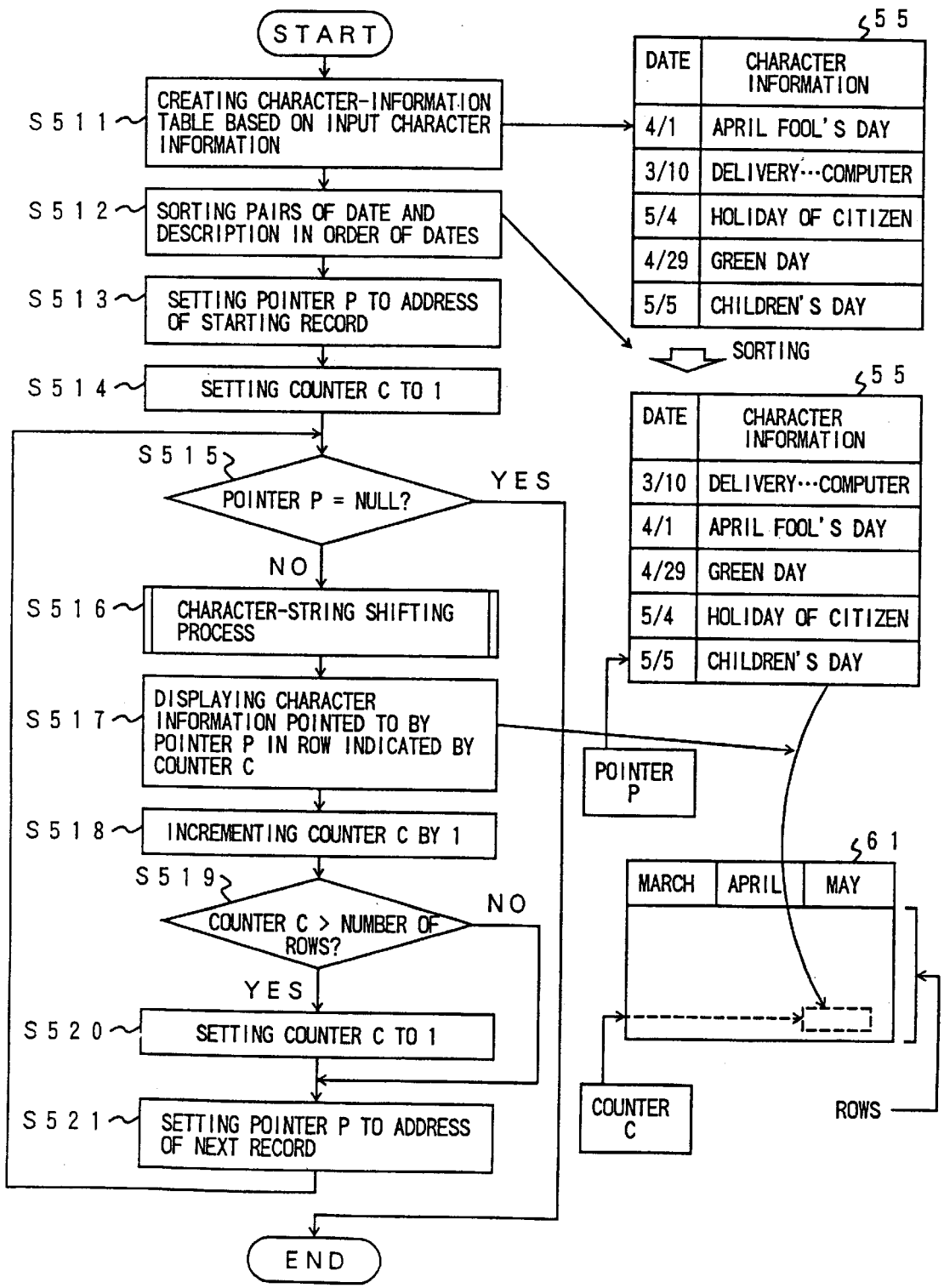

FIG. 44A

| DATE | CHARACTER INFORMATION |
|---|---|
| 3/10 | DELIVERY OF ORDERED IBM COMPUTER |

FIG. 44B

| MARCH | APRIL | MAY | JUNE |
|---|---|---|---|

▼HOLIDAY OF CITIZEN
▼GREEN DAY
▼APRIL FOOL'S DAY
▼DELIVERY OF ORDERED IBM  ▼CHILDREN'S DAY

FOUR ROWS FOR DISPLAY

FIG. 44C

| MARCH | APRIL | MAY | JUNE |
|---|---|---|---|

▼CHILDREN'S DAY
▼HOLIDAY OF CITIZEN
▼GREEN DAY
▼APRIL FOOL'S DAY
▼DELIVERY OF ORDERED IBM COMPUTER

FIVE ROWS FOR DISPLAY

FIG. 52B

| REVIEW | WORK STEP 1 | WORK STEP 2 | ... | WORK STEP 6 |
|---|---|---|---|---|
| TIME | 0 | 0 | ... | 0 |

~111

⇩

| WORK STEP 1 | WORK STEP 2 | WORK STEP 3 | ... | WORK STEP 6 |
|---|---|---|---|---|

| TASK NAME | TASK NUMBER | NEXT TASK NUMBER | SCHEDULED AMOUNT | PROGRESS | UNIT |
|---|---|---|---|---|---|
| TASK 1 | 1 | 2 | 10 | 10 | PAGE |
| REVIEW 2 | 2  | 3 | 10 | 10 | HOURS |

~172

| REVIEW | WORK STEP 1 | WORK STEP 2 | ... | WORK STEP 6 |
|---|---|---|---|---|
| TIME | 10/10 | 0 | ... | 0 |

~111'

| REVIEW 3 | 3 | —1 | 10 | 10 | HOURS |
|---|---|---|---|---|---|

~172

⇩

| WORK STEP 1 | WORK STEP 2 | WORK STEP 3 | ...... |
|---|---|---|---|

| TASK NAME | TASK NUMBER | NEXT TASK NUMBER | SCHEDULED AMOUNT | PROGRESS | UNIT |
|---|---|---|---|---|---|
| TASK 6 | 6 | 7 | 10 | 8 | PAGE |
| REVIEW 7 | 7  | —1 | 10 | 3 | HOURS |

~172

⇩

| REVIEW | WORK STEP 1 | WORK STEP 2 | ... | WORK STEP 6 |
|---|---|---|---|---|
| TIME | 20/20 | 3/10 | ... | 20/25 |

| | DOCUMENT TYPE | PAGES | DOCUMENT TYPE | PAGES |
|---|---|---|---|---|
| DOCUMENT PAGE AMOUNT | ENTIRE STRUCTURE | 8.0 | DETAIL/WHOLE | 30.0 |
| | NEW PORTION | 15.0 | DETAIL/MANAGER | 5.0 |
| | TRANSPLANTED PORTION | 24.0 | DETAIL/SYSTEM SELECTION | 5.0 |
| | STRUCTURE/WHOLE | 10.0 | DETAIL/EDITING | 5.0 |
| | STRUCTURE/MANAGER | 10.0 | DETAIL/CHECK | 10.0 |
| | STRUCTURE/SYSTEM SELECTION | 10.0 | REVIEW | 6.0 |
| | STRUCTURE/EDITING | 10.0 | OTHERS | 0 |
| | STRUCTURE/CHECK | 5.0 | | |

FIG. 54B

| | DOCUMENT TYPE | PAGES | DOCUMENT TYPE | PAGES |
|---|---|---|---|---|
| DOCUMENT PAGE AMOUNT | ENTIRE STRUCTURE | 8.0 | REVIEW | 6.0 |
| | NEW PORTION | 15.0 | OTHERS | 0 |
| | TRANSPLANTED PORTION | 24.0 | | |
| | DETAIL/WHOLE | 30.0 | | |
| | DETAIL/MANAGER | 5.0 | | |
| | DETAIL/SYSTEM SELECTION | 5.0 | | |
| | DETAIL/EDITING | 5.0 | | |
| | DETAIL/CHECK | 10.0 | | |

FIG.58

QUALITY INPUT

WORK-STEP CODE
- FD
- SD
- DD
- PG
- LT

REVIEW TIME: 3.0 HOURS

NUMBER OF TEST ITEMS: 0.0 ITEMS

NUMBER OF REVIEW: 9.0

HOURS OF LABOR

NUMBER OF PROBLEMS: 6.0 PROBLEMS

[DATA LOOK UP] [UPDATE] [OK] [CANCEL]

NUMBER OF TEST ITEMS

FIG.59

| DOCUMENT TYPE | PAGES | DOCUMENT TYPE | PAGES |
|---|---|---|---|
| ENTIRE STRUCTURE | 8.0 | | |
| NEW PORTION | 15.0 | | |

QUALITY ACQUIRING

WORK-STEP NAME   SD

TASK LIST
- STRUCTURE / MANAGER
- STRUCTURE / SYSTEM SELECT
- STRUCTURE / EDITING
- STRUCTURE / CHECK
- REVIEW

TOTAL  22.0

[OK]  [CANCEL]

CHECK ITEMS
- ◉ REVIEW TIME
- ○ NUMBER OF REVIEWS
- ○ NUMBER OF TEST ITEMS

DOCUMENT PAGE AMOUNT

FIG.60

F I G. 6 1
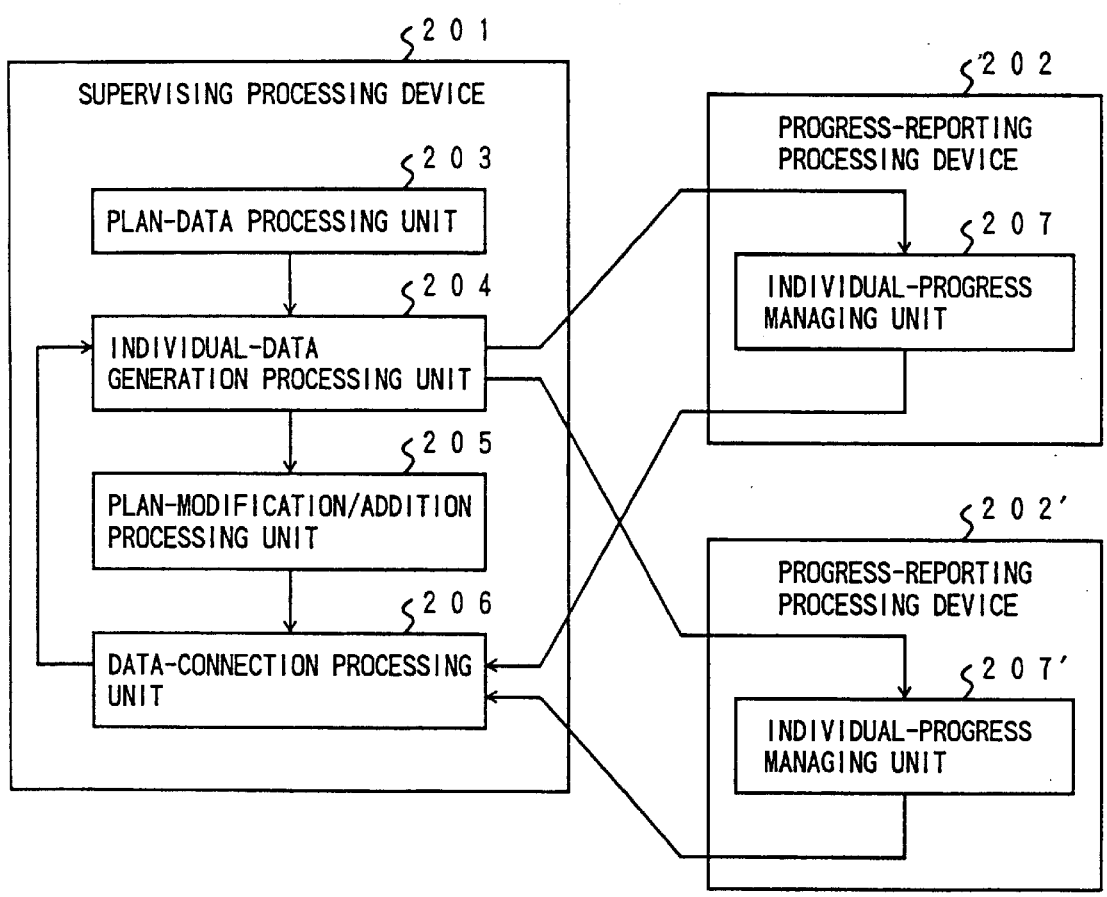

FIG.67

PROGRESS REPORTING

REPORT ENTRY AND UPDATING

WORK ITEM : TASK     LAST REPORTING :
DETAILED : TASK A     UNIT : PAGE
WORK NAME             SCHEDULED AMOUNT : 10.0
                           CUMULATIVE PROGRESS : 0.0

REPORT ENTRY

REPORTING DATE    1994. 7.20
REPORTING PERIOD    1994. 7.14 ~ 1994. 7.20
PROGRESS    5

(OK) (CANCEL)

271

DEVICE AND METHOD FOR PROJECT MANAGEMENT

This application is a Divisional of application Ser. No. 08/499,683, filed Jul. 7, 1995, now U.S. Pat. No. 5,974,391, issued Oct. 26, 1999.

BACKGROUND OF THE INVENTION

1. Field of the Invention

The present invention generally relates to devices and methods for project management, and particularly relates to a device and a method for project management which generate schedule tables and collect information during operations.

2. Description of the Prior Art

There are devices which generate schedule tables used for laying out work schedules. Typically, a whole process laid out by a schedule-table can be divided into a plurality of work steps. For example, a whole process of software development is comprised of a plurality of steps such as a basic design, a function design, etc.

When the devices create a schedule table for a series of work steps, a starting date and a finishing date for each step have to be indicated by users, and a scheduled period of each step is shown in a table format or graphically delineated by a schedule bar. When schedules are graphically shown by schedule bars, the schedule table is called a Gantt chart. When one of these dates needs to be changed, all data for affected steps has to be entered again in order to create a new Gantt chart.

In the case where the scheduled period of each step is delineated by the schedule bar, a left end and a right end of the bar correspond to a starting date and a finishing date, respectively. Also, a given day during the scheduled period is represented by a point which is in a corresponding position in the bar between the left end and the right end.

When creating a Gantt chart comprised of a plurality of-work steps, the starting date and the finishing date for each step have to be entered one by one, which is an excessive amount of tedious work. Also, when there is a change in a scheduled period for one work step, the schedules for the following steps will be influenced. A delay of one step by one month in the schedule may result in all the following steps being delayed by one month, for example. In such a case, data of the modified dates has to be entered for all the following steps in order to make a one-month-delayed Gantt chart. This requires long hours of a tiresome work. Also, in a device operating as described here, it is hard to say that the existing Gantt chart can be edited to generate a new Gantt chart, since all the modified dates should be reentered.

In some devices for generating a Gantt chart using the schedule bar, pointing devices such as a mouse can be used for indicating the starting date and the finishing date. However, these dates are indicated by positions which are visually determined in a rough manner. Thus, an accurate indication of a date is so difficult that erroneous inputs, off by a couple of days, are often made. This results in frequent corrections being necessary.

Furthermore, when there is a need for showing the progress of the work steps, graphs or tables separate from the Gantt charts are used in the prior art. Also, once a Gantt chart is modified, which is likely to happen, an original Gantt chart stored in a memory is generally replaced by a new Gantt chart. Thus, the original Gantt chart cannot be displayed again after it is modified.

When the scheduled periods of a plurality of work steps are overlapped in time, the schedule bars of these work steps have to be shown without overlapping on a display. Thus, the schedule bars need to be shown in a different row (if horizontal bars are used). With a limited area of the screen display, it is difficult to show a large number of work steps simultaneously.

Also, as described above, the progress of each work step cannot be shown on the Gantt chart itself. Furthermore, because a schedule is repeatedly changed as needed and old schedules become necessary at a later time, every schedule has to be printed out before being modified.

Furthermore, there are other problems with regard to the devices for generating the Gantt charts. In the Gantt charts, it is sometimes required to show character information for a particular date. For example, arranged ceremonious or national holidays may need to be shown in the Gantt charts. Although the Gantt charts of the prior art are provided with spaces for showing such information, an area used for this purpose is quite limited. This is because the display of such information does not play a main role in the Gantt charts.

In the prior art, when entering character information for a particular date, the user may indicate a position on the display for arranging characters, and enter the characters at the same position much like using a word processor. Or the user may indicate a position of the display for arranging characters, and enter the characters into an input frame provided at a different location on the display. Or the user may enter character information and corresponding date information into an input frame provided separately from a display area for the Gantt chart, and then, the character information is arranged at a location corresponding to the date information.

When the character information for particular dates is displayed in the Gantt chart, the location for displaying the character information is defined by these particular dates. Thus, if a space for displaying the character information for a given date is relatively small compared to a length of the character string or if particular dates are close to each other, the character information cannot be displayed entirely because of lack of the space or overlapping of the characters. In such a case, the characters are not providing as much information as they should.

Even if satisfactory Gantt charts are obtained by using a device which obviates the problems described above, there will be other problems with regard to the project management.

These days, it is required to develop products in time as laid out in a plan, and this is particularly so in manufacturing industries. In order to assure this, it is important to know an aptitude of each project member of a project at the time of making a project plan, based on his/her past work, experience, skill, performance, etc. Thus, it is required to collect and analyze achievement data regarding each project member at the end of each project, in order to benefit the planning of future projects.

In the prior art, the achievement data for the project management is collected and analyzed by hand. Since a large amount of data is necessary for the project management, the collection and the analysis require long hours of labor.

FIG. 1 shows a prior-art method of managing the achievement data. As shown in FIG. 1, after the completion of a project, data of a plan, data of daily progress of the project, and data of mistakes (i.e., "problem data") which are recorded on project reports are collected by hand. Then, the collected data is edited by using a word processor and the like to create the achievement data.

Since the data is collected by hand, without a predetermined format, types and units of the collected data may be different from project to project. Also, even if the types and the units are the same between different projects a format of the achievement data may be different. For example, a data arrangement in a table showing the achievement data may be different between the projects. Thus, it is difficult to make a comparative study of the achievement data between one project and another project.

Accordingly, the prior-art method of managing the achievement data has the following problems. The collection of a large amount of the achievement data requires long hours of labor. Since the types and the units of the data may vary, the achievement data of one project may not be able to be compared with that of another project. Since the format of the table may vary, the comparative study of the achievement data between different projects may be difficult.

In a system of project management, there is an increasing need for a system of managing the progress of a project. In order to properly manage the progress of the project, an environment should be provided where each project member can report the current situation regarding his/her own progress at a time of convenience. Also, supervisors should be able to check the progress of each member whenever it is necessary, so as to be able to control the progress by modifying the schedule of the project.

Furthermore, when one project member is replaced by another, it is important to be able to manage the progress while preventing a discontinuity from occurring between a file of the old project member and a file of the new project member.

FIGS. 2A and 2B show systems of progress management of the prior art. As shown in FIG. 2A, each project member enters the current situation of his/her own progress into a progress-management device 100, which is administered by the supervisor. Then, progress data for all the project members is combined together. Another system configuration is shown in FIG. 2B. In FIG. 2B, each project member is provided with his/her own progress file, and is responsible for adding required progress information into the progress file. Then, the progress file of each project member is combined at a supervising processing device 110 in order to generate a progress report.

However, in the system of FIG. 2A which centrally manages the progress data at the progress-management device, there can be a time conflict between project members in using the progress-management device in order to report his/her own progress. On the other hand, in the system of FIG. 2B which manages the progress data by handing out the individual progress files, a problem rises when the supervisor changes the schedule or a project member is replaced by another project member. When such changes occur, relevant individual files must be collected and modified so that the integrity between the individual files and the supervisor's data can be maintained.

That is, when the system shown in FIG. 2A is used, a project member cannot use the system if another project member is using the system. In such a case, the progress report cannot be made. On the other hand, when the system shown in FIG. 2B is used, a change made on the project by the supervisor may not be reflected in the individual files. In such a case, the integrity of the individual files cannot be maintained.

In consideration of all the above-mentioned problems with regard to the project management, various needs can be laid out in the field of devices generating Gantt charts, management of achievement data, and systems of the progress management.

Accordingly, there is a need in the field of devices generating Gantt charts for a device generating Gantt charts which enables an easy, fast generation and modification of the Gantt charts.

Also, there is a need for a device generating Gantt charts which enables an easy check on the progress of work steps, a clear display of overlapped work steps in a limited display space, and a way to compare an up-to-date Gantt chart with old Gantt charts.

Also, there is a need for a device generating Gantt charts which enables a clear display of character information for particular dates without failing to display the information.

Also, there is a need in the field of the management of the achievement data for a device for managing the achievement data which can allow a comparative study of the achievement data between different projects by automatically collecting accurate achievement data in a unified format. Also, there is a need for a device for managing the achievement data which helps in the prompt progress of a project as laid out in a plan by creating a more reliable and accurate plan.

Also, there is a need in the field of the progress management for a system and a method for progress management which allows each project member to report his/her own progress at any time, and, also, allows supervisors to change a project schedule at any time without creating a mismatch in schedule data between a supervisor side and a project member side.

SUMMARY OF THE INVENTION

Accordingly, it is general object of the present invention to provide a device and a method for project management which can satisfy the needs described above.

It is another and more specific object of the present invention to provide a device generating Gantt charts which enables an easy, fast generation and modification of the Gantt charts.

In order to achieve the above objects according to the present invention, a device for generating a Gantt chart made up of at least one schedule bar includes, a display showing the Gantt chart, an input unit receiving input to point at a position on the display, a Gantt-chart-generation processing unit generating a schedule bar having a start point and an end point by setting the start point at a first position indicated by the input unit and setting the end point at a second position indicated by the input unit, and a work-step-division processing unit dividing the schedule bar into a plurality of work steps at a plurality of third positions indicated by the input unit.

In the device described above, the schedule bar is divided to create representations of the work steps by indicating points of the division by the input device such as a mouse. Thus, the Gantt chart can be readily created fast.

Also, the device described above further includes a work-period-modification processing unit which shifts a start point of one of the work steps by a certain amount to a point indicated by the input unit so as to shift the one of the work steps and following ones of the-work steps by the certain amount in the same direction, while the one of the work steps and the following ones of the work steps keep having the same period.

Thus, when a start point of a work step is shifted by a certain amount, the work step and the following work steps are shifted by the same amount without changing the periods of these work steps. As a result, there is no need to reenter the starting dates and the finishing dates of these work steps, providing an efficient way to make modifications.

It is still another object of the present invention to provide a device generating Gantt charts which enables an easy check on the progress of work steps, a clear display of overlapped work steps in a limited display space, and a way to compare an up-to-date Gantt chart with old Gantt charts.

In order to achieve the above objects according to the present invention, a device for generating a Gantt chart made up of at least one schedule bar which represents a time schedule of a work includes a display showing the noted at least one schedule bar, a scheduled-period-display processing unit generating and displaying the noted at least one schedule bar on the display, a progress-rate-calculation processing unit calculating a progress rate of the work, and a progress-display-processing unit displaying the progress rate on the display by showing a portion of the noted at least one schedule bar in an appearance distinguishable from a remaining portion of the noted at least schedule one bar.

In the device described above, the progress of work steps are indicated in the schedule bar by showing a portion of the schedule bar in the appearance distinguishable from the remaining portion of the schedule bar. Thus, an easy check on the progress can be made on the display of the device Also, a device for generating a Gantt chart made up of at least one schedule bar which represents a time schedule of a work includes a display showing the noted at least one schedule bar, an entire-work-period-generation processing unit generating and displaying the noted at least one schedule bar on the display, the noted at least one schedule bar being made up of a plurality of work steps, and an overlapping-period-display processing unit displaying periods in which the work steps overlap in time, by showing portions of the noted at least one schedule bar in an appearance distinguishable from a remaining portion of the noted at least one schedule bar.

In the device described above, the overlapping period of the work steps are indicated in the schedule bar by showing the overlapping period in the appearance distinguishable from the remaining portion of the schedule bar. Thus, the overlapped work steps can be clearly displayed within a limited display space.

Furthermore, a device for generating a Gantt chart made up of at least one schedule bar which represents a time schedule of a work, the device includes a display, a work-schedule storage storing a starting date and a finishing date of the work, a version-information-extraction processing unit extracting a difference between a schedule bar and a modified schedule bar whenever a modification is made on the noted at least one schedule bar, a version-information storage storing the difference, and an old-schedule-bar-display processing unit regenerating and displaying an old version of the noted at least one schedule bar by using the starting date and the finishing date and the difference.

In the device described above, a difference between a schedule bar and a modified schedule bar is stored in the version-information storage whenever a modification is made. Differences are thus accumulated in the version-information storage. Based on these differences and up-to-date information stored in the work-schedule storage, an old version of a schedule bar can be regenerated to be shown on the display. Thus, an up-to-date Gantt chart can be compared with an old Gantt chart.

It is yet another object of the resent invention to provide a device generating Gantt charts which enables a clear display of character information for particular dates without failing to display part of the information.

In order to achieve the above object according to the present invention, a device for generating a Gantt chart includes a display showing the Gantt chart and having rows for showing character strings, each of which corresponds to one of dates, an input unit receiving the character strings and the dates, a sort processing unit sorting the character strings in an order of dates, and a display-position-determination processing unit assigning the character strings in the order to the rows from a row at one end of the rows to a row at another end of the rows so that the display from left to right and from the one end of the rows to the another end of the rows.

In the device described above, the character strings are assigned to the rows of the display such that the character strings are arranged on the display from left to right and from one end of the rows to the other end of the rows. Thus, character information for particular dates is clearly displayed without failing to display part of the information.

It is still yet another-object of the present invention to provide a device for managing achievement data which can allow a comparative study of the achievement data between different projects by automatically collecting accurate achievement data in a unified format. Also, it is an object of the present invention to provide a device for managing the achievement data which helps in the prompt progress of a project as laid out in a plan by creating a more reliable and accurate plan.

In order to achieve the above objects according to the present invention, a device collecting achievement data of projects which achievement data is used for project management includes a memory storage which stores work data regarding a project, a data-analysis processing unit which checks whether the work data exists in the memory storage, and checks whether items necessary for the achievement data are included in the work data, and an achievement-data-collection processing unit which collects data to become the achievement data from the work data according to a classification based on the items.

In the device described above, the achievement data is automatically collected for different projects according to a classification based on the same items. This allows comparative study of the achievement data between different projects. Thus, this device helps in the prompt progress of a project as laid out in a plan by creating a more reliable and accurate plan.

It is further yet another object of the present invention to provide a system and a method for the progress management which allows each project member to report his/her own progress at any time, and, also, allows supervisors to change a project schedule at any time without creating a mismatch in schedule data between a supervisor side and a project member side.

In order to achieve the above object according to the present invention, a system for managing a project made up of one or more works includes a supervising processing device, and one or more progress-reporting processing devices, each of which is used by a corresponding one of project members, and is provided with an individual-progress file for storing information on a progress of one of the one or more works assigned to the corresponding one of the project-members, wherein the supervising processing device includes a memory unit storing plan data regarding a plan on the project, and individual-data-generation processing unit generating the individual-progress file based on the plan data and distributing the individual-progress file to a corresponding one of the one or more progress-reporting processing devices, a plan-modification/addition processing unit creating differential information regarding modifications to be made on the plan data, and a data-connection processing unit updating the plan data based on the individual-progress file and the differential information after getting back the individual-progress file from the corresponding one of one or more progress-reporting processing devices.

The same object is also achieved according to the present invention by a method as follows. The method for managing a project made up of one or more works includes the steps of a) storing into a memory plan data regarding a plan on the project in a supervisor machine, b) generating in the supervisor machine at least one individual-progress file based on the plan data, c) distributing the noted at least one individual-progress file from the supervisor machine to a corresponding one of project member machines, d) storing into the noted least one individual-progress file a progress of one of the one or more works assigned to a corresponding project member in the corresponding one of the project member machines, e) creating differential information regarding modifications to be made on the plan data in the supervisor machine, and f) updating in the supervisor machine the plan data based on the noted at least one individual-progress file and the differential information after the noted least one individual-progress file is returned from the corresponding one of the project member machines.

In the system and the method described above, each of the project members is provided with his/her own individual-progress file, and can use his/her progress-reporting processing device (project member machine) for entering the progress information into the individual-progress file. Thus, the project members can report his/her own progress at any time of convenience. Also, the modifications made by the supervisor are stored as the differential information, which is used for updating the plan data when the individual-progress file is returned and merged into the plan data. Thus, supervisors can change a project schedule at any time without creating a mismatch in schedule data between a supervisor side and a project member side.

Other objects and further features of the present invention will be apparent from the following detailed description when read in conjunction with the accompanying drawings.

BRIEF DESCRIPTION OF THE DRAWINGS

FIGS. 14A and 14B are illustrative drawings showing examples of various results obtained through the first type of the work-period-modification processing;

FIGS. 15A and 15B are illustrative drawings showing examples of various results obtained through the second type of the work-period-modification processing;

FIG. 25 is an illustrative drawing showing three different types of bars which are displayed on a display of FIG. 24;

FIGS. 26A and 26B are illustrative drawings for explaining schedule/progress-bar-generation processing;

FIGS. 30A through 30D are illustrative drawings for explaining a creation of the work-period bar;

FIG. 31 is an illustrative drawing for explaining a creation of a version-information table;

FIG. 33 is an illustrative drawing provided for complementing an explanation of the flowchart of FIG. 32;

FIG. 36 is an illustrative drawing provided for complementing an explanation of the flowchart of FIG. 35;

FIGS. 39A through 39E are illustrative drawings for explaining a display of character information;

FIGS. 41A through 41C are illustrative drawings for explaining a display of the character information according to a second embodiment of the third principle;

FIG. 42 is a flowchart of a process of displaying the character information according to the second embodiment of the third principle;

FIGS. 44A through 44C are illustrative drawings for explaining a display of the character information according to a third embodiment of the third principle;

FIG. 52B is an illustrative drawing for aiding an explanation of the flowchart of FIG. 52A;

FIGS. 54A and 54B are illustrative drawings showing examples of a display in which the achievement data collected by the automatic-collection management device is shown;

FIG. 58 is an illustrative drawing showing a fourth example of the display for explaining the operation of the automatic-collection/management device;

FIG. 59 is an illustrative drawing showing a fifth example of the display for explaining the operation of the automatic-collection/management device;

FIG. 60 is an illustrative drawing showing a sixth example of the display for explaining the operation of the automatic-collection/management device;

FIG. 61 is a block diagram of a fifth principle of the present invention;

FIG. 67 is an illustrative drawing showing an example of the display of a progress-reporting processing device of FIG. 62;

DESCRIPTION OF THE PREFERRED EMBODIMENTS

In the following, principles and embodiments of the present invention will be described with reference to the accompanying drawings.

Figure 1:
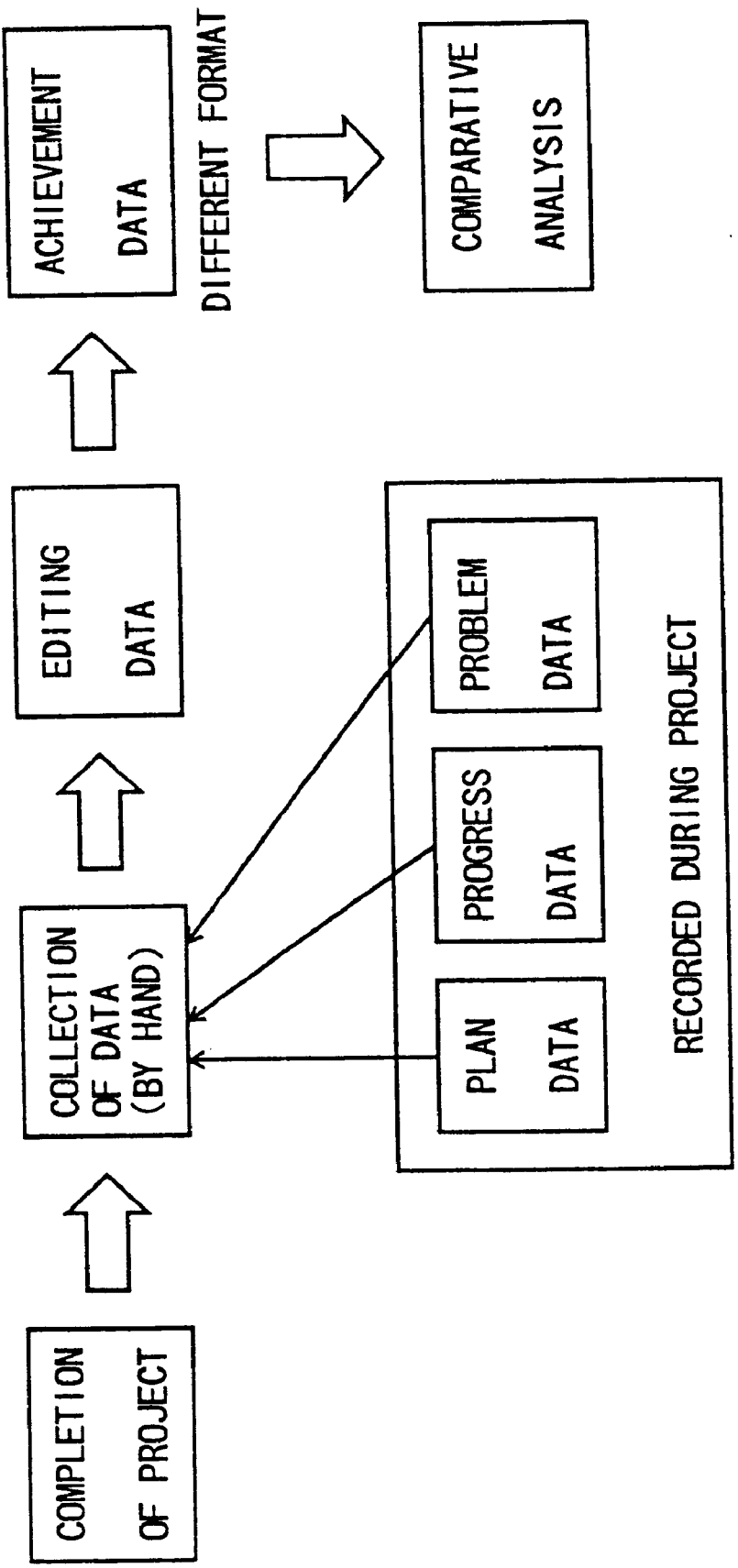
FIG. 1 is an illustrative drawing showing a collection and management of achievement data of the prior art.
Figure 2A:
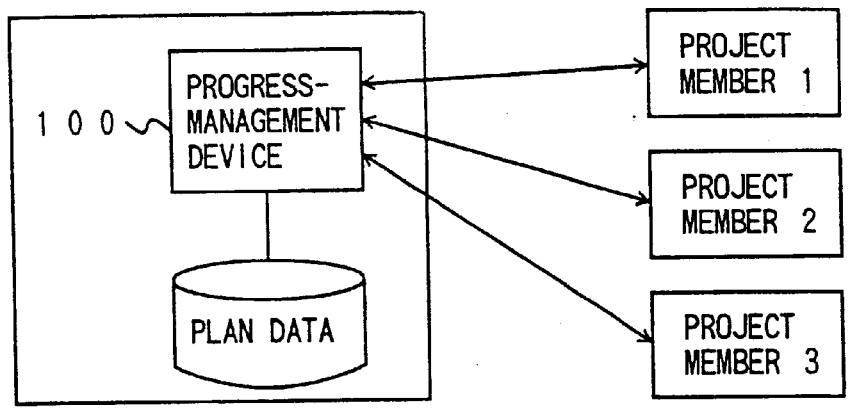
FIGS. 2A and 2B are illustrative drawings showing prior-art systems of progress management.
Figure 2B:
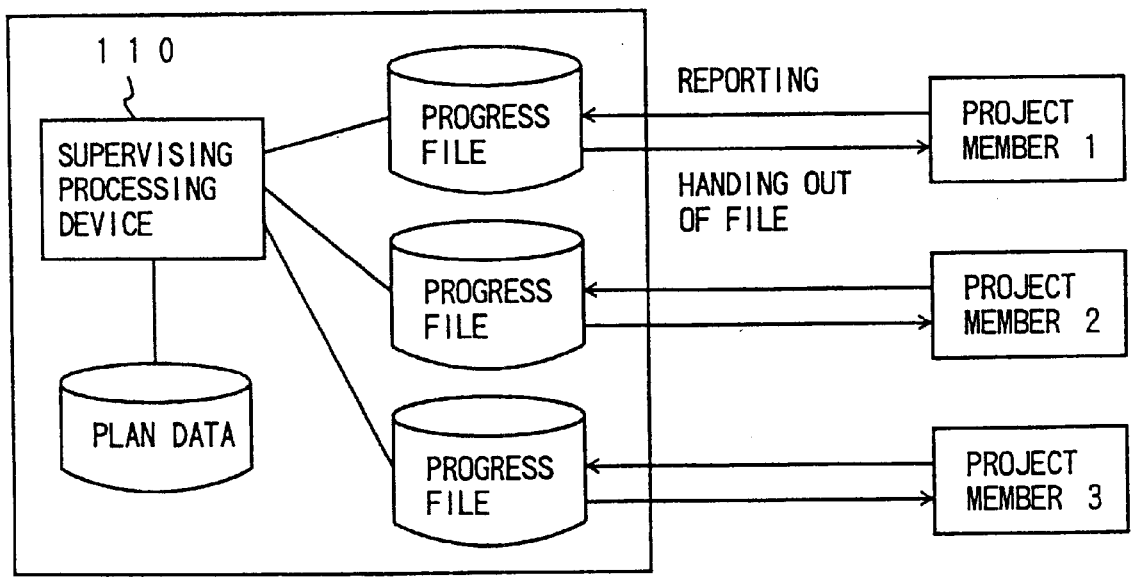
Figure 3:
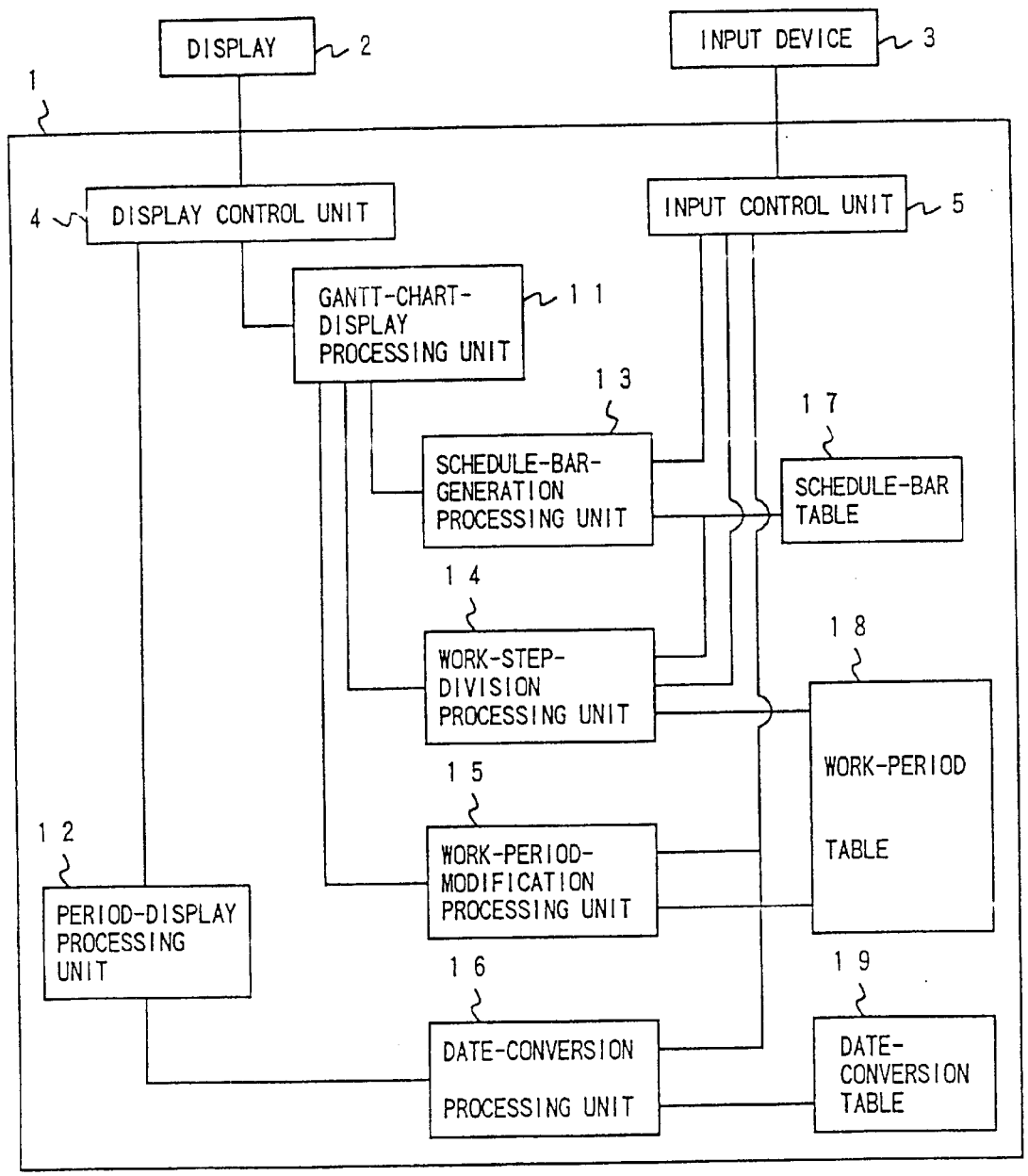
FIG. 3 is a block diagram of a first principle of the present invention.

FIG. 3 shows a block diagram according to a first principle of the present invention. In FIG. 3, a processing device 1 comprised of a CPU (central processing unit) and memories is connected to a display 2 and an input device 3 such as a keyboard and a mouse.

The processing device 1 includes a display control unit 4 for controlling the display 2, and an input control unit 5 for controlling the input device 3. The processing device 1 further includes a Gantt-chart-display processing unit 11, a period-display processing unit 12, a schedule-bar-generation processing unit 13, a work-step-division processing unit 14, a work-period-modification processing unit 15, a date-conversion processing unit 16, a schedule-bar table 17, a work-period table 18, and a date-conversion table 19.

The Gantt-chart-display processing unit 11 is means for displaying on the display 2 a Gantt chart comprised of a plurality of work steps whose orders are predetermined. The Gantt chart is displayed in an area for the Gantt chart on the display 2 in which a particular position on the display 2 corresponds to a particular date.

The schedule-bar-generation processing unit 13 is used for generating a schedule bar which represents a whole process comprised of the plurality of the work steps. The generation of the schedule bar is based on pointing information with regard to starting points and end points which are indicated by the input device 3 on the display 2. The generated schedule bar is displayed on the display 2.

The work-step-division processing unit 14 is used for dividing the schedule bar into work steps at points which are indicated by the input device 3. The divisions for each work step are made between the starting point and the end point of the schedule bar.

The work-period-modification processing unit 15 is used for modifying periods of the work steps through two different types of shifting operations. A first type of shifting operation manipulated by the input device 3 is used for modifying the starting dates and/or the finishing dates of the work steps. Also, the first type of shifting operation shifts the starting date and the finishing dates of all the following work steps which are dependent on the work steps originally shifted. A second type of shifting operation manipulated by the input device 3 is used for modifying the starting dates and/or the finishing dates of the work steps. In contrast with the first type, the second type of shifting operation modifies only the starting dates and the finishing dates of the immediately preceding work step and/or the immediately following work step which are dependent on the work step originally shifted. Thus, the second type of shifting operation does not alter the dates of the work steps which are distanced from the originally-shifted work step by more than one work step.

The period-display processing unit 12 is used for displaying dates in a period display area on the display 2.

The date-conversion processing unit 16 is used for changing date information into character information of a corresponding date such that the character information can be displayed on the display 2 via the period-display processing unit 12. The date-conversion processing unit 16 changes the starting date and the finishing date into character information by using the work-period table 18 when a point indicated by the input device 3 is located within a schedule bar. Also, the date-conversion processing unit 16 changes a date corresponding to a point indicated by the input device 3 into character information by using the date-conversion table 19 when the point is located outside the schedule bars.

The schedule-bar table 17 is a memory space storing the starting dates and the finishing dates when the schedule-bar-generation processing unit 13 generates the schedule bars. The work-period table 18 stores the starting date and the finishing date for each of the work steps. The date-conversion table 19 stores relations between dates and coordinates in the area for the Gantt chart.

According to the first principle of the present invention, the schedule-bar-generation processing unit 13 first generates the Gantt chart, which is then divided by the work-step-division processing unit 14. Thus, the Gantt chart can be rapidly created with ease.

The first type of the shift operation by the work-period-modification processing unit 15 enables the following processing. The starting date and/or the finishing date of the first one of the work steps can be shifted, which results in all the following work steps being shifted accordingly. Also, the starting dates and/or the finishing dates of the intermediate work steps can be shifted, which results in all the following work steps being shifted accordingly. Also, the starting date and/or the finishing date of the last one of the work steps can be shifted without affecting other work steps.

The second type of the shift operation by the work-period-modification processing unit 15 enables the following processing. The starting date and/or the finishing date of the first one of the work steps can be shifted, which may result in changes of the dates of the immediately following work step. Also, the starting dates and/or the finishing dates of the intermediate work steps can be shifted, which results in changes of the dates of the adjacent work steps. Also, the starting date and/or the finishing date of the last one of the work steps can be shifted without affecting other work steps.

Furthermore, the date-conversion processing unit 16 and the period-display processing unit 12 enable a point indicated by the input device 3 on the display 2 to be changed into date character information, which is in turn displayed on the display 2. Thus, with this date character information displayed on the display 2, the manipulation of the pointing device such as a mouse can accurately indicate a desired date.

In the following, embodiments of the first principle of the present invention will be described with reference to the accompanying drawings.

A first embodiment of the first principle of the present invention concerns the schedule-bar-generation processing and the work-step-division processing. FIGS. 4A and 4B through FIGS. 7A and 7B show illustrative drawings for explaining these two types of processing. In the figures, a schedule bar 21 displayed in the area for the Gantt chart 20 is one of the components which makes up the entire project. The schedule bar 21 shows only the starting point and the end point of the component. In the management of work steps, the periods of the components are adjusted in the area for the Gantt chart 20 in order to create a development plan for the entire project.

Figure 4A:
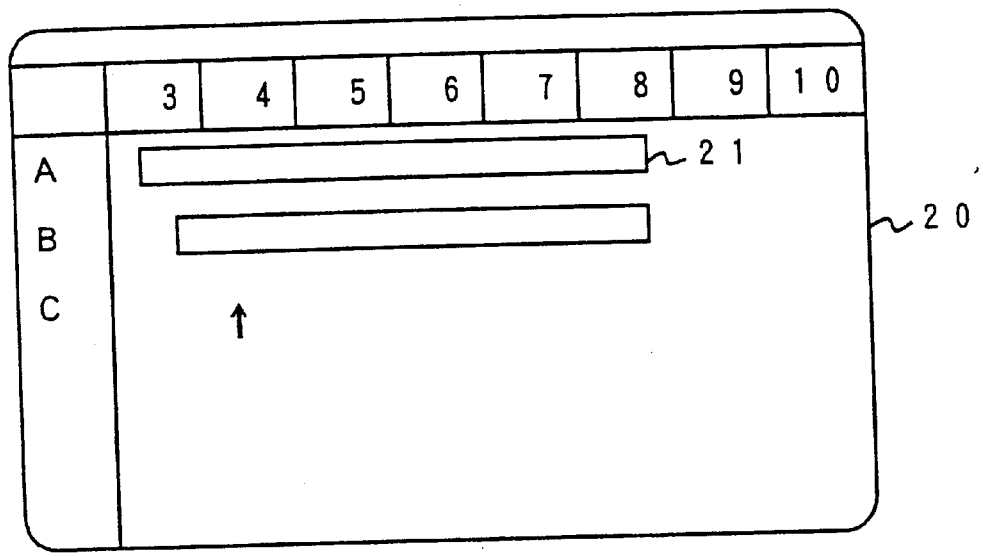
FIGS. 4A and 4B are illustrative drawings for explaining a schedule-bar-generation processing.

FIG. 4A shows the area for the Gantt chart 20 and the schedule bar 21. In this example, a new schedule bar is about to be created. First, a cursor (shown as an arrow) is moved to a starting point of the new schedule bar by manipulating a mouse, and, then, a button of the mouse is pressed to set the starting date.

Figure 4B:
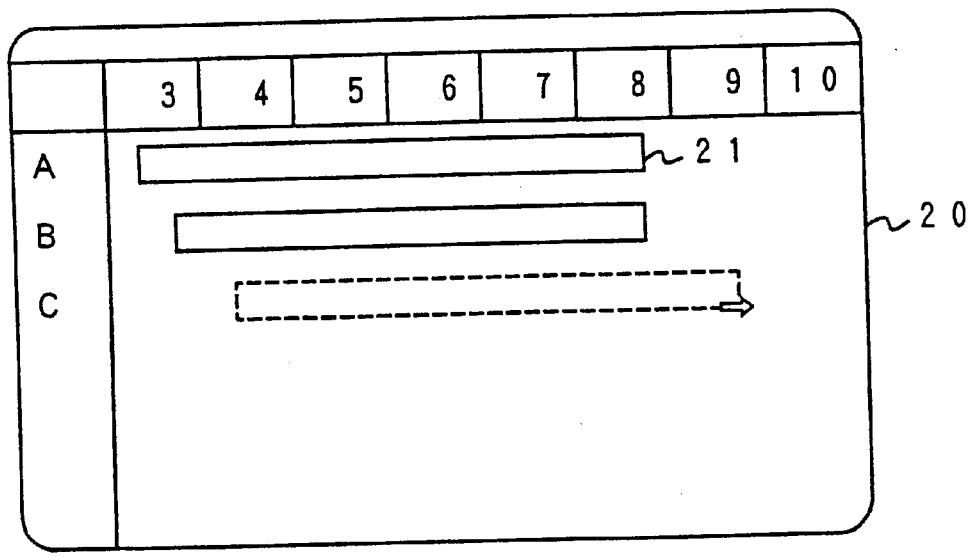

As shown in FIG. 4B, a tentative schedule bar shown by dotted lines is created by moving the cursor to the right while pressing the mouse button. This tentative schedule bar is defined by the starting point and a current location of the cursor, and can be modified until the mouse button is released.

Figure 5A:
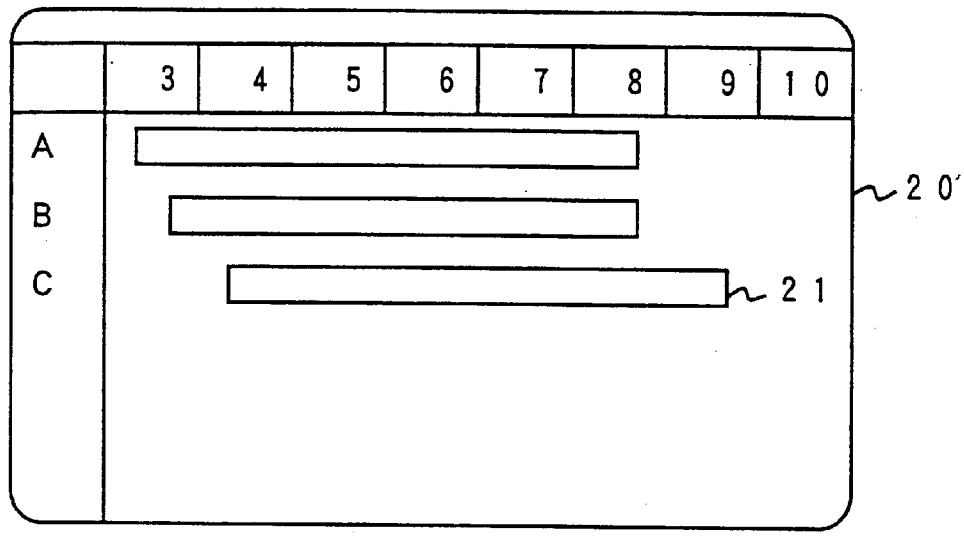
FIGS. 5A and 5B are other illustrative drawings for explaining the schedule-bar-generation processing.

As shown in FIG. 5A, the new schedule bar shown by solid lines is created when the mouse button is released. The new schedule bar extends from the starting point (starting date), where the mouse button is pressed, to the end point (finishing date) where the mouse button is released. In the same manner, another schedule bar can be added to the Gantt chart if needed. Or, a work-step-division process can be conducted after selecting a schedule bar to be divided.

Figure 5B:
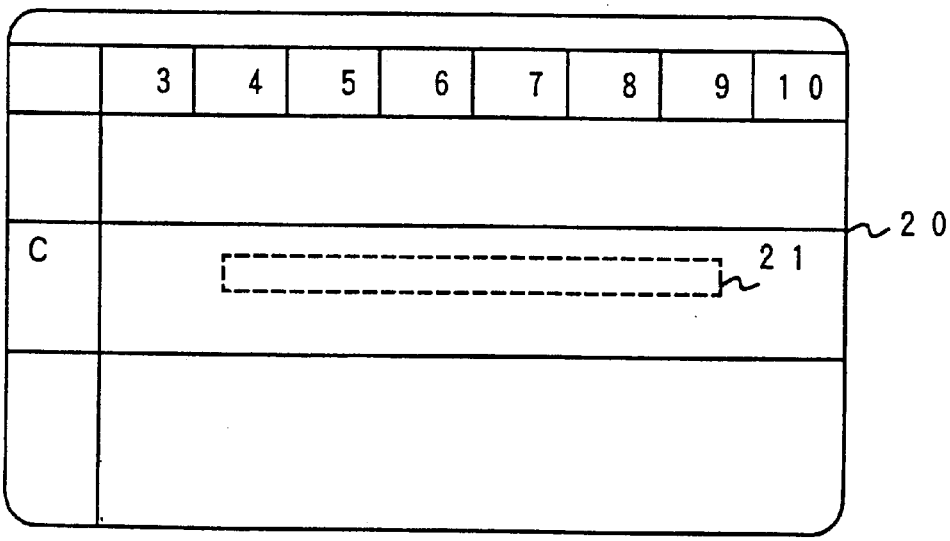

The work-step-division processing for the schedule bar 21 will be described below. The division of the schedule bar (the whole process) means defining periods of work steps (e.g., design, production, testing, etc.) within the component. Selection of the schedule bar 21 makes the schedule bar 21 ready to be divided as shown in FIG. 5B.

Figure 6A:
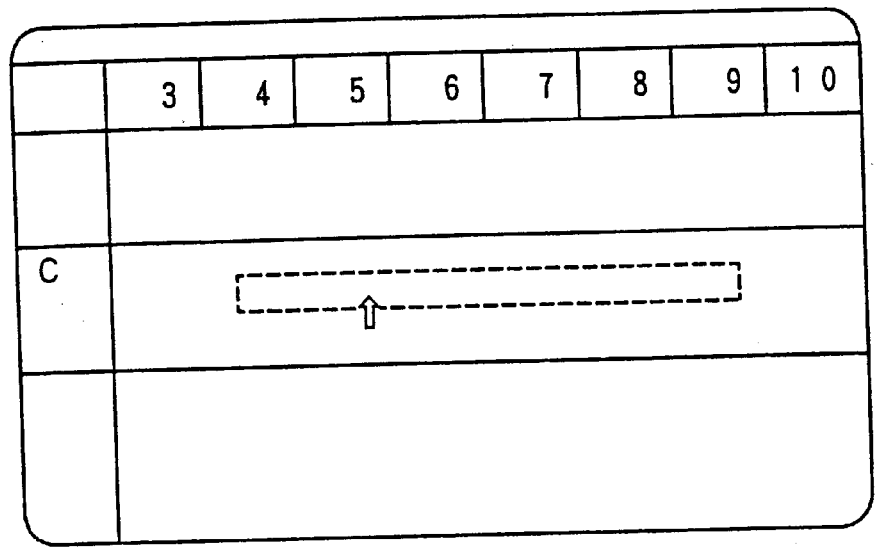
FIGS. 6A and 6B are illustrative drawings for explaining a work-step-division processing.
Figure 6B:
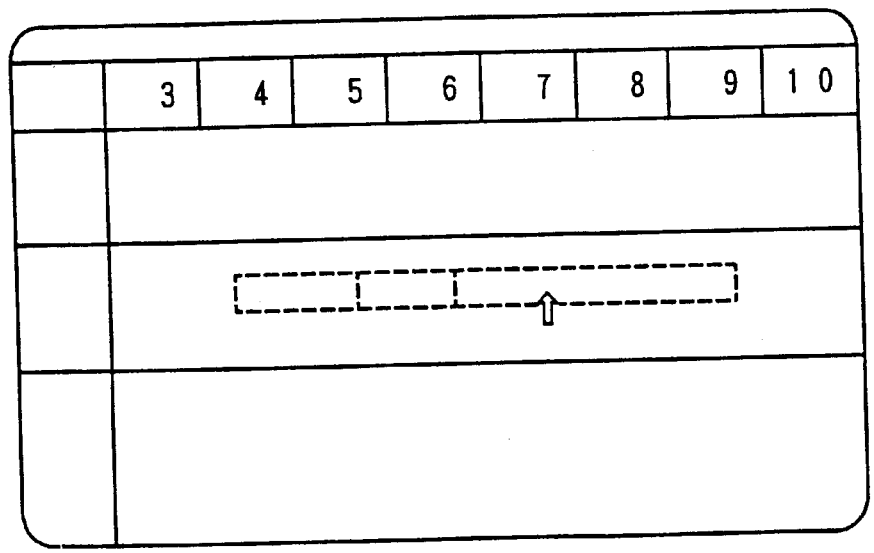

Then, as shown in FIG. 6A, the finishing date of the first work step is indicated by the cursor. Here, the starting date of the first work step is the same as the starting date of the schedule bar 21, so that there is no need to explicitly define it by positioning the cursor. A point within the schedule bar where the mouse button is clicked becomes the finishing date, which is shown by a vertical line dividing the adjacent work steps. The next day after the finishing date which has been just defined becomes the starting date of the next work step. In the same manner, the finishing dates of the subsequent work periods can be consecutively defined in the schedule bar 21, as shown in FIG. 6B.

Figure 7A:
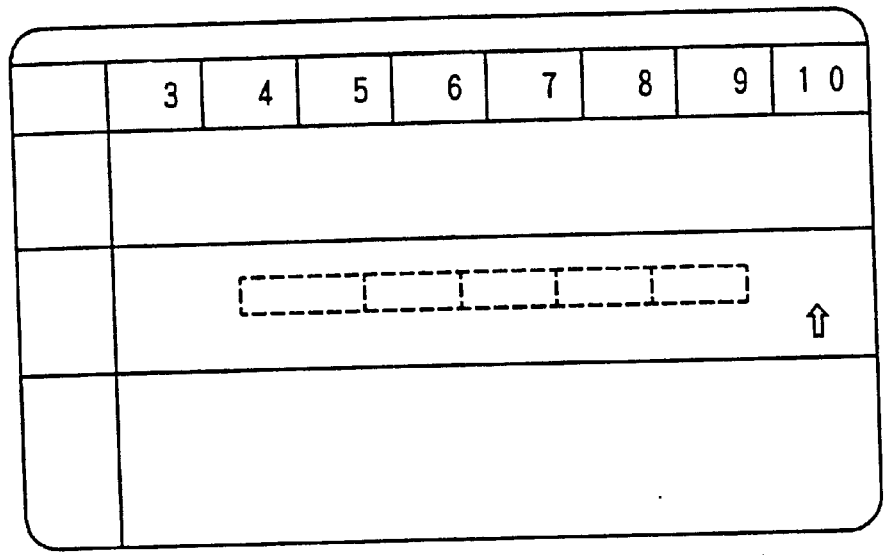
FIGS. 7A and 7B are other illustrative drawings for explaining the work-step-division processing.
Figure 7B:
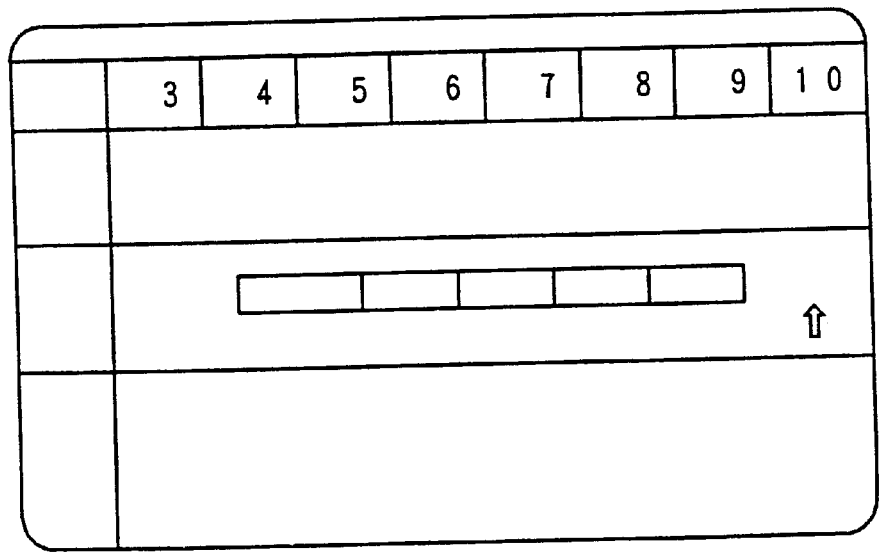

There is no need to explicitly define a starting date and a finishing date of the last work step, since the starting date is automatically set to the next day after the finishing date of the preceding work step, and the finishing date of the last work step is the same as the finishing date of the schedule bar 21. As shown in FIG. 7A, pressing the mouse button while positioning the cursor outside the schedule bar 21 finishes the division of the schedule bar 21. FIG. 7B shows the Gantt chart in which the division of the schedule bar 21 is finished.

Figure 8:
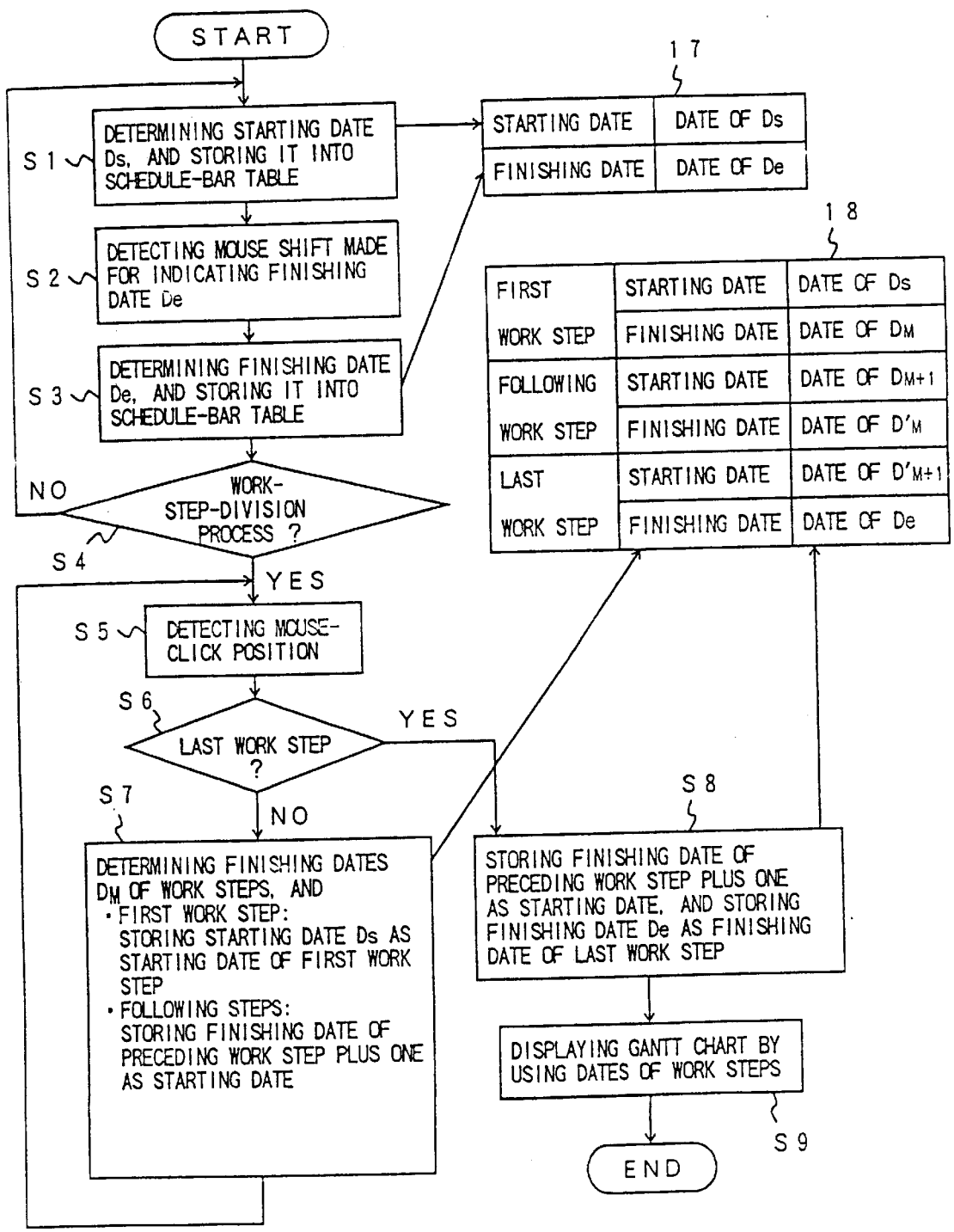
FIG. 8 is a flowchart of the schedule-bar-generation processing and the work-step-division processing.

FIG. 8 shows a flowchart of the Gantt-chart generation and the work-step-division processing.

In FIG. 8, at a step S1, a starting date Ds of the schedule bar is determined by pressing the mouse button while positioning the cursor at an appropriate position in the area for the Gantt chart. Also, at the step S1, the starting date Ds is stored in the schedule-bar table 17. At a step S2, the amount of a mouse shift made for indicating a finishing date De is detected. At a step S3, the finishing date De is determined to be a point of the cursor where the mouse button is released. Also, at the step S3, the finishing date De is stored into the schedule-bar table 17.

At a step S4, a check is made based on a position of a mouse-button click or a menu-command and the like whether the work-step-division process is to be conducted. If it is to be conducted, the procedure goes to a step S5. If it is not to be conducted, the procedure goes back to the step S1 to repeat the steps for the schedule-bar generation.

At the step S5, a position of the cursor is detected where the mouse button is clicked. At a step S6, a check is made whether the last work step is defined, i.e., whether the mouse button is clicked while the cursor is positioned outside the schedule bar. If the mouse button is clicked inside the schedule bar, the division of the schedule bar is still underway, and the procedure goes to a step S7. If the mouse button is clicked outside the schedule bar, the division of the schedule bar is finished, and the procedure goes to a step S8.

At the step S7, the finishing date of a work step is determined based on the position of the mouse click. Here, if the work step to be defined is the first one of all, the starting date Ds stored in the schedule-bar table 17 is stored as the starting date of the first work step into the work-period table 18. If the work step to be defined is the second or the following one, a finishing date of the preceding work step plus one is set as the starting date in the work-period table 18. A date Dm indicated by the mouse click is defined as the finishing date, and stored into the work-period table 18. Then, the procedure goes back to the step S5 to repeat the work-period-division processing.

At a step S8, where the work step to be defined is the last one of all, a finishing date of the preceding work step plus one is set as the starting date in the work-period table 18. Also, at the step S8, the finishing date De stored in the schedule-bar table 17 is stored as the finishing date of the last work step into the work-period table 18.

At a step S9, a Gantt chart is created based on the dates stored in the work-period table 18, and is displayed on the display 2. This ends the procedure.

A second embodiment of the first principle of the present invention concerns the work-period-modification processing. In general, a Gantt chart, once created, will be subjected to a lot of corrections in response to situational changes of the project. Thus, simple means for modifying the Gantt chart is necessary.

FIGS. 9A, 9B, and 9C through FIGS. 12A and 12B show illustrative drawings for explaining the work-period-modification processing. As described earlier, there are two types of the work-period-modification processes. One is a process in which a change in a period of a work step results in shifts of all the following work steps, and the other is a process in which a change in a period of a work step results in a change of a period of an adjacent work step.

First, an example in which delaying the finishing date of a selected work step results in shifts of all the following work steps will be described.

Figure 9A:
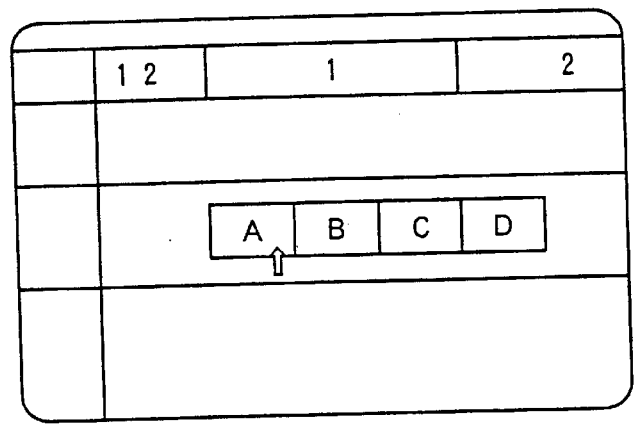
FIGS. 9A through 9C are illustrative drawings for explaining a first type of work-period-modification processing.
Figure 9B:
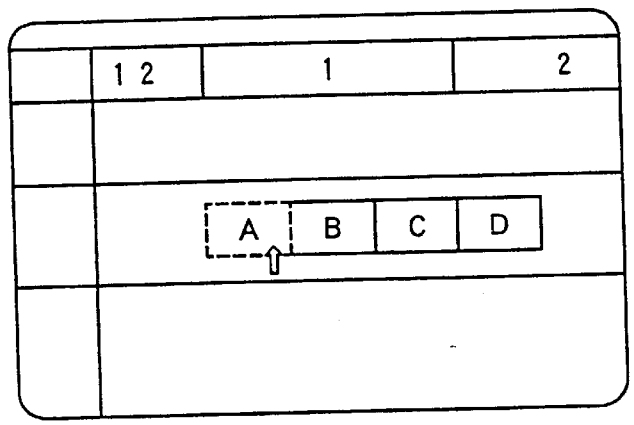
Figure 9C:
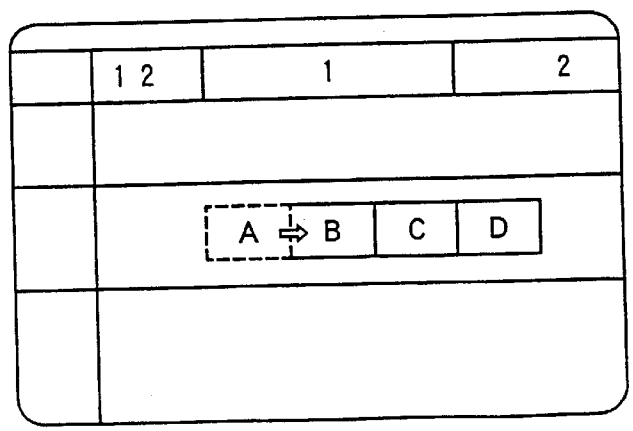

When a work step A is selected by a mouse manipulation as shown in FIG. 9A, the work step A is displayed by dotted lines as a sign of the selection as shown in FIG. 9B. When the finishing date of the work step A is to be modified, an operator moves the cursor to a point of the finishing date and presses the mouse button, as shown in FIG. 9C.

Figure 10A:
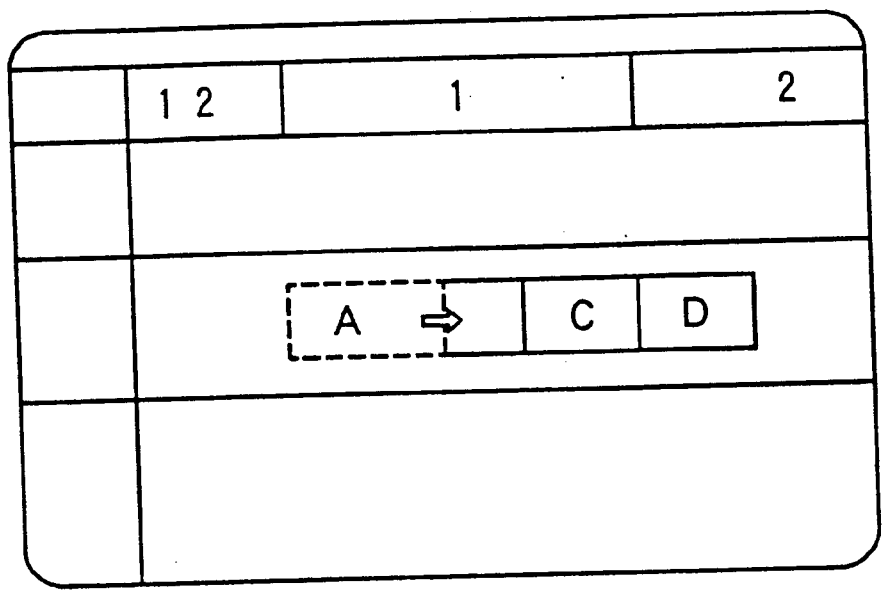
FIGS. 10A and 10B are other illustrative drawings for explaining the first type of the work-period-modification processing.
Figure 10B:
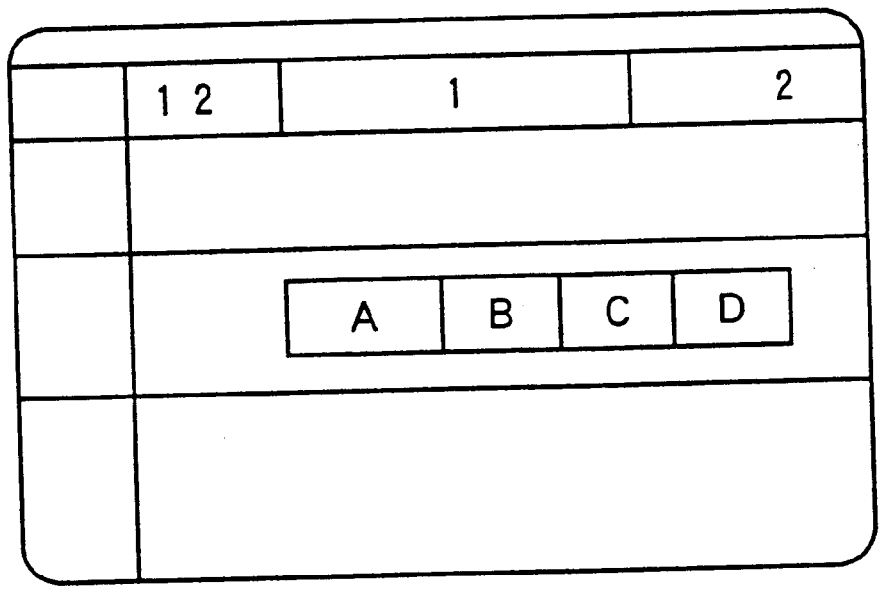

As shown in FIG. 10A, the cursor is moved to an appropriate position by a mouse manipulation while pressing the mouse button. A period of the work step A is determined when the mouse button is released, as shown in FIG. 10B. Periods of following steps B, C, and D are not changed, and all those steps are merely shifted accordingly.

Next, an example in which delaying the finishing date of the selected work step results in a shift of the starting date of only the next work step will be described.

Figure 11A:
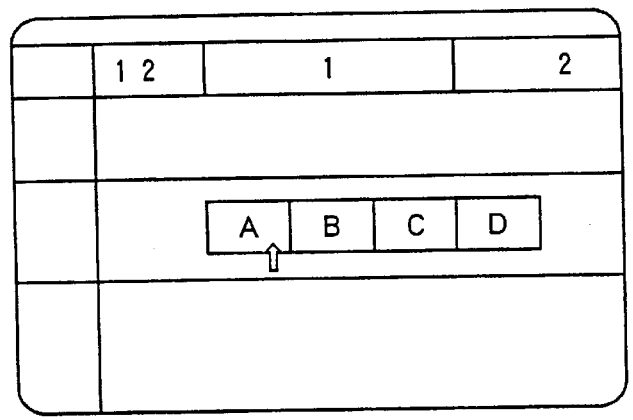
FIGS. 11A through 11C are illustrative drawings for explaining a second type of the work-period-modification processing.
Figure 11B:
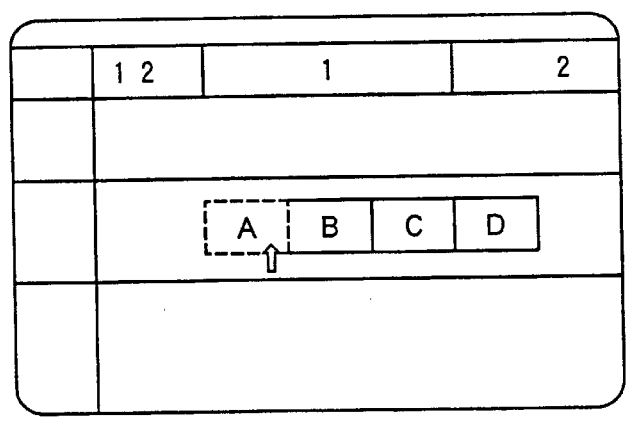
Figure 11C:
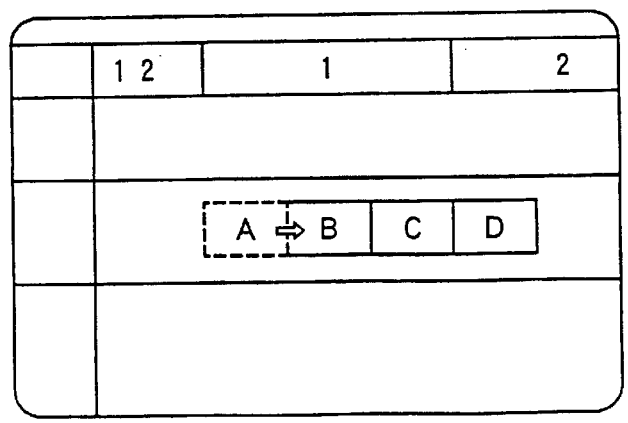

When the work step A is selected by a mouse manipulation as shown in FIG. 11A, the work step A is displayed by dotted lines as a sign of the selection as shown in FIG. 11B. When the finishing date of the work step A is to be modified, an operator moves the cursor to a point of the finishing date and presses the mouse button, as shown in FIG. 11C.

Figure 12A:
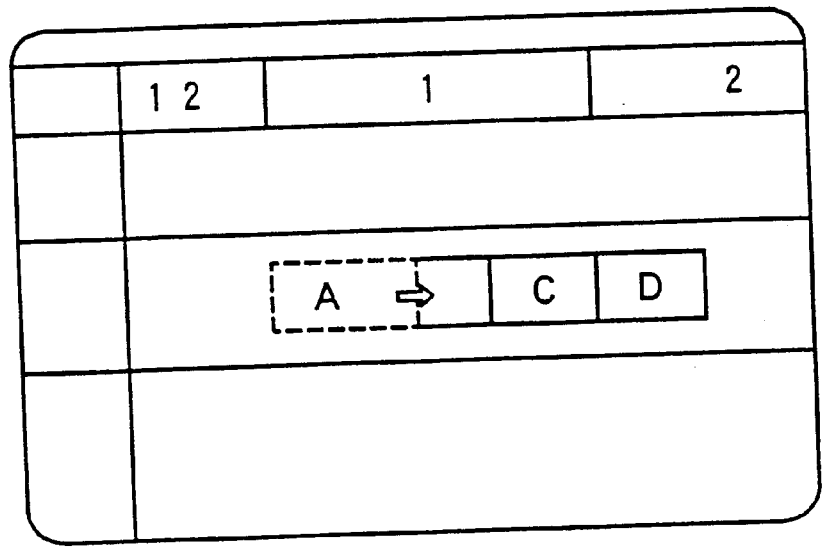
FIGS. 12A and 12B are other illustrative drawings for explaining the second type of the work-period-modification processing.
Figure 12B:
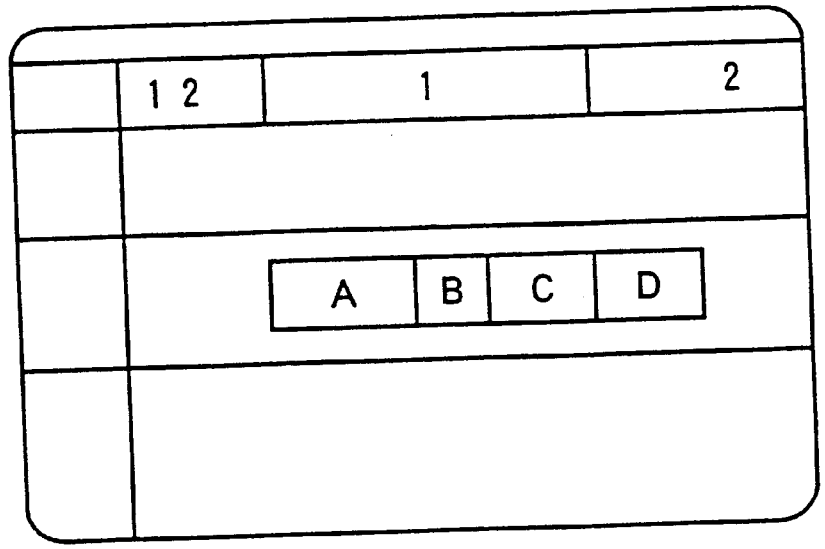

As shown in FIG. 12A, the cursor is moved to an appropriate position by a mouse manipulation while pressing the mouse button. A period of the work step A is determined when the mouse button is released, as shown in FIG. 12B. Here, the finishing date of the work step A and the starting date of the work step B are shifted by the same amount, and the period of the work step C is not affected. That is, as a result of this modification, the period of the work step B is shortened by the amount by which the work step A is elongated.

Figure 13:
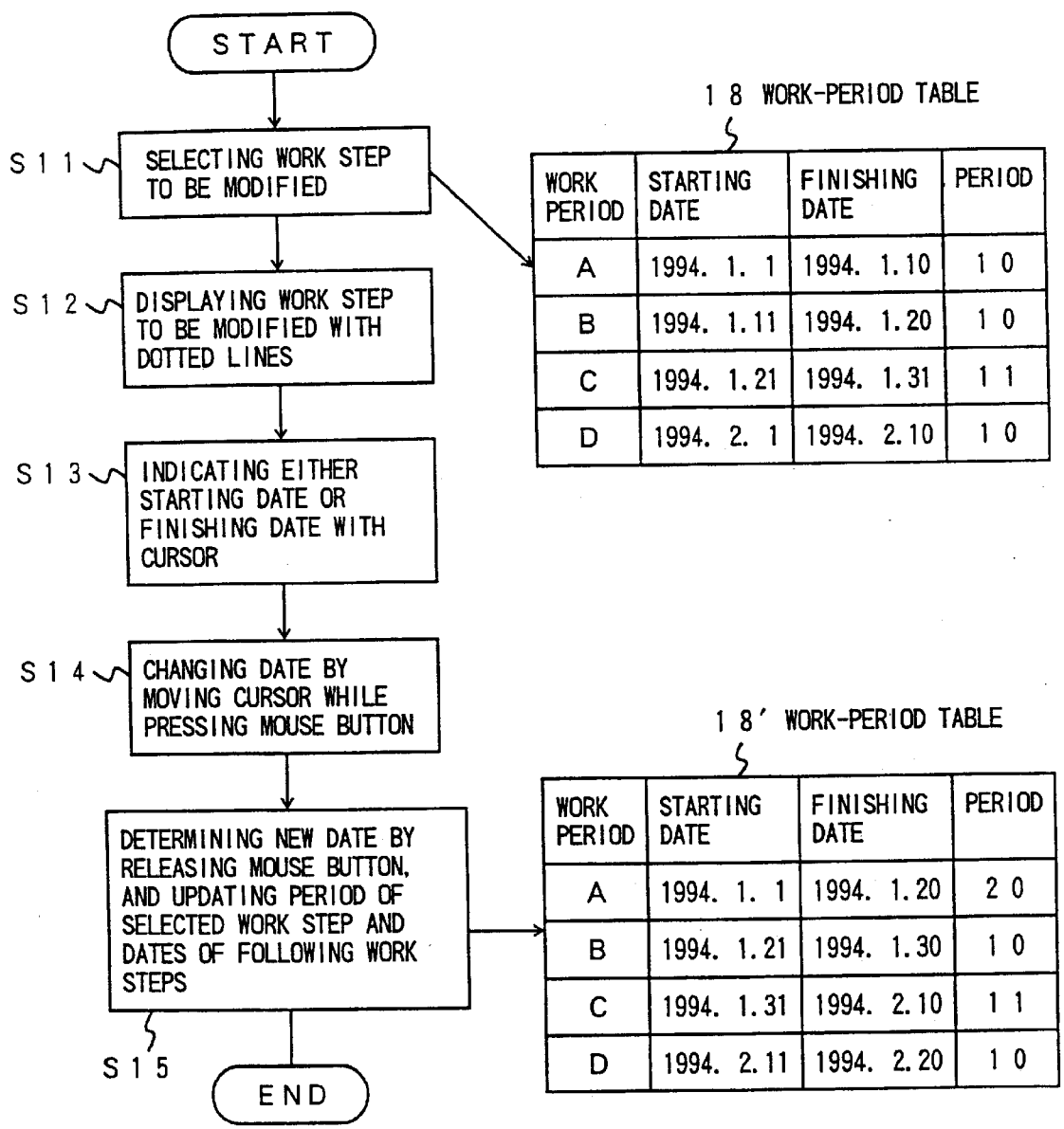
FIG. 13 is a flowchart of the work-period-modification processing.

FIG. 13 shows a flowchart of the work-period-modification processing in which a change in a given work step results in the shift of all the following work steps.

In FIG. 13, at a step S11, a work step to be modified is selected by a mouse manipulation. In an example shown along with the flowchart in FIG. 13, the work step A is selected for modification.

At a step S12, the work step to be modified is displayed by dotted lines. At a step S13, either the starting date or the finishing date of the work step to be modified is selected by pressing the mouse button while indicating an appropriate position with the cursor. At a step S14, an area of the work step being displayed by dotted lines is modified in accordance with a mouse manipulation moving the cursor to an appropriate position.

At a step S15, a modified period of the selected work step is determined when the mouse button is released. Also, at the step S15, the period of the selected work step and the starting and finishing dates of the following work steps are calculated to update the work-period table 18. Based on an updated work-period table 18', the Gantt chart is displayed again. In the example shown in FIG. 13, a change in the finishing date of the work step A results in a period of the work step A being changed in the Gantt chart 18'. Also, each of the starting dates of the work steps B, C, and D is set to the finishing date of the preceding work step plus one, and each of the finishing dates of the work steps B, C, and D is set to a corresponding starting date plus a corresponding period.

The work-period-modification processing is carried out depending on such conditions as whether a modification will affect all the following work steps or will affect only the adjacent work steps, whether a work step to be modified is the first work step, one of the intermediate work steps, or the last work step whether the starting date is brought forward or delayed, and whether the finishing date is brought forward or delayed.

FIGS. 14A and 14B and FIGS. 15A and 15B are examples in which different results of work-period modifications are obtained according to the conditions described above.

FIG. 14A shows a schedule bar before modification. FIG. 14B shows schedule bars after the modification when the work-period-modification processing affects all the following work steps. In detail, this type of the work-period-modification processing may be carried out in response to a mouse manipulation without using control keys. In the following, a brief description will be given for each of examples (a) through (l) shown in FIG. 14B.

Example (a) shows a case in which the starting date of the first work step is brought forward. This shift operation results in forward shifts of all the following work steps.

Example (b) shows a case in which the starting date of the first work step is delayed. This shift operation results in delays of all the following work steps.

Example (c) shows a case in which the finishing date of the first work step is brought forward. This shift operation results in forward shifts of all the following work steps.

Example (d) shows a case in which the finishing date of the first work step is delayed. This shift operation results in delays of all the following work steps.

Example (e) shows a case in which the starting date of an intermediate work step (a work step placed between the first and last work steps) is brought forward. This shift operation results in forward shifts of all the following work steps.

Example (f) shows a case in which the starting date of the intermediate work step is delayed. This shift operation results in delays of all the following work steps.

Example (g) shows a case in which the finishing date of the intermediate work step is brought forward. This shift operation results in forward shifts of all the following work steps.

Example (h) shows a case in which the finishing date of the intermediate work step is delayed. This shift operation results in delays of all the following work steps.

Example (i) shows a case in which the starting date of the last work step is brought forward. This shift operation results in a forward shift of the finishing date of the last work step.

Example (j) shows a case in which the starting date of the last work step is delayed. This shift operation results in a delay of the last work step.

Example (k) shows a case in which the finishing date of the last work step is brought forward. This shift operation results in only the period of the last work step being shortened.

Example (l) shows a case in which the finishing date of the last work step is delayed. This shift operation results in only the period of the last work step being elongated.

FIG. 15A shows a schedule bar before modification. FIG. 15B shows schedule bars after the modification when the work-period-modification processing affects only the adjacent work steps. In detail, this type of the work-period-modification processing may be carried out in response to a mouse manipulation by using control keys. In the following, a brief description will be given for each of examples (m) through (x) shown in FIG. 15B.

Example (m) shows a case in which the starting date of the first work step is brought forward. This shift operation results in only an elongation of the first work step.

Example (n) shows a case in which the starting date of the first work step is delayed. This shift operation results in only a shortening of the first work step.

Example (o) shows a case in which the finishing date of the first work step is brought forward. This shift operation results in no influence on all the other work steps.

Example (p) shows a case in which the finishing date of the first work step is delayed. This shift operation results in a delay of the starting date of the following work step.

Example (q) shows a case in which the starting date of an intermediate work step is brought forward. This shift operation results in a forward shift of the finishing date of the preceding work step. The other dates remain the same.

Example (r) shows a case in which the starting date of the intermediate work step is delayed. This shift operation results in no influence on the other dates.

Example (s) shows a case in which the finishing date of the intermediate work step is brought forward. This shift operation results in no influence on the other dates.

Example (t) shows a case in which the finishing date of the intermediate work step is delayed. This shift operation results in a delay of the starting date of the following work step.

Example (u) shows a case in which the starting date of the last work step is brought forward. This shift operation results in a forward shift of the finishing date of the preceding work step.

Example (v) shows a case in which the starting date of the last work step is delayed. This shift operation results in no influence on the other dates.

Example (w) shows a case in which the finishing date of the last work step is brought forward. This shift operation results in only the period of the last work step being shortened.

Example (x) shows a case in which the finishing date of the last work step is delayed. This shift operation results in only the period of the last work step being elongated.

The various types of the work-period-modification processing described above will be described below with reference to flowcharts. In order to determine which type of the modifications is to be made, two flags 1 and 2 are used. The flag 1 is "1" when the control key is used with the mouse manipulation, and is "0" otherwise. The flag 2 is "1" when the selected work step is the first work step, is "2" when it is one of the intermediate work steps, and is "3" when it is the last work step.

Figure 16:
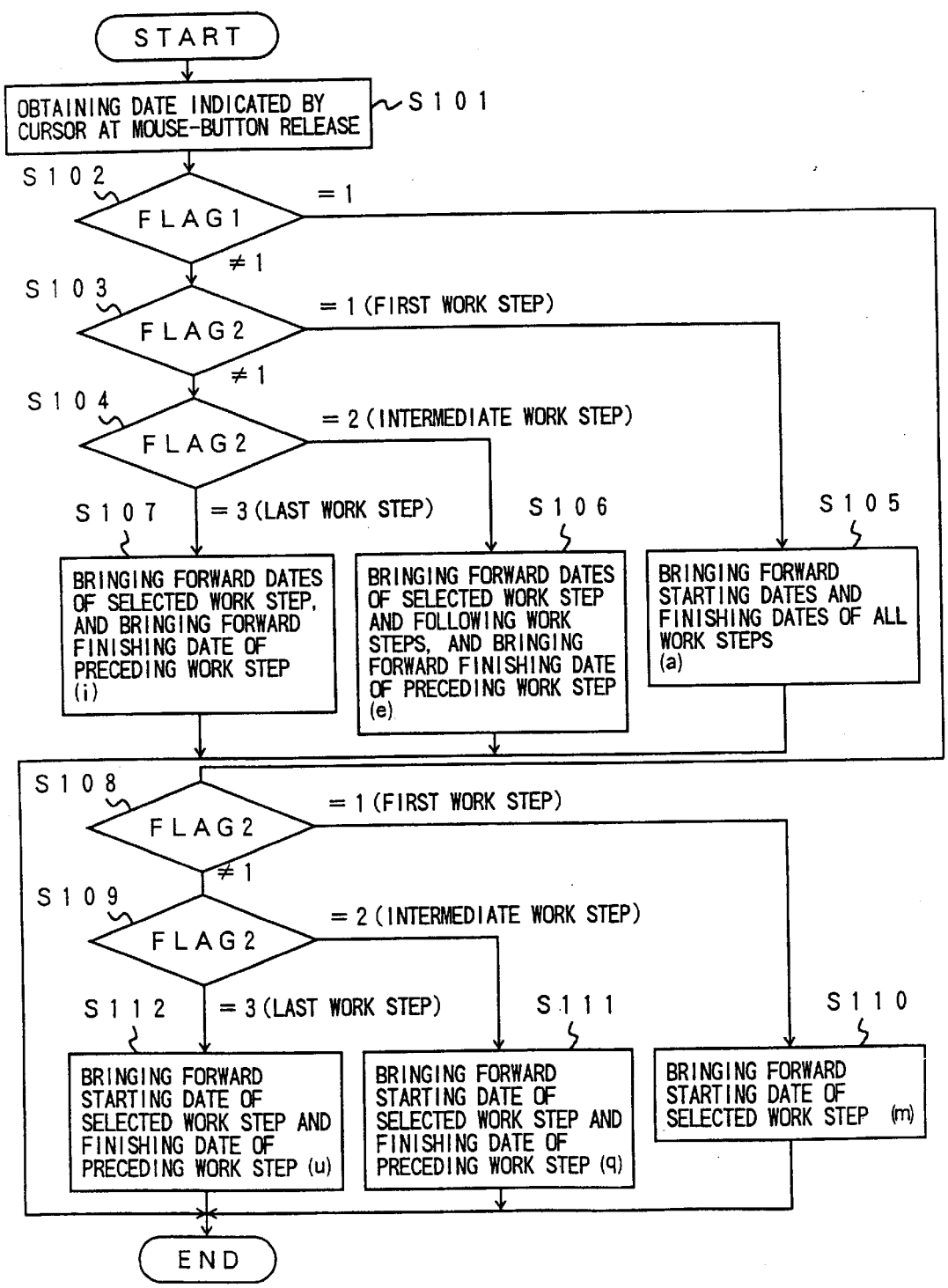
FIG. 16 is a flowchart of the work-period-modification processing for a modification by which a starting date is brought forward.

FIG. 16 shows a flowchart of the work-period-modification processing when the starting date is brought forward.

In FIG. 16, at a step S101, a date being indicated by the cursor when the mouse button is released is obtained. At a step S102, a check is made by using the flag 1 whether the control key is used. If the flag 1 is "1" (the control key is used), the procedure goes to a step S108. If the flag 1 is "0", the procedure goes to a step S103.

At the step S103 and a step S104, it is determined based on the flag 2 which one of the work steps is selected. As noted above, the flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S105, a step S106, and a step S107, respectively.

At the step S105, the starting dates and the finishing dates of all the work steps stored in the work-period table 18 are brought forward.

At the step S106, the starting dates and the finishing dates of the selected work step and the following work steps are brought forward, and the finishing date of the preceding work step is brought forward. Here, the starting date of the selected work step cannot be brought further forward than the starting date of the preceding work step. This is carried out by restricting the cursor movement such that the cursor cannot be brought further forward than the starting date of the preceding work step. The restriction on the cursor movement is employed in the following modification as well.

At the step S107, the starting date and the finishing date of the selected work step are brought forward, and, also, the finishing date of the preceding work step is brought forward. (Here, the starting date of the selected work step cannot be brought further forward than the starting date of the preceding work step.)

At the step S108 and step S109, it is determined based on the flag 2 which one of the work steps is selected. The flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S110, a step S111, and a step S112, respectively.

At the step S110, the starting date of the selected work step is brought forward in the work-period table 18.

At the step S111, the starting date of the selected work step and the finishing date of the preceding work step are brought forward in the work-period table 18. (Here, the starting date of the selected work step cannot be brought further forward than the starting date of the preceding work step.)

At the step S112, the starting date of the selected work step and the finishing date of the preceding work step are brought forward in the work-period table 18. (Here, the starting date of the selected work step cannot be brought further forward than the starting date of the preceding work step.)

Figure 17:
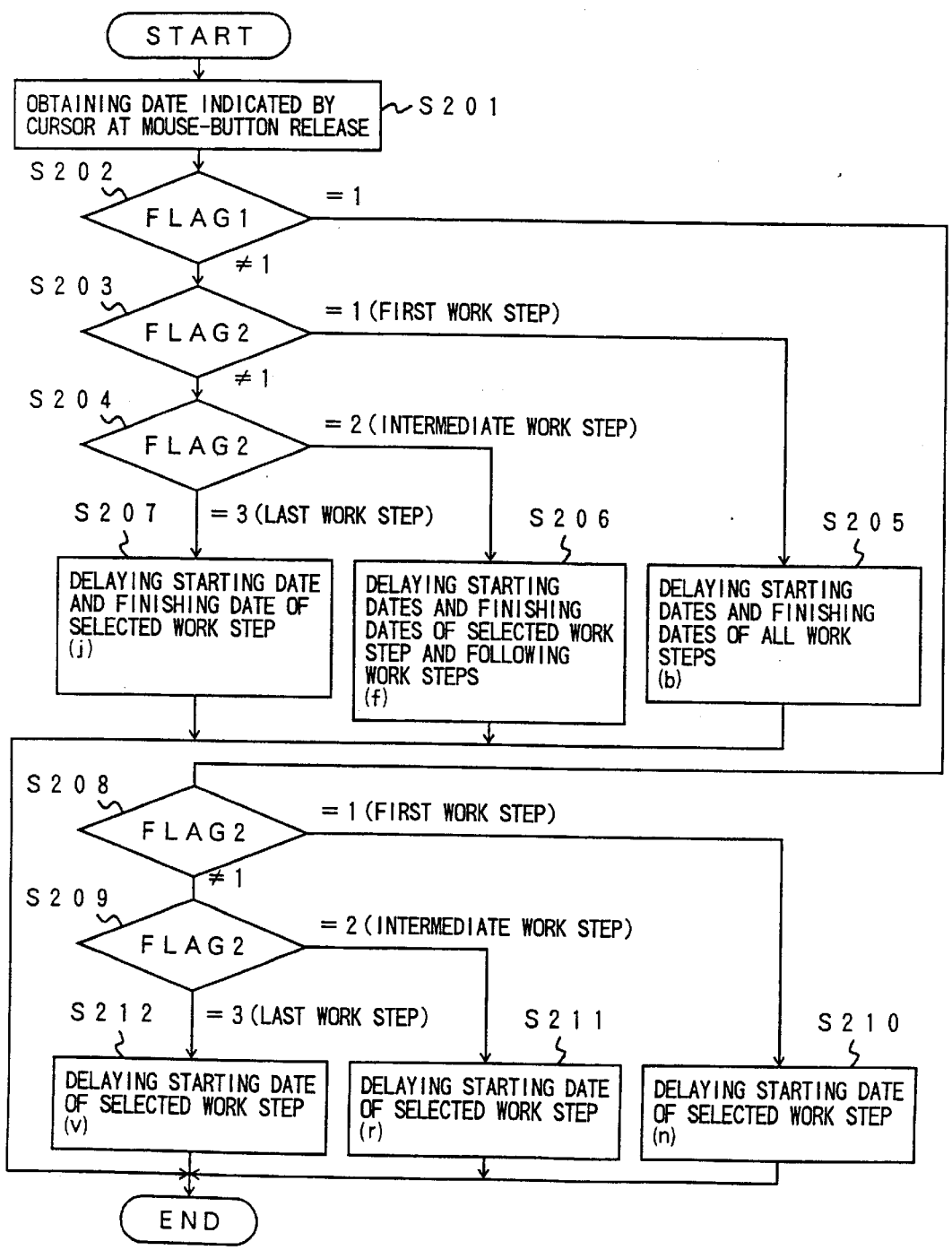
FIG. 17 is a flowchart of the work-period-modification processing for a modification by which a starting date is delayed.

FIG. 17 shows a flowchart of the work-period-modification processing when the starting date is delayed.

In FIG. 17, at a step S201, a date being indicated by the cursor when the mouse button is released is obtained. At a step S202, a check is made by using the flag 1 whether the control key is used. If flag 1 is "1" (the control key is used), the procedure goes to a step S208. If the flag 1 is "0", the procedure goes to a step S203.

At the step S203 and a step S204, it is determined based on the flag 2 which one of the work steps is selected. As noted above, the flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S205, a step S206, and a step S207, respectively.

At the step S205, the starting dates and the finishing dates of all the work steps stored in the work-period table 18 are delayed. (The starting dates are delayed while the periods are kept constant.)

At the step S206, the starting dates and the finishing dates of all the selected work step and the following work steps are delayed. (The starting dates are delayed while the periods are kept constant.)

At the step S207, the starting date and the finishing date of the selected work step are delayed. (The starting date is delayed while the period is kept constant.)

At the step S208 and a step S209, it is determined based on the flag 2 which one of the work steps is selected. The flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S210, a step S211, and a step S212, respectively.

At the step S210, the starting date of the selected work step is delayed in the work-period table 18. (The starting date of the selected work step cannot be later than the finishing date of the selected work step.)

At the step S211, the starting date of the selected work step is delayed in the work-period table 18. (The starting date of the selected work step cannot be later than the finishing date of the selected work step.)

At the step S212, the starting date of the selected work step is delayed in the work-period table 18. (The starting date of the selected work step cannot be later than the finishing date of the selected work step.)

Figure 18:
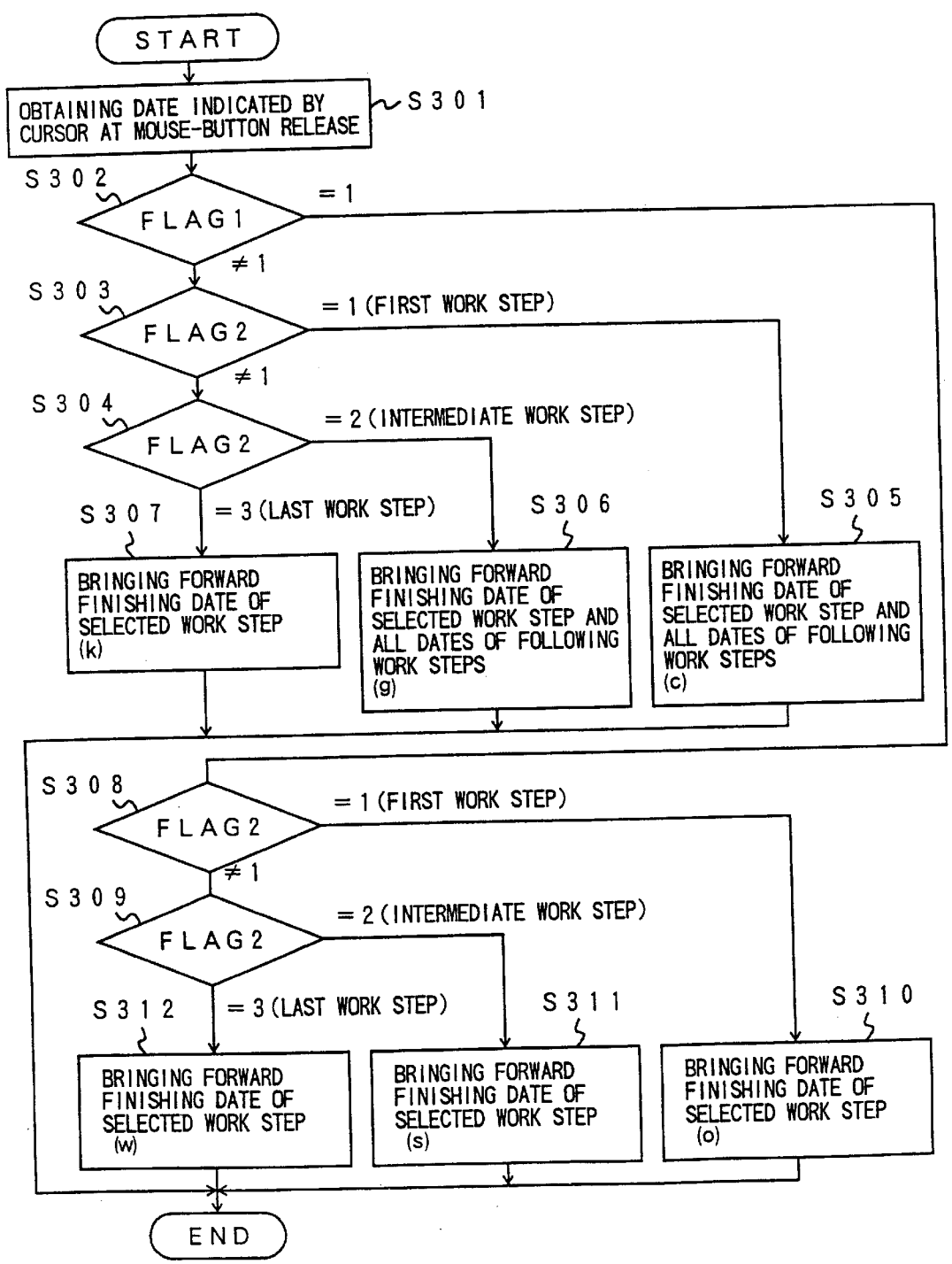
FIG. 18 is a flowchart of the work-period-modification processing for a modification by which a finishing date is brought forward.

FIG. 18 shows a flowchart of the work-period-modification processing when the finishing date is brought forward.

In FIG. 18, at a step S301, a date being indicated by the cursor when the mouse button is released is obtained. At a step S302, a check is made by using the flag 1 whether the control key is used. If the flag 1 is "1" (the control key is used), the procedure goes to a step S308. If the flag 1 is "0", the procedure goes to a step S303.

At the step S303 and a step S304, it is determined based on the flag 2 which one of the work steps is selected. As noted above, the flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S305, a step S306, and a step S307, respectively.

At the step S305, the finishing date of the selected work step and all the dates of the following work steps stored in the work-period table 18 are brought forward. (Here, the finishing date of the selected work step cannot be brought further forward than the starting date of the selected work step.)

At the step S306, the finishing date of the selected work step and all the dates of the following work steps stored in the work-period table 18 are brought forward. (Here, the finishing date of the selected work step cannot be brought further forward than the starting date of the selected work step.)

At the step S307, the finishing date of the selected work step is brought forward. (Here, the finishing date of the selected work step cannot be brought further forward than the starting date of the selected work step.)

At the step S308 and a step S309, it is determined based on the flag 2 which one of the work steps is selected. The flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S310, a step S311, and a step S312, respectively.

At the step S310, the finishing date of the selected work step is brought forward in the work-period table 18. (Here, the finishing date of the selected work step cannot be brought further forward than the starting date of the selected work step.)

At the step S311, the finishing date of the selected work step is brought forward in the work-period table 18. (Here, the finishing date of the selected work step cannot be brought further forward than the starting date of the selected work step.)

At the step S312, the finishing date of the selected work step is brought forward in the work-period table 18. (Here, the finishing date of the selected work step cannot be brought further forward than the starting date of the selected work step.)

Figure 19:
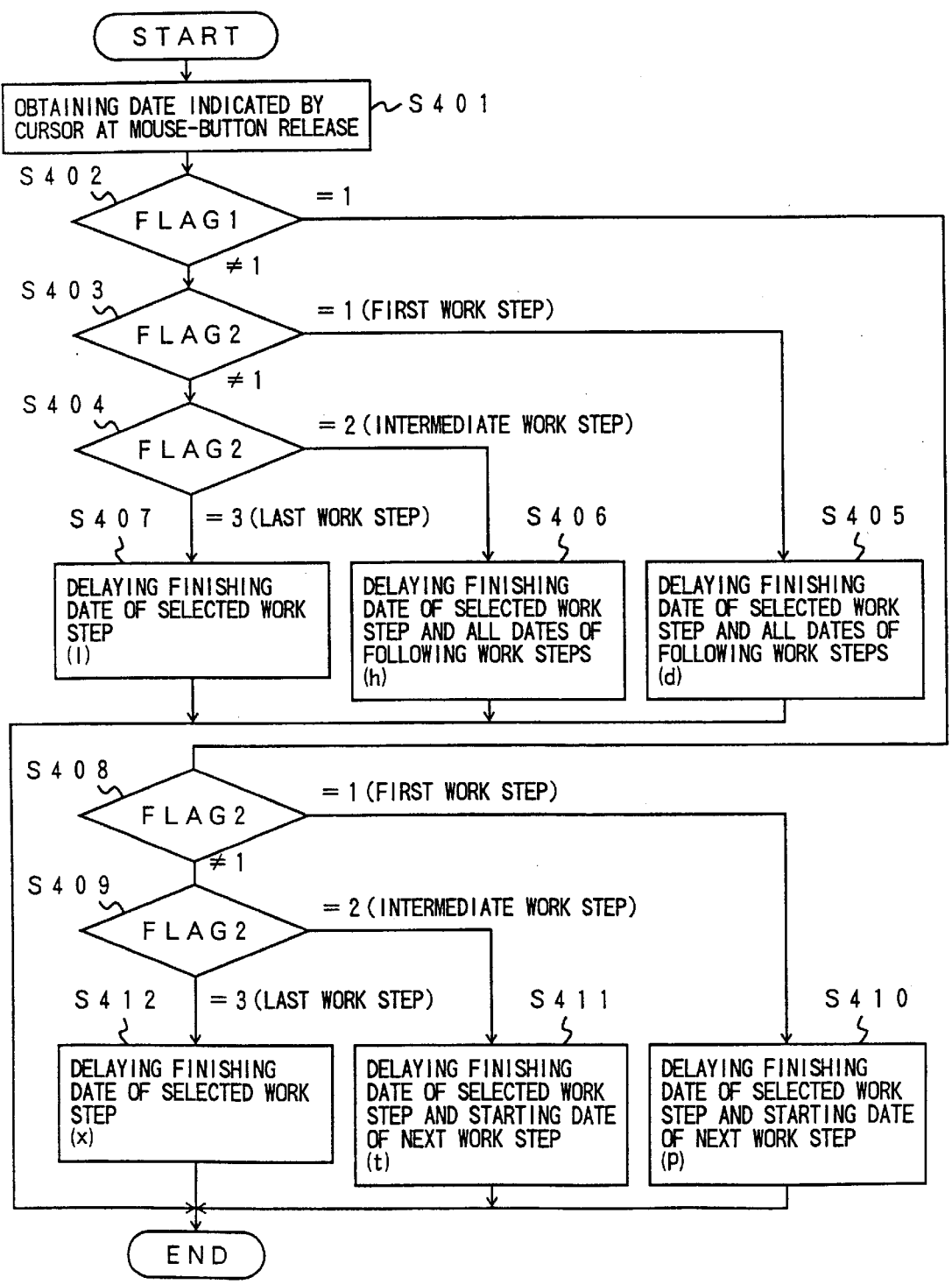
FIG. 19 is a flowchart of the work-period-modification processing for a modification by which a finishing date is delayed.

FIG. 19 shows a flowchart of the work-period-modification processing when the finishing date is delayed.

In FIG. 19, at a step S401, a date being indicated by the cursor when the mouse button is released is obtained. At a step S402, a check is made by using the flag 1 whether the control key is used. If the flag 1 is "1" (the control key is used), the procedure goes to a step S408. If the flag is "0", the procedure goes to a step S403.

At the step S403 and a step S404, it is determined based on the flag 2 which one of the work steps is selected. As noted above, the flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S405, a step S406, and a step S407, respectively.

At the step S405, the finishing date of the selected work step and all the dates of the following work steps stored in the work-period table 18 are delayed.

At the step S406, the finishing date of the selected work step and all the dates of the following work steps stored in the work-period table 18 are delayed.

At the step S407, the finishing date of the selected work step stored in the work-period table 18 is delayed.

At the step S408 and a step S409, it is determined based on the flag 2 which one of the work steps is selected. The flag 2 being "1" indicates the selection of the first work step, the flag 2 being "2" indicates the selection of an intermediate work step, and the flag 2 being "3" indicates the selection of the last work step. The flag 2 being "1", "2", and "3" correspond to a step S410, a step S411, and a step S412, respectively.

At the step S410, the finishing date of the selected work step and the starting date of the next work step are delayed in the work-period table 18. (Here, the finishing date of the selected work step cannot be later than the starting date of the next work step.)

At the step S411, the finishing date of the selected work step and the starting date of the next work step are delayed in the work-period table 18. (Here, the finishing date of the selected work step cannot be later than the starting date of the next work step.)

At the step S412, the finishing date of the selected work step is delayed in the work-period table 18.

In the second embodiment described above, the types of the work-period-modification processing are selected by using the control key. However, the use of a menu display, for example, can perform the same function as well by selecting one of the modification modes from a plurality of the modification modes.

Figure 20A:
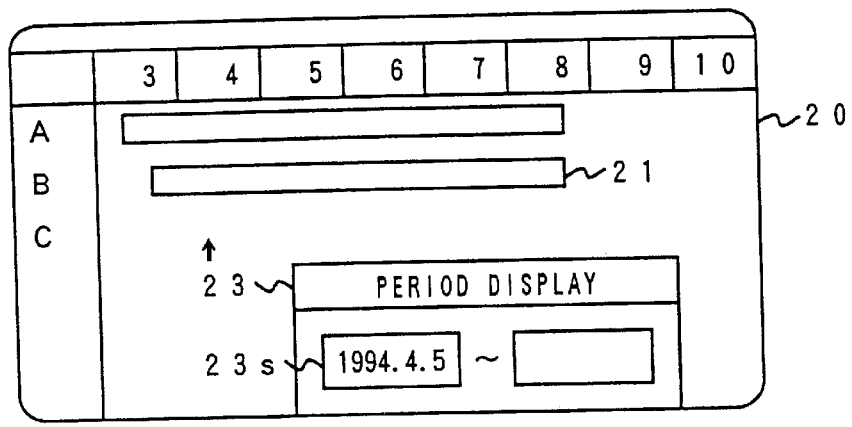
FIGS. 20A through 20C are illustrative drawings for explaining data-conversion processing and period-display processing.
Figure 20B:
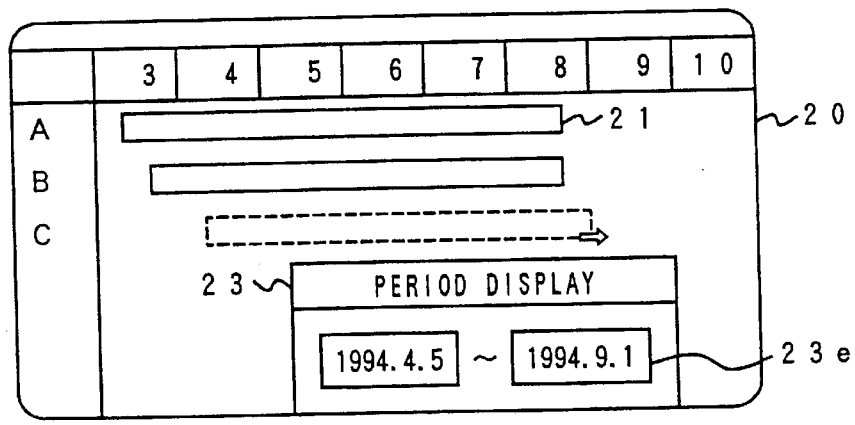
Figure 20C:
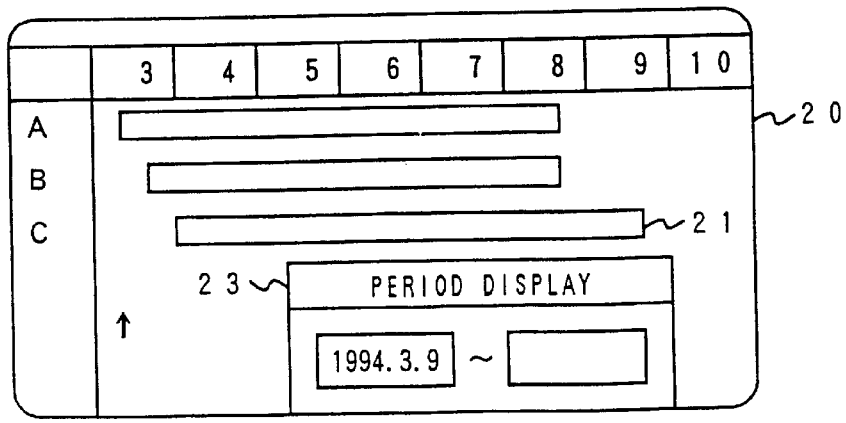

A third embodiment of the first principle of the present invention concerns the date-conversion processing and the period-display processing. FIGS. 20A through 20C show illustrative drawings for explaining the date-conversion processing and the period-display processing.

As shown in FIG. 20A, when the cursor is positioned in the area for the Gantt chart 20, display coordinates of the cursor position are converted into a date, which is displayed in a period-display window 23. Thus, when the cursor is moved to a point for starting the schedule bar 21, the starting date of the schedule bar 21 is shown in the period-display window 23. A starting date 23s shown in the period-display window 23 changes as the cursor moves according to mouse manipulation. Pressing the mouse button will set the starting date 23s in the period-display window 23.

As shown in FIG. 20B, the cursor is moved to the end point of the schedule bar 21 while the mouse button is pressed down. A finishing date 23e of the period-display window 23 shows a date which is converted from the current cursor coordinates. In the same manner as in the above, the finishing date 23e changes as the cursor moves according to mouse manipulation. Releasing the mouse button will create the schedule bar 21.

As shown in FIG. 20C, when the schedule bar 21 is created, the starting date 23s of the period-display window 23 is released from the lock, and shows a date corresponding to the current cursor coordinates. At the same time, the finishing date 23e of the period-display window 23 is cleared. In other words, the period-display window 23 returns to its original state. That is, the position of the cursor on the display is converted to a date, which is displayed in the period-display window 23.

Figure 21:
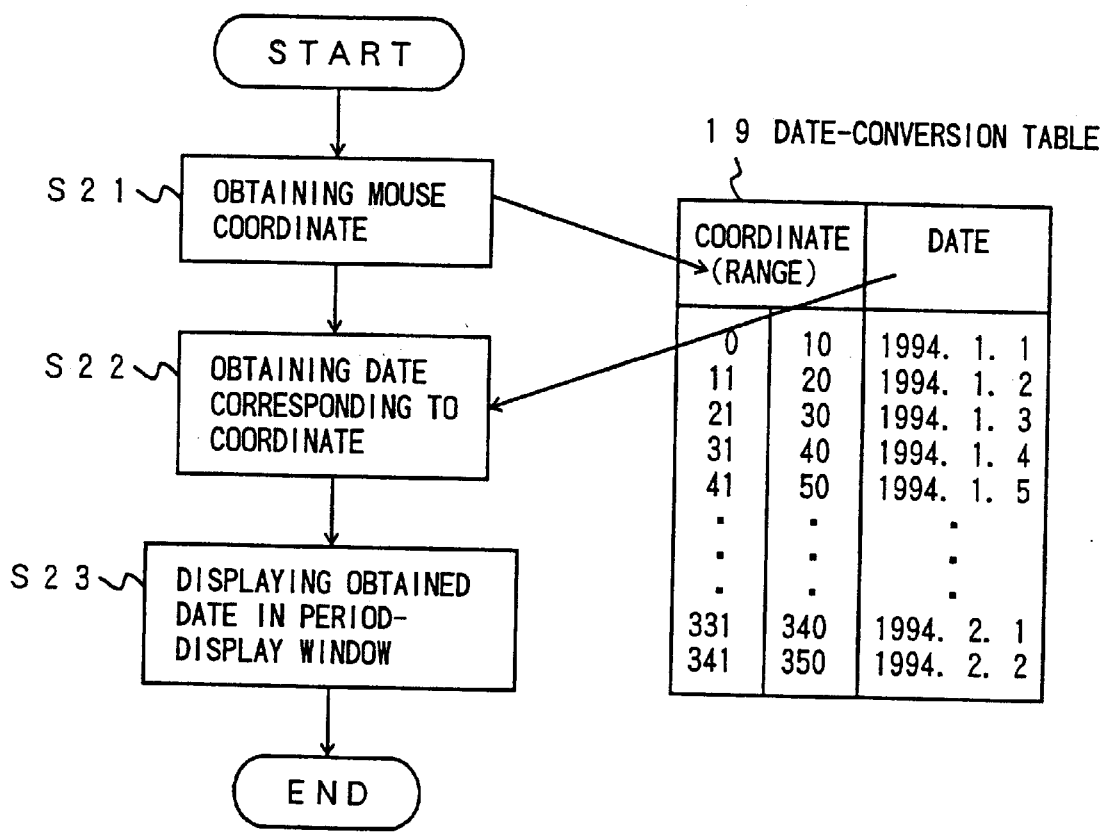
FIG. 21 is a flowchart of the date-conversion processing and the period-display processing.

FIG. 21 shows a flowchart of the date-conversion processing and the period-display processing.

At a step S21, the mouse coordinates are obtained. At a step S22, a date which corresponds to the obtained mouse coordinates is obtained from the date-conversion table 19. Here, the date-conversion table 19 stores horizontal coordinates in the area for the Gantt chart 20 and corresponding dates. At a step S23, the obtained date is displayed in the period-display window 23. This ends the procedure. Here, whether to display the starting date or the finishing date is automatically determined based on the progress of the schedule bar generation.

Figure 22:
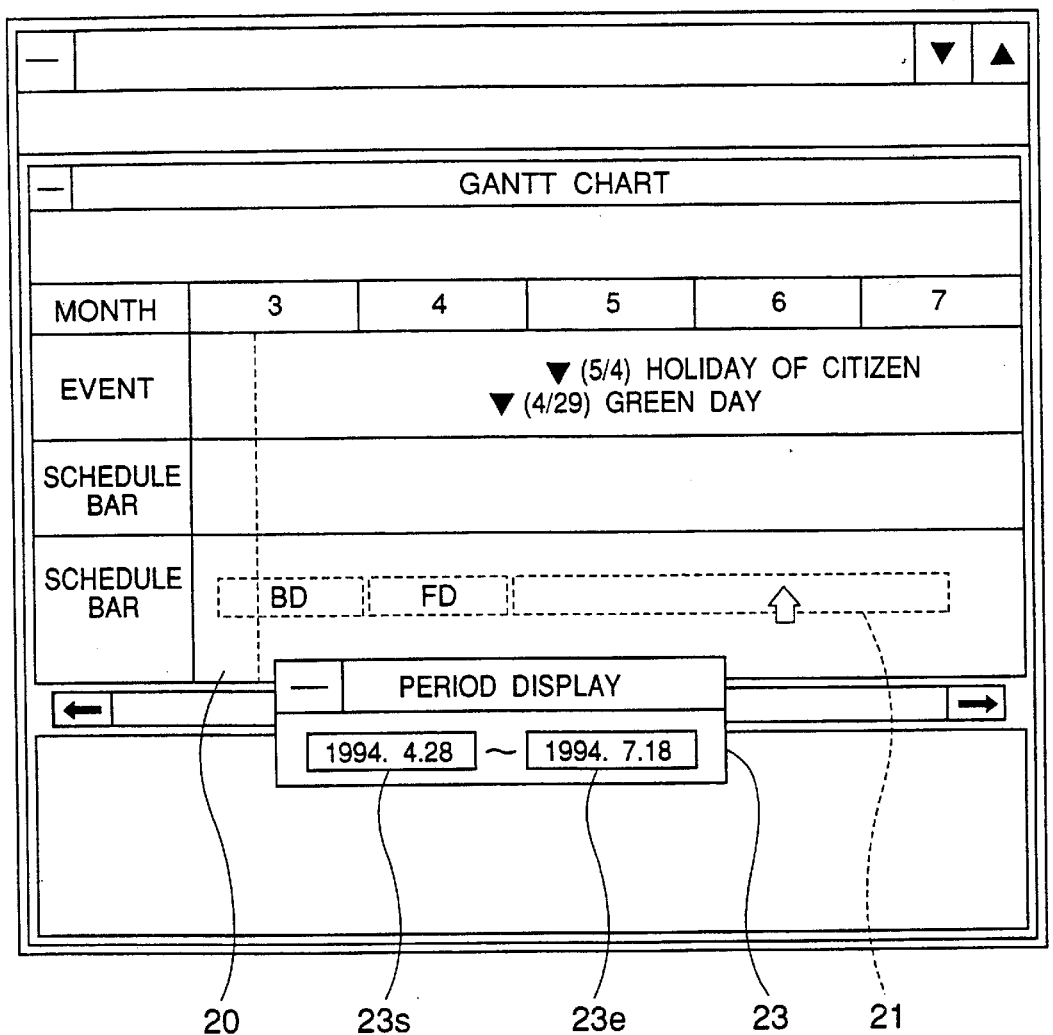
FIG. 22 is an illustrative drawing showing an example of a display of the Gantt chart.
Figure 23:
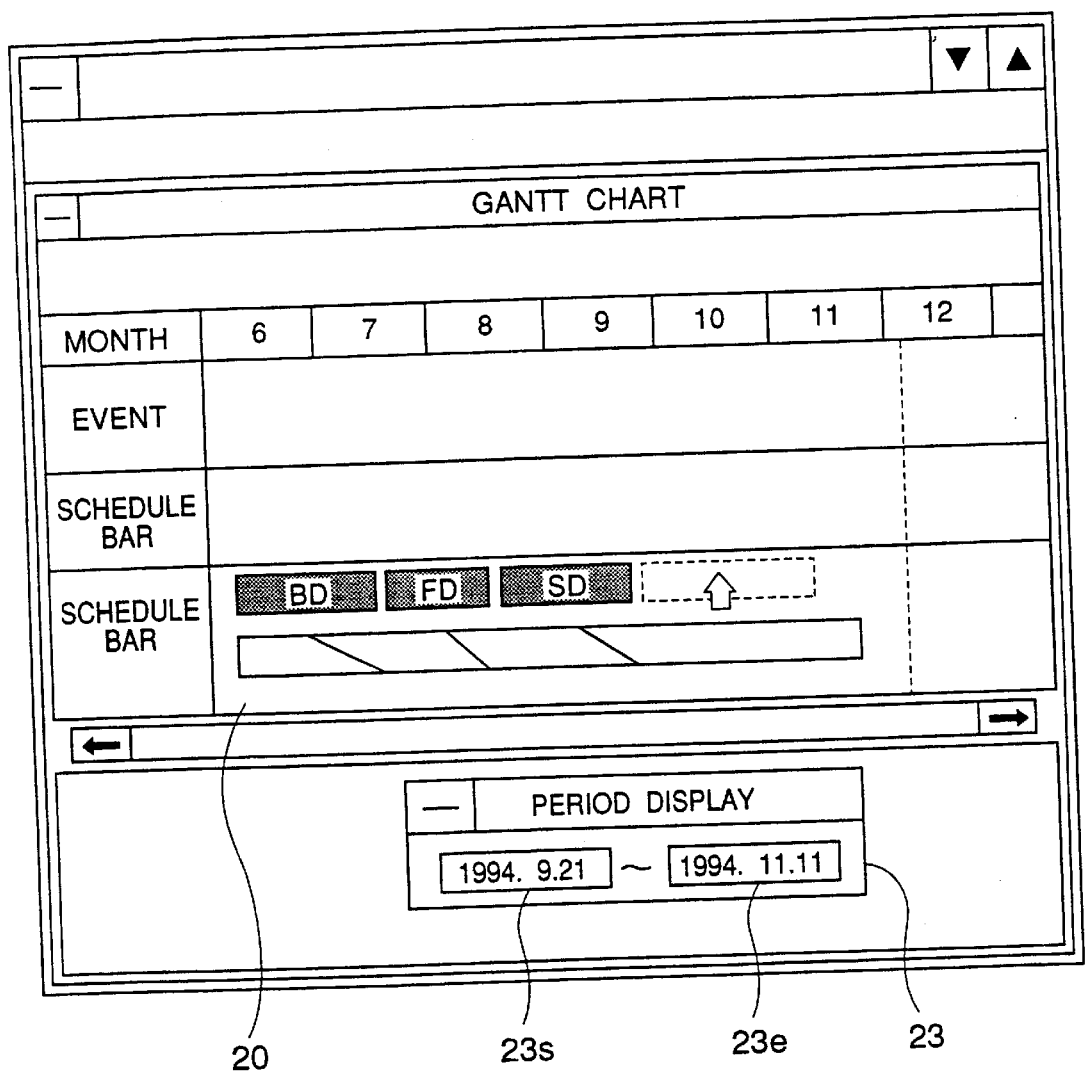
FIG. 23 is an illustrative drawing showing another example of a display of the Gantt chart.

FIG. 22 and FIG. 23 show examples of a display showing the Gantt chart. FIG. 22 shows an example of a display on which the Gantt chart is being created by dividing the schedule bar. FIG. 23 shows an example of a display on which a period of a work step is being modified.

In FIG. 22 and FIG. 23, the period-display window 23 is displayed when the area for the Gantt chart 20 is pointed at by the pointing device such as the mouse or cursor shift keys. When the schedule bar 21 which has already been created is pointed at by the pointing device, the starting date and the finishing date of the schedule bar 21 is displayed as the starting date 23s and the finishing date 23e of the period-display window 23. When any point outside the schedule bar 21 is pointed at, a date corresponding to a cursor position is shown in the period-display window 23 as the starting date 23s, which changes as the cursor position moves.

In FIG. 22, the third work step is pointed at by the cursor while the schedule bar 21 is divided. Here, the starting date and the finishing date of the third work step are displayed in the period-display window 23, and the third work step is about to be divided. In FIG. 23, the fourth work step is pointed at in order to modify the period thereof, and the period-display window 23 shows the starting date and finishing date of the fourth work step.

As described above, according to the first principle of the present invention, the Gantt chart can be created fast in a simple manner. Also, the operator can modify the Gantt chart by taking only a few steps while looking the Gantt chart displayed on the display. Furthermore, a point indicated by the pointing device such as the mouse is converted into a date which is displayed on the display, so that an accurate indication of a date is made possible.

Figure 24:
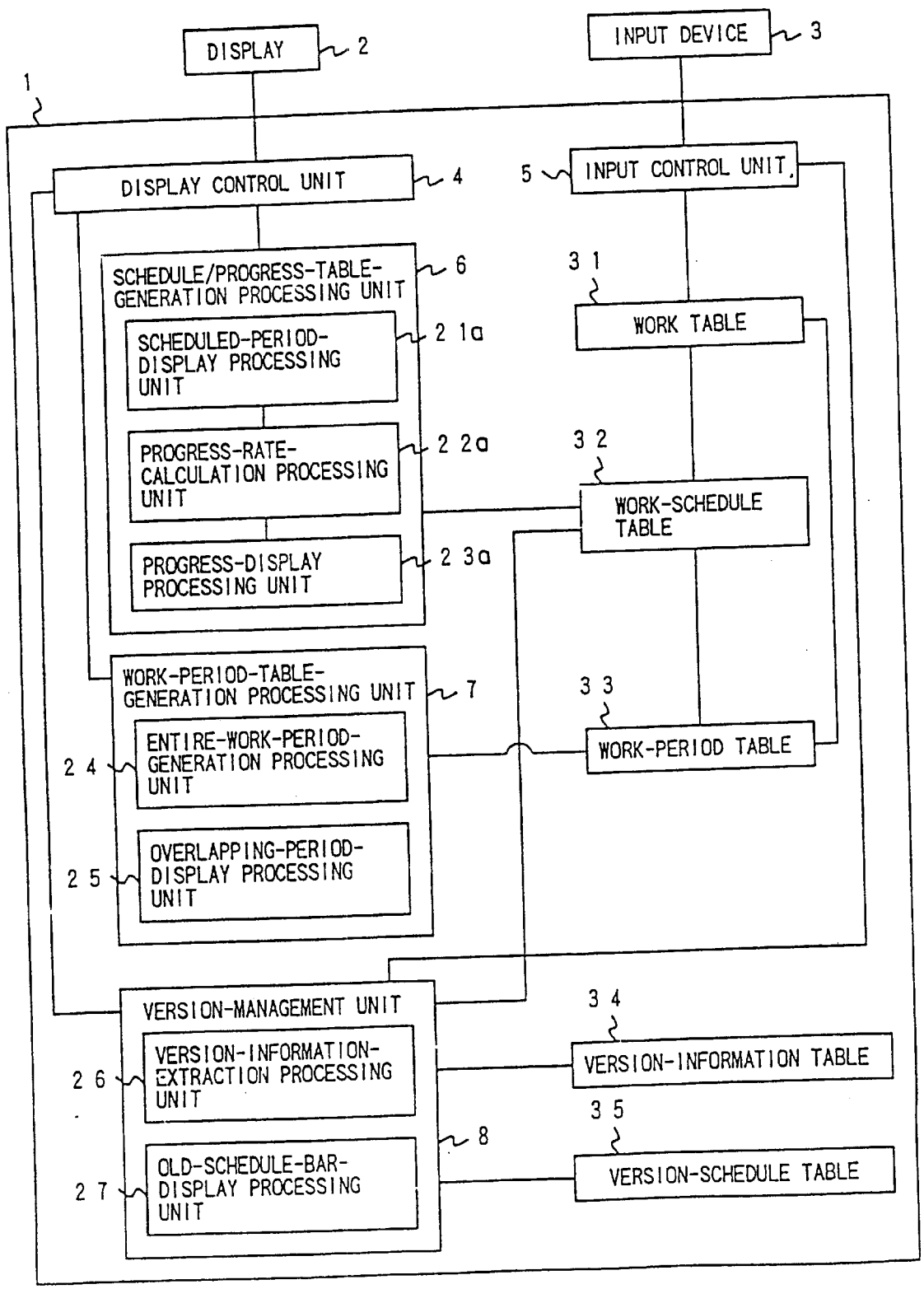
FIG. 24 is a block diagram of a second principle of the present invention.

FIG. 24 shows a block diagram of a second principle of the present invention.

In FIG. 24, the processing device 1 comprised of the CPU (central processing unit) and the memories is connected to the display 2 and the input device 3 such as the keyboard and the mouse.

The processing device 1 includes a display control unit 4 for controlling the display 2, and an input control unit 5 for controlling the input device 3. The processing device 1 further includes a schedule/progress-table-generation processing unit 6, a work-period-table-generation processing unit 7, a version-management unit 8, a work table 31 for storing work-progress information and the like, a work-schedule table 32 for storing management information for the work steps, a work-period table 33 for storing a work period of each work step, a version-information table 34 for storing information regarding changes made on the work steps, and a version-schedule table 35 used for restoring old Gantt charts. The schedule/progress-table-generation processing unit 6 includes a scheduled-period-display processing unit 21a, a progress-rate-calculation processing unit 22a, and an progress-display processing unit 23a. The work-period-table-generation processing unit 7 includes an entire-work-period-generation processing unit 24 and an overlapping-period-display processing unit 25. The version-management unit 8 includes a version-information-extraction processing unit 26 and an old-schedule-bar-display processing unit 27.

The schedule/progress-table-generation processing unit 6 generates a Gantt chart showing a scheduled period and a progress for each work step by using the scheduled-period-display processing unit 21a, the progress-rate-calculation processing unit 22a, and the progress-display processing unit 23a. Then, the display control unit 4 displays the Gantt chart on the display 2. The scheduled-period-display processing unit 21a is used for generating a rectangular schedule bar which shows a scheduled period for each work step. The progress-rate-calculation processing unit 22a calculates a progress of the work step based on information on work progress. Based on the calculation, the progress-display processing unit 23a shows the progress of the work step by coloring or creating a bright luminance on a portion of the rectangular schedule bar.

The work-period-table-generation processing unit 7 displays a plurality of overlapping work steps in a single rectangular schedule bar by using the entire-work-period-generation processing unit 24 and the overlapping-period-display processing unit 25. Here, the entire-work-period-generation processing unit 24 is used for editing a display to use a single rectangle for representing a whole process which is comprised of a plurality of overlapping work steps. The overlapping-period-display processing unit 25 is used for displaying each of the overlapping work steps in the single rectangle representing the whole process, such that the overlapping portion of the work steps can be clearly seen on the display 2.

The version-management unit 8 is comprised of the version-information-extraction processing unit 26 and the old-schedule-bar-display processing unit 27. The version-management unit 8 keeps track of the versions of the Gantt charts based on the work-schedule table 32 and the work-period table 33, and, also, displays a selected old schedule bar on the display 2. The work-schedule table 32 is memory means for storing the starting dates and the finishing dates of the work steps. The version-information-extraction processing unit 26 analyzes the work-schedule table 32 when a work step is modified, and extracts information on the modification. The information on the modification is stored into the version-information table 34. The old-schedule-bar-display processing unit 27 displays an old schedule bar after generating and editing the version-schedule table 35 based on the work-schedule table 32 and the version-information table 34. Here, the version-schedule table 35 is equivalent to the work-schedule table 32, but is provided for old Gantt charts.

In the second principle of the present invention, a cooperation between the units within the work-period-table-generation processing unit 7 enables a display of the plurality of overlapping work steps by the single rectangular schedule bar. Thus, an area required for the display of the work steps can be compact, and, at the same time, the display of the work steps is clearer. Furthermore, a cooperation between the units within version-management unit 8 makes it possible to display an old Gantt chart with an up-to-date Gantt chart. Thus, modifications made on the Gantt charts are easily confirmed.

In the following, embodiments of the second principle of the present invention will be described. FIG. 25 shows an example of a Gantt chart shown on the display 2. In FIG. 25, the Gantt chart includes a schedule/progress bar 41, a work-period bar 42, and an old schedule bar 43.

The schedule/progress bar 41 shows scheduled work steps (third version in FIG. 25) and a current progress of the work steps. The progress of the work steps is shown by coloring or creating a brighter luminance on a portion of the bar. The work-period bar 42 is the rectangular schedule bar which displays a plurality of the overlapping work steps. The old schedule bar 43 shows an old version (first version in FIG. 25) of the schedule bar which is created based on the version information.

Figure 26B:
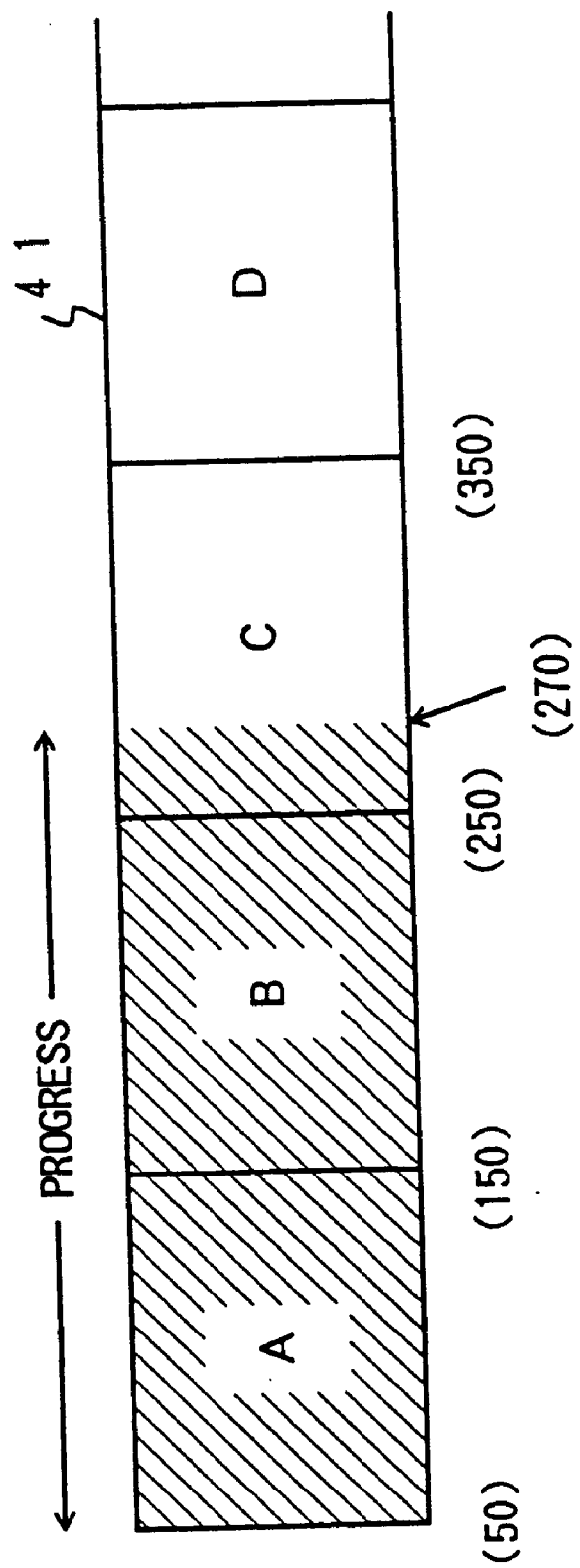

A first embodiment of the second principle concerns the schedule/progress-table-generation processing. FIGS. 26A and 26B shows an illustrative drawing for explaining the schedule/progress-table-generation processing.

The work-schedule table 32 shown on the top of FIG. 26A contains for each work step a work-step name, a starting date, and a finishing date. The work-schedule table 32 also contains a starting horizontal coordinate and an end horizontal coordinate of each work step on the display, a progress rate, and a starting horizontal coordinate and an end horizontal coordinate of the progress on the display.

The work table 31 shown at the bottom of FIG. 26A contains a work-step name, a task name, a schedule, and a progress for each of the tasks comprising the work steps. The progress rate of the work-schedule table 32 is obtained by adding up the schedules of the tasks having he same work-step name, adding up the progresses of these tasks, and dividing the sum of the progresses by the sum of the schedules. For example, the progress rate of the work step A is obtained by (40+20)/(40+20), and is equal to 1. The progress rate of the work step C is obtained by (10+0)/(30+20), and is equal to 0.2. The progress of each task is stored into the work table 31 by entering a number into the input device 2 while indicating a corresponding task name.

FIG. 26B shows an example of the schedule/progress bar 41 which is obtained based on the information stored in the work-schedule table 32 and the work table 31. The schedule bar is displayed based on the horizontal coordinates of the work steps stored in the work-schedule table 32. The starting horizontal coordinate of the progress of a given work step is the same as the starting horizontal coordinate of the given work step. The end horizontal coordinate of the progress is given by "(the end horizontal coordinate of the work step–the starting horizontal coordinate of the work step)×the progress rate+the starting horizontal coordinate of the work step".

Figure 27:
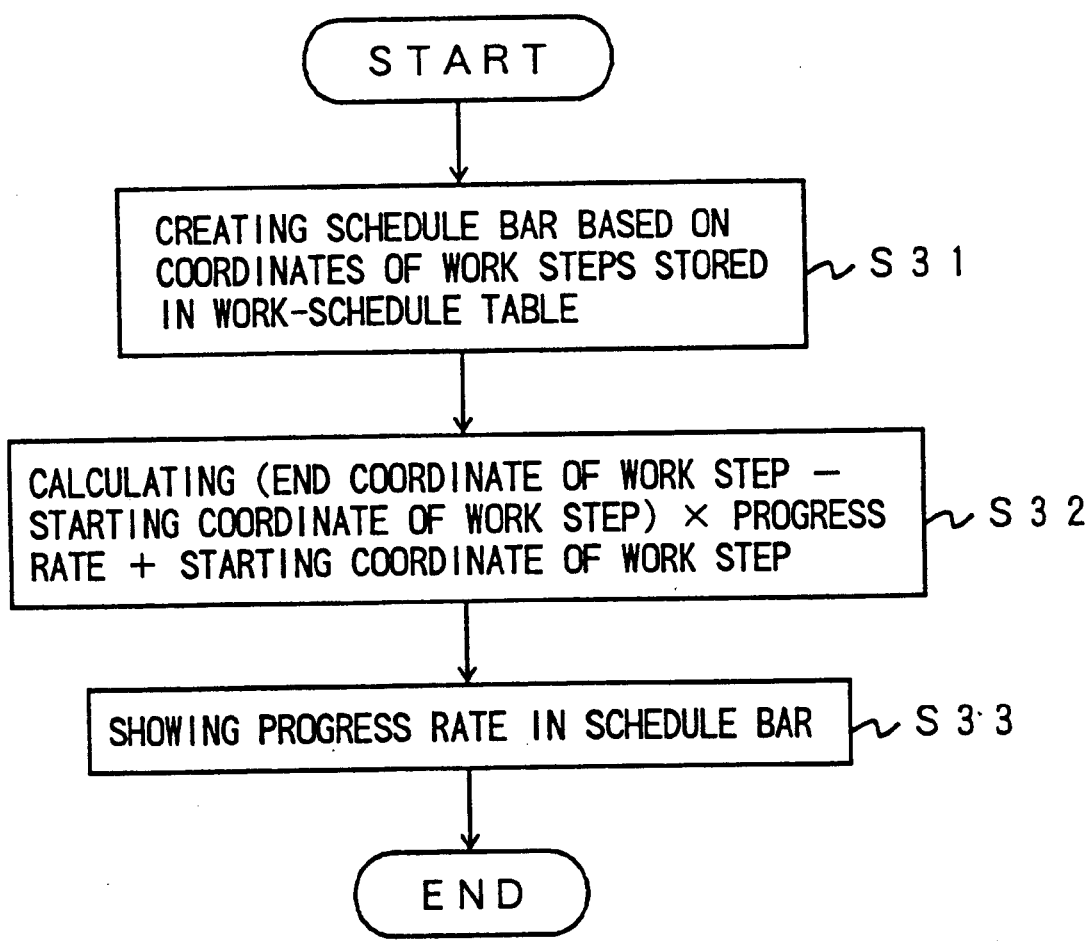
FIG. 27 is a flowchart of the schedule/progress-bar-generation processing.

FIG. 27 shows a flowchart of the schedule/progress-table-generation processing.

At a step S31, the schedule bar is created based on the coordinates of the work steps stored in the work-schedule table 32. At a step S32, "(the end coordinate of the work step–the starting coordinate of the work step)×the progress rate+the starting coordinate of the work step" is calculated. At a step S33, the progress rates are shown for the work steps in the schedule bar. In this manner, the schedule/progress bar 41 is created.

Figure 28A:
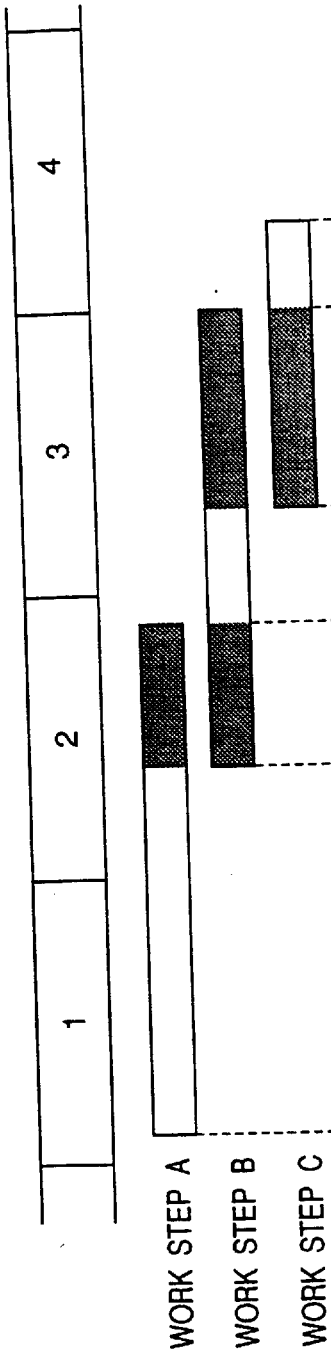
FIGS. 28A through 28C are illustrative drawings for explaining configurations of a work-period bar.
Figure 28B:
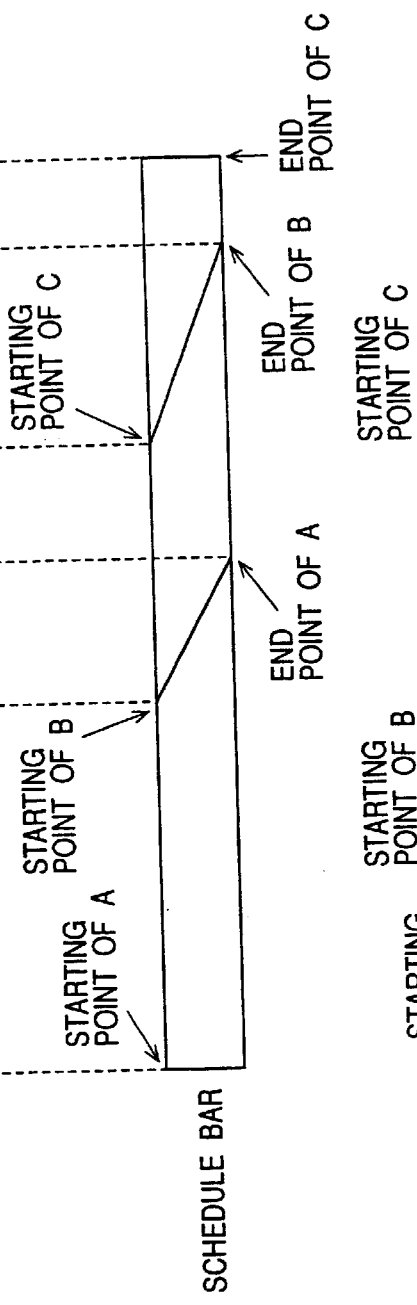
Figure 28C:
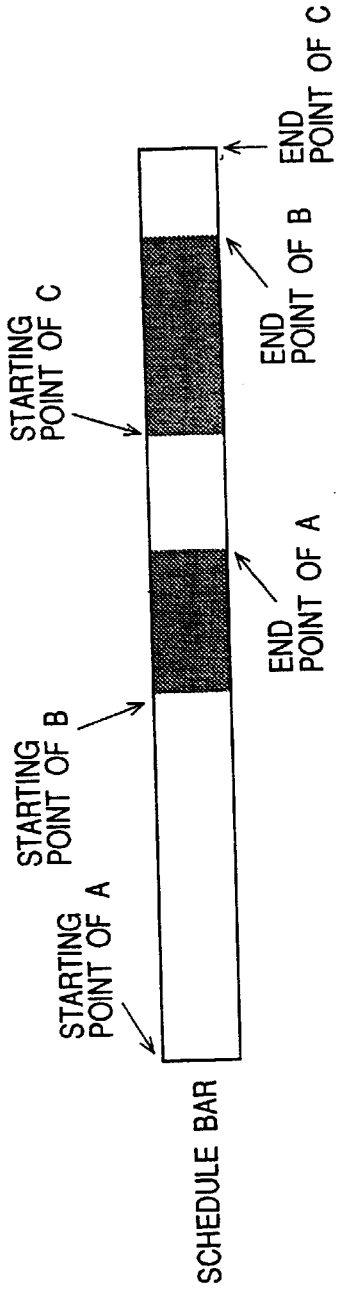

A second embodiment of the second principle of the present invention concerns the work-period-table-generation processing. FIGS. 28A through 28C show illustrative drawings for explaining the work-period-table-generation processing.

FIG. 28A shows overlapping portions of work steps. As shown in the figure, a work step A and a work step B are overlapped with each other, and, also, the work step B and a work step C are overlapped with each other.

FIGS. 28B and 28C show examples in which the three overlapping work steps A, B, and C are displayed by a single rectangular schedule bar. In FIG. 28B, the overlapping portion between the work step A and the work step B is indicated by a diagonal line segment connecting the starting point of the work step B with the end point of the work step A. Also, the overlapping portion between the work step B and the work step C is indicated by a diagonal line segment connecting the starting point of the work step C with the end point of the work step B.

On the other hand, in FIG. 28C, each of the overlapping portions are shown by a different color, screen dots, or the like, so that it can be distinguished from the other portions of the schedule bar.

Figure 29:
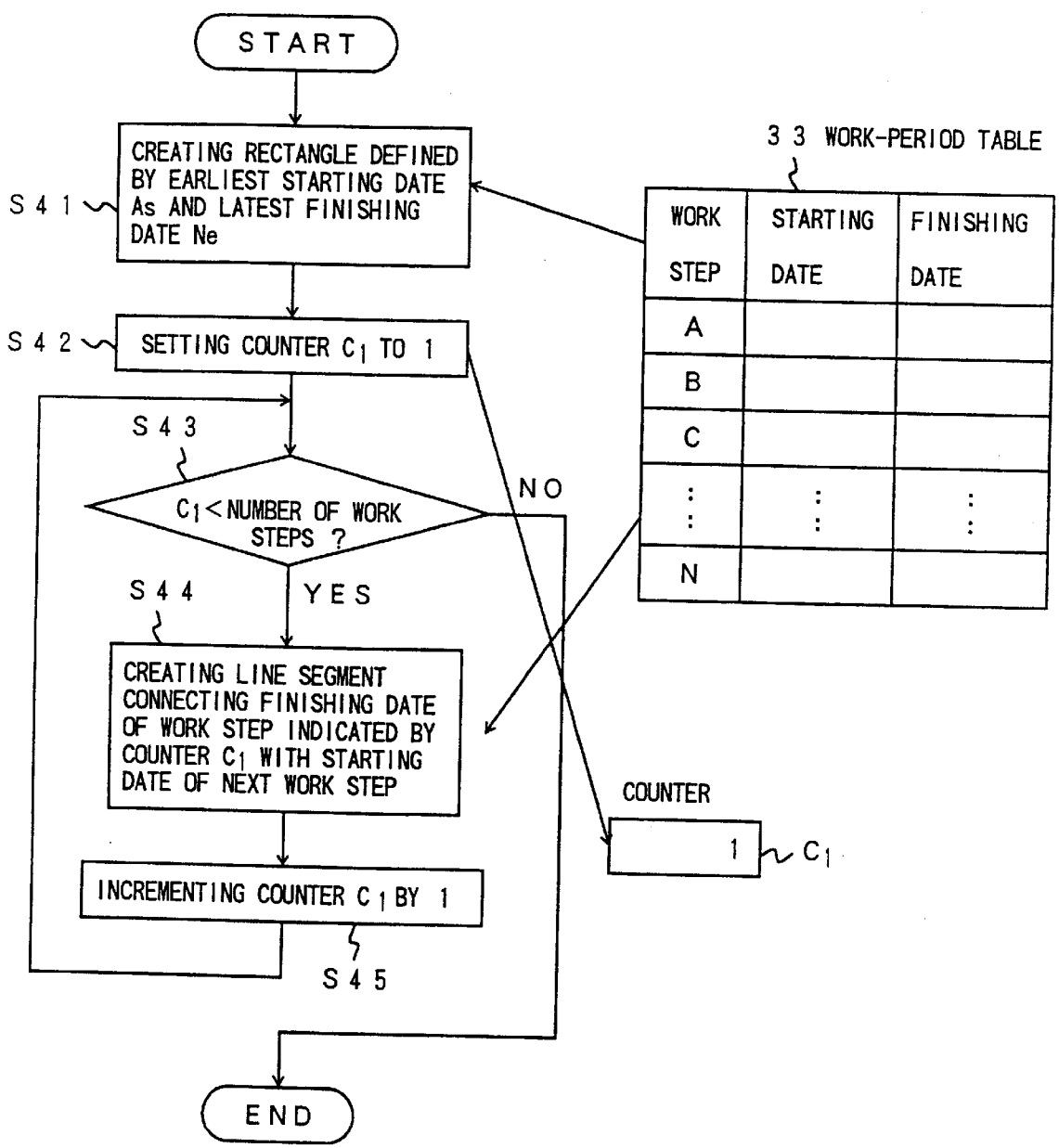
FIG. 29 is a flowchart of the work-period-table-generation processing.

FIG. 29 shows a flowchart of the work-period-table-generation processing. At a step S41, a rectangle which is defined by the earliest starting date As and the latest finishing date Ne stored in the work-period table 33 is created. At a step S42, a counter $C_1$ is set to "1". Here, the counter $C_1$ indicates a record position of each work step in the work-period table 33.

At a step S43, a comparison is made between the content of the counter $C_1$ and the number of the work steps. If the content of the counter $C_1$ is smaller than the number of the work steps, the procedure goes to a step S44. If the content is not smaller than the number, the procedure ends at this point. At the step S44, a finishing date of a work step indicated by the counter $C_1$ is connected by a line segment with a starting date of the next work step. At a step S45, the counter $C_1$ is incremented by 1. Then, the procedure goes back to the step S43 to repeat the steps described above.

FIGS. 30A through 30D show examples of the creation of the work-period bar 42. FIG. 30A shows an example of the work-period table 33.

As shown in FIG. 30B, a rectangle is created so as to stretch between the earliest starting date (starting date of the work step A) and the latest finishing date (finishing date of the work step C). Then, the counter $C_1$ is set to 1, and a comparison is made to decide whether the content of the counter $C_1$ is smaller than the number of the work steps (three in this example). Since the content of the counter $C_1$ is smaller than the number, a line segment is drawn between the finishing date of the work step A, which is indicated by the counter $C_1$, and the starting date of the next work step B. This is shown in FIG. 30C.

Then, the counter $C_1$ is incremented by 1, and, then, compared with the number of the work steps. Since the content of the counter $C_1$ is smaller than the number, a line segment is drawn between the finishing date of the work step B, which is now indicated by the counter $C_1$, and the starting date of the next work step C. This is shown in FIG. 30D.

Then, the counter $C_1$ is incremented by 1, and, then, compared with the number of the work steps. The content of the counter $C_1$, which is now 3, is not smaller than the number of the work steps. Thus, the procedure ends at this point with the completed work-period bar 42.

A third embodiment of the second principle of the present invention concerns the version-management processing and the old-Gantt-chart-generation processing.

FIG. 31 shows an illustrative drawing for explaining the version-management processing. When the schedule for the work steps is modified, information on the modification is stored as follows. By the way, a schedule bar 40 shown in FIG. 31 is the same as the schedule/progress bar 41 shown in FIG. 25, excepting that the schedule bar 40 is not provided with progress rate indications for the sake of clarity of the figure.

In a process shown by an arrow indicated as (1), when the schedule bar is requested to be displayed prior to modification, relevant information is read out from the work-schedule table 32, and the schedule bar 40 is displayed. In a process shown by an arrow indicated as (2), the finishing date of the work step C is changed from Jun. 20, 1994 to Jul. 15, 1994. In a process shown by an arrow indicated as (3), a new work-schedule table 32' is created by changing the date in the work-schedule table 32. In a process shown by an arrow indicated as (4), the new work-schedule table 32' is compared with the work-schedule table 32, and the version-information table 34 is created based on a difference between these two.

Figure 32:
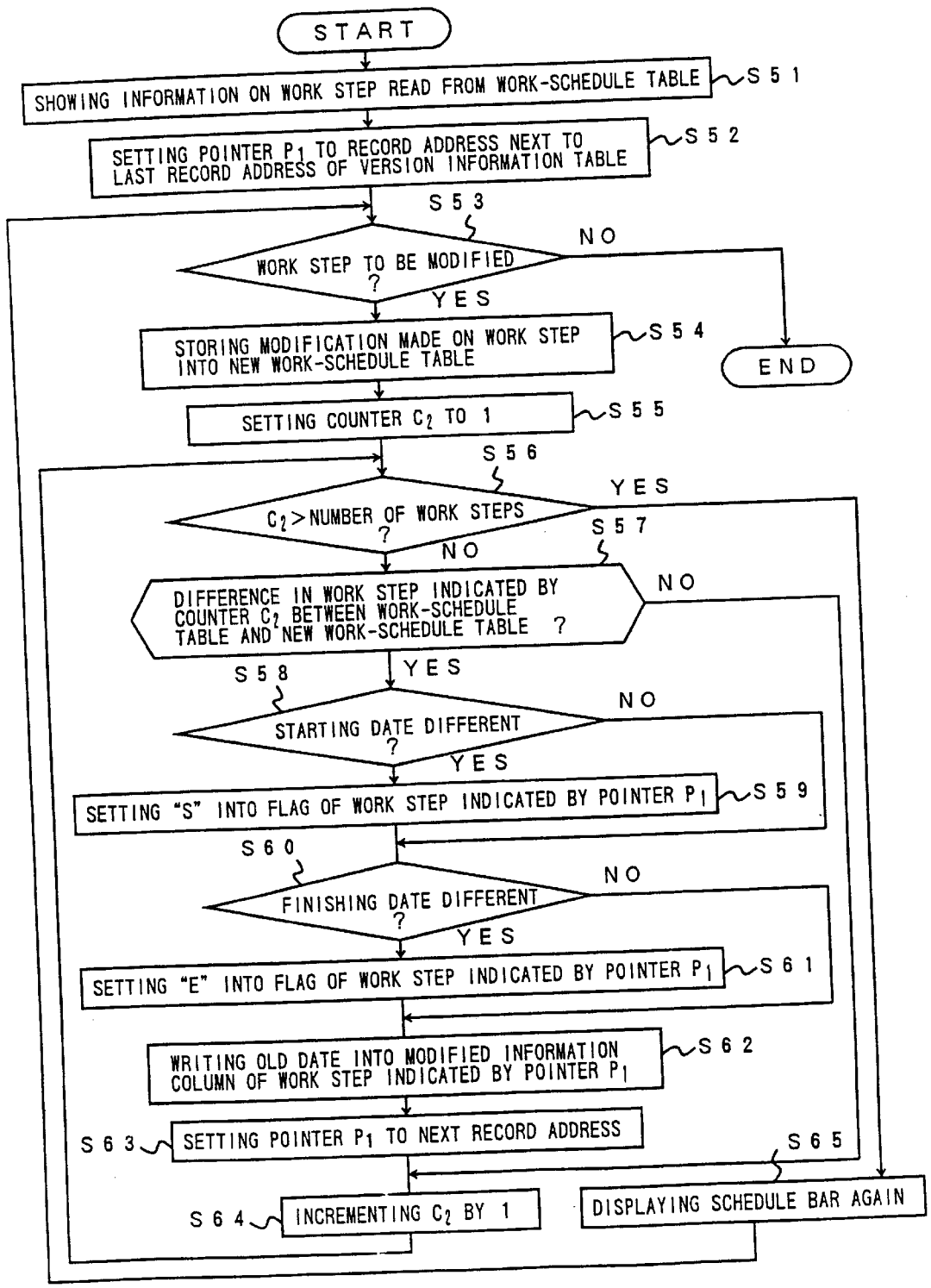
FIG. 32 is a flowchart of the creation of the version-information table.

FIG. 32 shows a flowchart of the version-management processing. FIG. 33 shows an illustrative drawing for complementing an explanation of the flowchart. In FIG. 33, a pointer $P_1$ is a pointer for the version-information table 34, and a counter $C_2$ is used for holding a record position in the work-schedule table 32.

In FIG. 32 with reference FIG. 33, at a step S51, information on the work steps is read out from the work-schedule table 32, and is displayed. At a step S52, a pointer $P_1$ is set to a record address next to the last record address of the version-information table 34.

At a step S53, a check is made whether the work steps are to be modified. If there is no modification, the procedure ends at this point. If there will be a modification, the procedure goes to the step S54.

At the step S54, a modification which is made on the work steps is stored in the new work-schedule table 32'. At a step S55, the counter $C_2$ is set to 1.

At a step S56, a check is made whether the content of the counter $C_2$ is greater than the number of the work steps. If it is greater than the number, the procedure goes to a step S65. If it is not greater than the number, the procedure goes to a step S57.

At the step S57, a check is made whether there is a difference in a work step indicated by the counter $C_2$ between the work-schedule table 32 and the new work-schedule table 32'. If there is a difference, the procedure goes to a step S58. If there is no difference, the procedure goes to a step S64.

At the step S58, it is checked whether the starting date is different. If it is not, the procedure skips a step S59. If it is, at the step S59, a flag of a work step which is indicated by the pointer $P_1$ in the version-information table 34 is set to "S", indicating that the starting date is modified.

At the step S60, it is checked whether the finishing date is different. If it is not, the procedure skips a step S61. If it is, at the step S61, a flag of the work step which is indicated by the pointer $P_1$ in the version-information table 34 is set to "E", indicating that the finishing date is modified.

At a step S62, an old date is written into a modified-information column of the work step which is indicated by the pointer $P_1$ in the version-information table 34. At a step S63, the pointer $P_1$ is set to the next record address.

At the step S64, the counter $C_2$ is incremented by 1. Then, the procedure goes back to the step S56 to repeat the steps described above.

If it turns out at the step S56 that the content of the counter $C_2$ is greater than the number of the work steps, the procedure goes to the step S65. At the step S65, the schedule bar is displayed again. Then, the procedure goes back to the step S53.

Figure 34:
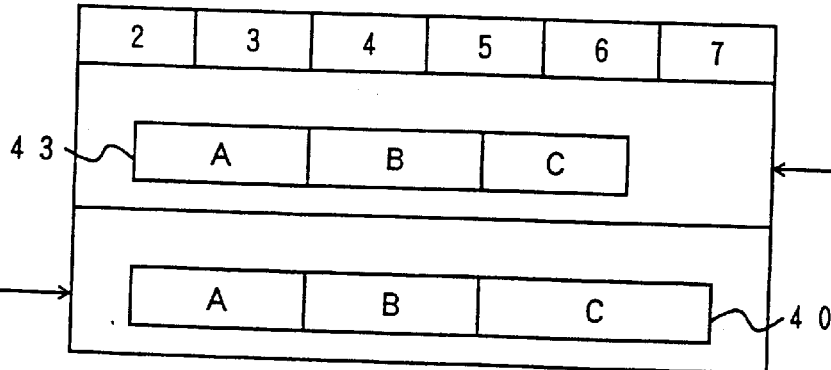
FIG. 34 is an illustrative drawing for explaining a creation of an old schedule bar.

FIG. 34 shows an illustrative drawing for explaining the old-schedule-bar-display processing.

In a process shown by an arrow indicated as (1), the newest work-schedule table 32 is copied to create the version-schedule table 35 used for displaying the old schedule bar. In a process shown by an arrow indicated as (2), the version information is extracted from the version-information table 34. In a process shown by an arrow indicated as (3), the version-schedule table 35 is updated by using the version information. The processes of (2) and (3) are repeated until the version-schedule table 35 becomes a desired one. In a process shown by an arrow indicated as (4), the old schedule bar 43 is created based on the version-schedule table 35. In a process shown by an arrow indicated as (5), the newest schedule bar 40 is created from the work-schedule table 32.

Figure 35:
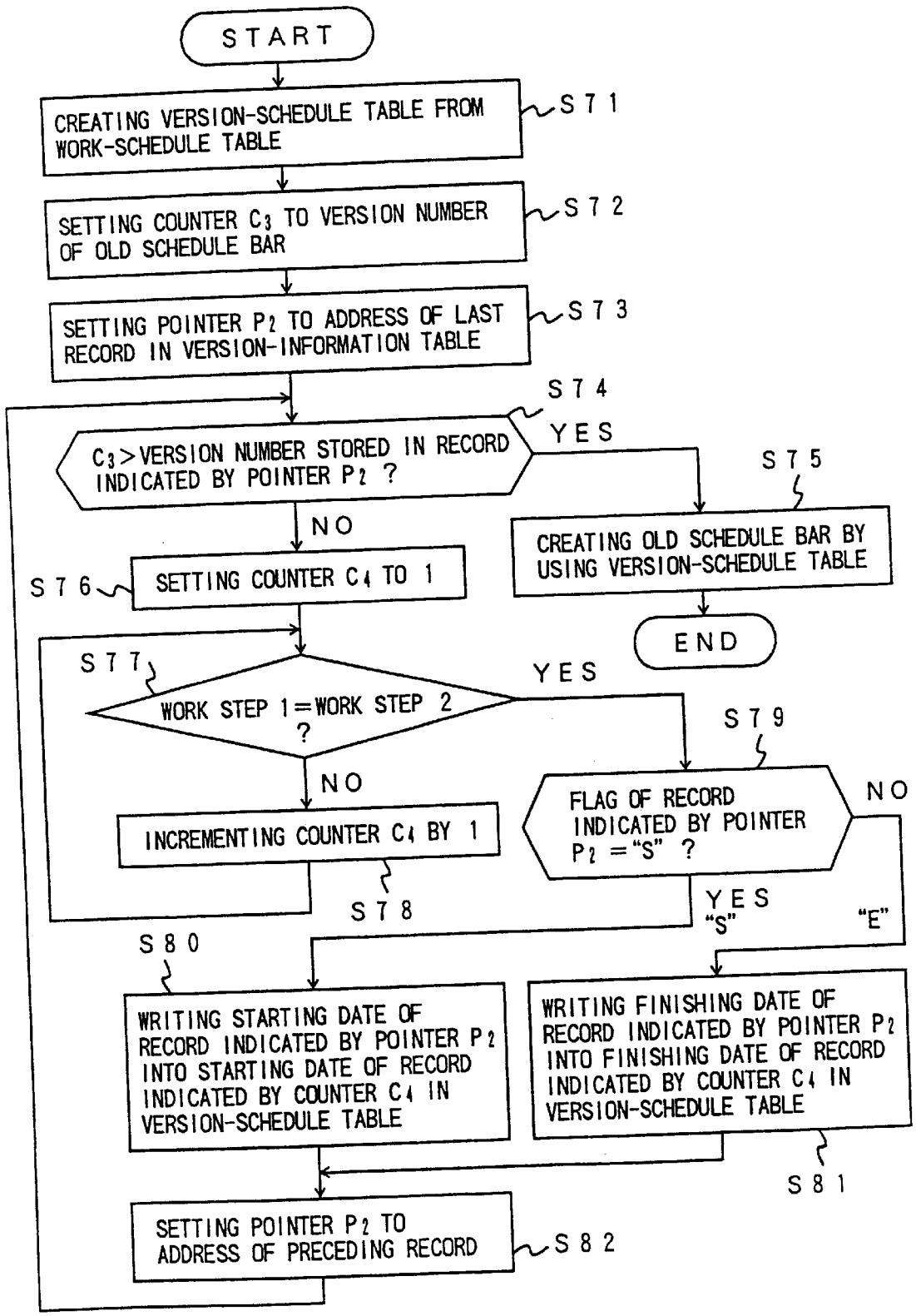
FIG. 35 is a flowchart of the creation of the old schedule bar.

FIG. 35 shows a flowchart of the old-schedule-bar-display processing. FIG. 36 shows an illustrative drawing for complementing an explanation of the flowchart. In FIG. 36, a pointer $P_2$ is a pointer for the version-information table 34, and a counter $C_3$ is used for storing an indicated version number. Also, a counter $C_4$ is used for storing a record position in the version-schedule table 35.

In FIG. 35, with reference to FIG. 36, at a step S71, the version-schedule table 35 is created from the work-schedule table 32. At a step S72, a version number of an old schedule bar to be displayed is set in the counter $C_3$. At a step S73, an address of the last record in the version-information table 34 is set in the pointer $P_2$.

At a step S74, a check is made whether the counter $C_3$ is greater than a version number stored in a record indicated by the pointer $P_2$. If it is greater, the procedure goes to a step S75. If it is not greater, the procedure goes to a step S76.

At the step S75, the old Gantt chart is created by the version-schedule table 35. This ends the procedure.

At the step S76, the counter $C_4$ is set to 1. At a step S77, a check is made whether a work step 1 is the same as a work step 2. Here, the work step 1 is a name of a work step in the version-schedule table 35 which is indicated by the counter $C_4$, and the work step 2 is a name of a work step which is indicated by the pointer $P_2$. If both work steps 1 and 2 are the same, the procedure goes to a step S79. If they are not the same, the procedure goes to a step S78, where the counter $C_4$ is incremented by one before the procedure goes back to the step S77.

At the step S79, a check is made whether the flag of the record indicated by the pointer $P_2$ is "S". If it is "S", the procedure goes to a step S80. If it is not "S", the procedure goes to a step S81.

At the step S80, an old starting date of the record indicated by the pointer $P_2$ is written into the starting date of the record indicated by the counter $C_4$ in the version-schedule table 35. At the step S81, an old finishing date of the record indicated by the pointer $P_2$ is written into the finishing date of the record indicated by the counter $C_4$ in the version-schedule table 35.

At a step S82, the pointer $P_2$ is set to an address of a preceding record. Then, the procedure goes back to the step S74.

Figure 37:
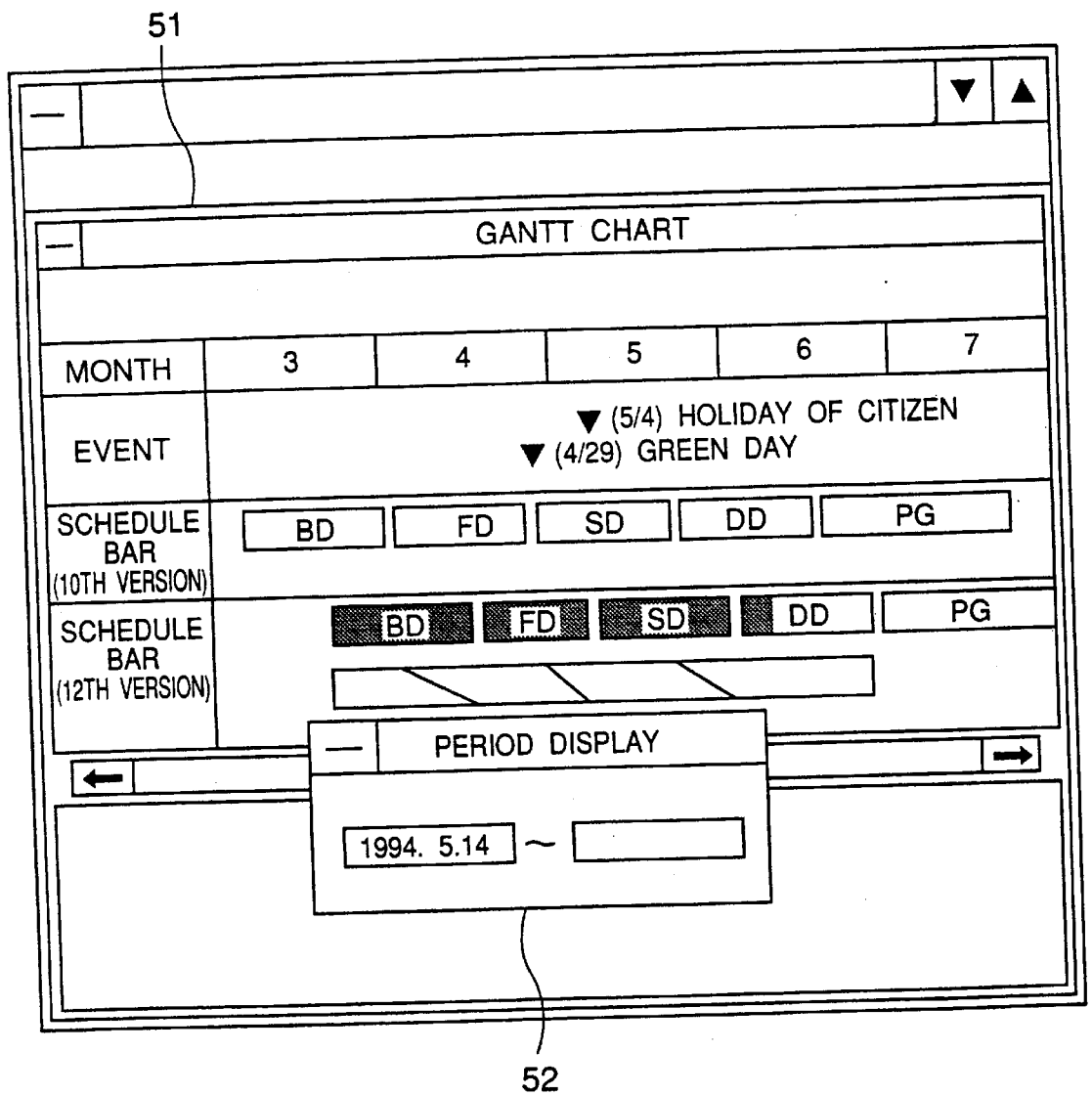
FIG. 37 is An illustrative drawing showing an example of a display showing a Gantt chart.

FIG. 37 shows an example of a display for the Gantt chart. In the figure, the schedule/progress bar and the work-period bar of the newest 12th version are shown in a schedule bar window 51. Also, in the schedule bar window 51 is shown the old schedule bar of a 10th version. When a period of a work step in the schedule/progress bar is modified, indicating the work step with the cursor through a mouse manipulation brings up a period-display window 52, in which the starting date and the finishing date are displayed.

As described above, according to the second principle of the present invention, the schedule bar representing scheduled periods is displayed along with the progress rate indicated inside the schedule bar. Thus, the progress rate of each work step can be easily checked. Also, a plurality of overlapping work steps are clearly shown within the single rectangular bar, so that an area required for displaying the work steps can be made smaller. Also, any one of the old schedule bars is displayed on the same display showing the newest schedule bar, so that modifications made on the work steps can be clearly seen.

Figure 38:
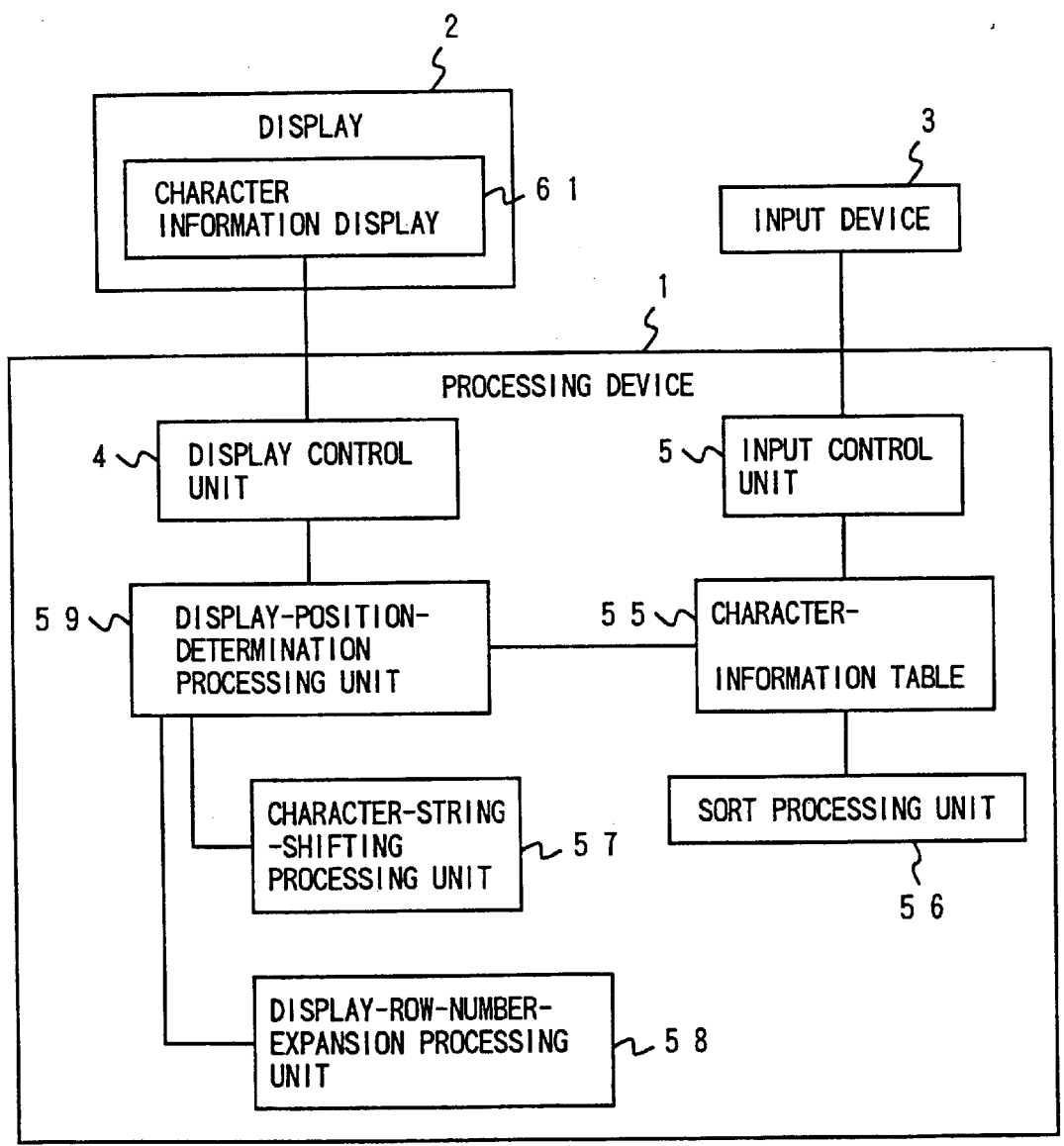
FIG. 38 is a block diagram of a third principle of the present invention.

FIG. 38 shows a block diagram of a third principle of the present invention. In the figure, the processing device 1 comprised of the CPU (central processing unit) and the memories is connected to the display 2 and the input device 3 such as the keyboard and the mouse.

The processing device 1 includes a display control unit 4 for controlling the display 2, and an input control unit 5 for controlling the input device 3. The processing device 1 further includes a character-information table 55 storing character information input from the input device 3, a sort processing unit 56, a character-string-shifting processing unit 57, a display-row-number-expansion processing unit 58, and a display-position-determination procession unit 59. The display 2 includes a character-information display 61 which shows the character information.

The input control unit 5 stores the character information, which is entered through the character information display 61 by using the input device 3 and is stored in the character-information table 55 along with a corresponding date. The sort processing unit 56 sorts the character information stored in the character-information table 55 in an order of dates. The display-position-determination processing unit 59 assigns rows of the character-information display 61 to the character information arranged in an order of dates. This determines vertical display positions of the character information, while horizontal display positions are determined by the corresponding dates.

The character-string-shifting processing unit 57 is used when the display position of the character information is already occupied by other character information. That is, the character-string-shifting processing unit 57 assigns to the character information a new row which can display it without interfering with the other character information. The display-row-number-expansion processing unit 58 is used when the display position of the character information is already occupied by other character information. That is, the display-row-number-expansion processing unit 58 increases the number of rows used for displaying the character information. After the increase, the display-position-determination processing unit 59 is called up again to assign rows to the character information.

In the third principle of the present invention, the character information is sorted by the sort processing unit 56 in an order of dates, regardless of the order in which the character information has been entered. Then, the display-position-determination processing unit 59 arranges the character information with a step increase for each row or with a step decrease for each row in the character-information display 61. Thus, overlappings of the character information can be reduced, and the character information can be clearly displayed.

Also, the character-string-shifting processing unit 57 shifts the character information to another row when an originally-assigned row is already occupied by other character information. Thus, the character information can be displayed without interfering with other character information.

Furthermore, the display-row-number-expansion processing unit 58 increases the number of the rows of the character-information display 61 when the display position for given character information is already occupied by other character information. Thus, the character information can be displayed without interfering with the other character information. Also, since the number of rows is increased only when there is no blank space for the given character information, space for displaying character information is not to be wasted.

The above description has been provided by taking an example of date-related character information. However, it will be apparent that the third principle of the present invention can be applied to time-related character information as well.

In the following, embodiments of the third principle will be described with reference to the accompanying drawings. In the description, a schedule which is defined by months and dates will be used as an example.

A first embodiment of the third principle of the present invention concerns a process of arranging the character information within a limited rectangular space with a step increase for each row, after sorting the character information in an order of dates regardless of the order in which the character information is provided.

FIGS. 39A through 39E are illustrative drawings for explaining the first embodiment. FIG. 39A shows an example of the character-information display 61. In FIG. 39A, a bar provided at the top of the character-information display 61 is divided into months. Within each month, the leftmost side corresponds to the beginning of the month, and the rightmost side corresponds to the end of the month. The rest of the character-information display 61 is used for displaying the character information.

FIG. 39B shows dates and their description provided in a random order. These dates and description include April 1 April Fool's Day, March 10 ordinary day, May 4 Holiday of Citizen, April 29 Green Day, and May 5 Children's Day.

FIG. 39C shows an example in which the descriptions of FIG. 39B are arranged in the character-information display 61 shown in FIG. 39A. Here, the arrangement of the descriptions may be determined by the order in which the data is entered, or may be determined by the cursor at the time of data entry. A triangle mark at the beginning of each character information indicates a corresponding date. As shown in FIG. 39C, when there is enough room for all the descriptions, the character information can be displayed without an overlap.

Imagine that the character-information display 61 is smaller or that the character-information display 61 needs to be contracted. In such cases, "April Fool's Day" and "Green Day" are overlapped with each other, as shown in FIG. 39D. Thus, there will be character information which cannot be read. Also, each of the descriptions is displayed at seemingly random positions, so that it is difficult to read the descriptions. By the way, the change of the horizontal scale of the character-information display 61 as described above is often required in the project-management system and the like.

In the third principle of the present invention, the character information is sorted in the order of dates by the sort processing unit 56. Then, the display-position-determination processing unit 59 arranges the character information for each row from the bottom to the top (or from the top to the bottom). By doing so, even if the character-information display 61 is not as large as that shown in FIG. 39A, all the character information can be displayed within the character-information display 61 as shown in FIG. 39E.

In FIG. 39E, the descriptions are assigned to the rows from the bottom row to the top row in the order of dates. Thus, a given description is displayed one row above the preceding description. In FIG. 39D, the number of the rows in the character-information display 61 is four, so that the fifth description "Children's Day" comes to the bottom.

Figure 40:
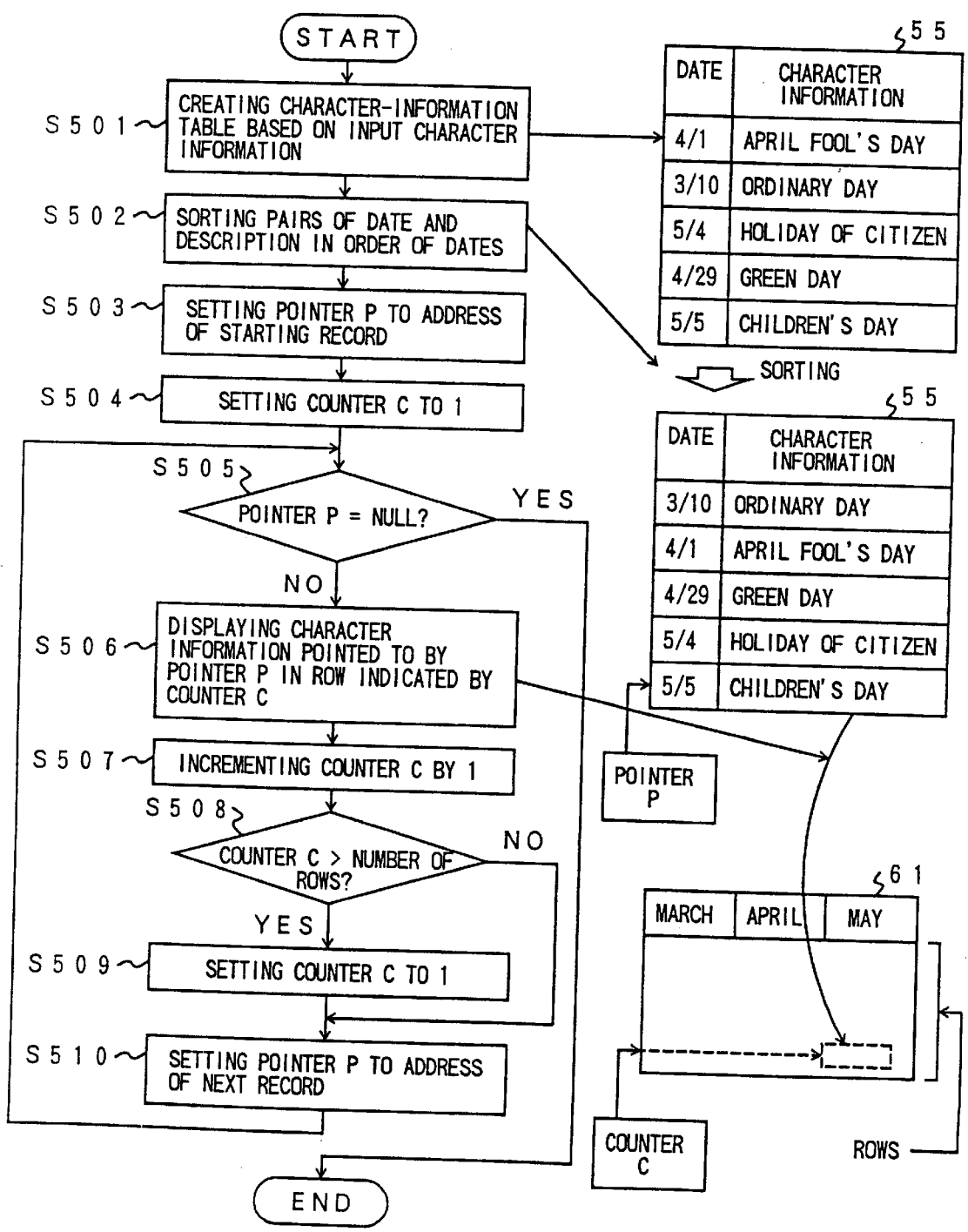
FIG. 40 is a flowchart of a process of displaying the character information according to a first embodiment of the third principle.

FIG. 40 shows a flowchart of a process of the first embodiment according to the third principle of the present invention.

At a step S501, the character-information table 55 is created based on the character information entered by using the input device 3. Here, pairs of a date and a description are stored into the character-information table 55.

At a step S502, the pairs of a date and a description are sorted in the order of dates. As a result, the character information in the character-information table 55 is arranged in an order of "ordinary day", "April Fool's Day", "Green Day", "Holiday of Cicizen", and "Children's Day".

At a step S503, an address of the starting record in the character-information table 55 is stored into a pointer P. At a step S504, a counter C is set to 1. Here, assume that the rows in the character-information display 61 are assigned row numbers 1, 2, . . . , N from the bottom. Thus, when the counter C is set to 1, the counter C indicates the bottom row.

At a step S505, a check is made if the pointer P is null. If it is, the procedure ends at this point. If the pointer P is not null, the procedure goes to a step S506.

At a step S506, the character information pointed to by the pointer P is displayed in a row indicated by the counter C at a position of a corresponding date within the character-information display 61. At a step S507, the counter C is incremented by 1.

At a step S508, a check is made whether the counter C is larger than the number of the rows of the character-information display 61. If it is not larger, the procedure skips a step S509, where the counter C is set to 1. If it is larger the counter C is set to 1 at the step S509 and the next description will be displayed at the bottom row again.

At a step S510, the pointer P is set to the next record address. Then, the procedure goes back to the step S505 to repeat the following steps. Here, at the step S510, if the address stored in the pointer P is that of the last record, the pointer P is set to null.

The above description has been provided by taking a particular example in which the character information is displayed form the bottom row to the top row. A procedure for displaying the character information from the top row to the bottom row can be provided by making a few changes in the flowchart of FIG. 40.

A second embodiment of the third principle of the present invention concerns a case in which an originally assigned position for given character information is already occupied by other character information. In this case, a new display position is provided for the given character information, so that all the character information can be fully displayed.

FIGS. 41A through 41C show illustrative drawings for explaining the second embodiment.

When there is a long character string such as "delivery of Ordered IBM Computer" as shown in FIG. 41A, the flowchart of FIG. 40 ends up arranging the character information overlapped with each other. This is shown in FIG. 41B. In order to avoid this situation, the character-string-shifting processing unit 57 checks whether there will be an overlap. In this example, the character-string-shifting processing unit 57 checks whether there will be an overlap. In this example, the character-string-shifting processing unit 57 detects that there is no blank space at the bottom row for the description "Children's Day", and, thus, moves the description to another row. As a result, all the character information can be displayed as shown in FIG. 41C.

FIG. 42 shows a flowchart of a process of the second embodiment according to the third principle of the present invention.

At a step S511, the character-information table 55 is created based on the character information entered by the input device 3. At a step S512, the pairs of a date and a description are sorted in the order of dates.

At a step S513, an address of the starting record in the character-information table 55 is stored into a pointer P. At a step S514, a counter C is set to 1.

At a step S515, a check is made if the pointer P is null. If it is, the procedure ends at this point. If the pointer P is not null, the procedure goes to a step S516.

At a step S516, the character-string-shifting processing unit 57 is called up to perform a character-string-shifting process, which will be described later. At a step S517, the character information pointed to by the pointer P is displayed in a row indicated by the counter C at a position of a corresponding date within the character-information display 61. At a step S518, the counter C is incremented by 1.

At a step S519, a check is made whether the counter C is larger than the number of the rows of the character-information display 61. If it is not larger, the procedure skips a step S520, where the counter C is set to 1, and proceeds to a step S521, the pointer P is set to the next record address. If it is larger, the procedure goes to step 520, where the counter C is set to 1. Then, the procedure goes back to the step S515 to repeat the following steps. Here, at the step S521, if the address stored in the pointer P is that of the last record, the pointer P is set to null.

Figure 43:
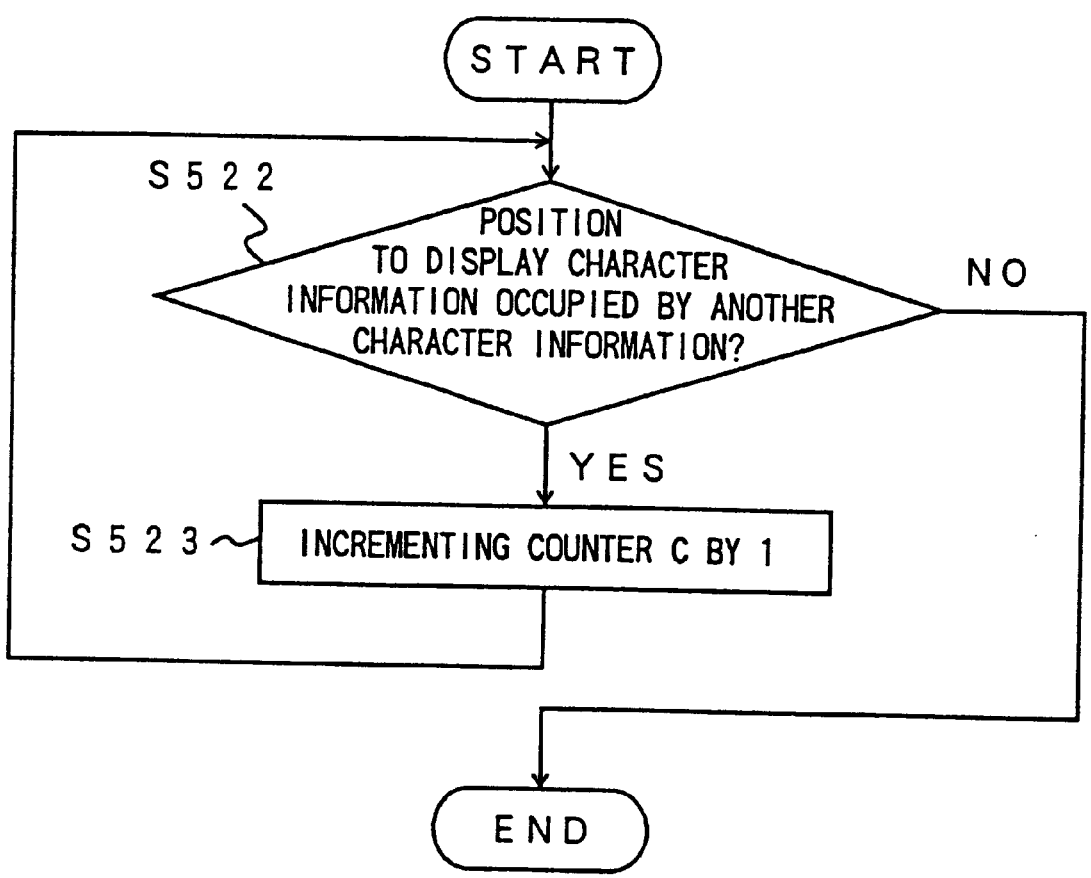
FIG. 43 is a flowchart of a character-string-shifting process used in the process of FIG. 42.

FIG. 43 shows a flowchart of the character-string-shifting process. At a step S522, a check is made whether a position to display the character information on the character-information display 61 is occupied by other character information. If it is not occupied, the procedure ends at this point. At the step S523, the counter C is incremented by 1, and the procedure goes back to the step S522.

A third embodiment of the third principle of the present invention concerns a case in which an originally assigned position for given character information is already occupied by other character information. In this case, a display area is expanded (the number of rows is increased), so that all the character information can be fully displayed.

FIGS. 44A through 44C show illustrative drawings for explaining the third embodiment. When there is a long character string such as "Delivery of Ordered IBM Computer" as shown in FIG. 44A, the flowchart of FIG. 40 ends up arranging the character information overlapped with each other. This is shown in FIG. 44B. In order to avoid this situation, the display-row-number-expansion processing unit 58 checks whether there will be an overlap. In this example, the display-row-number-expansion processing unit 58 detects that there is no blank space at the bottom row for the description "Children's Day", and, thus, increases the number of rows from four to five. Then, the added row is used for displaying the character information. As a result, all the character information can be displayed as shown in FIG. 44C.

Figure 45:
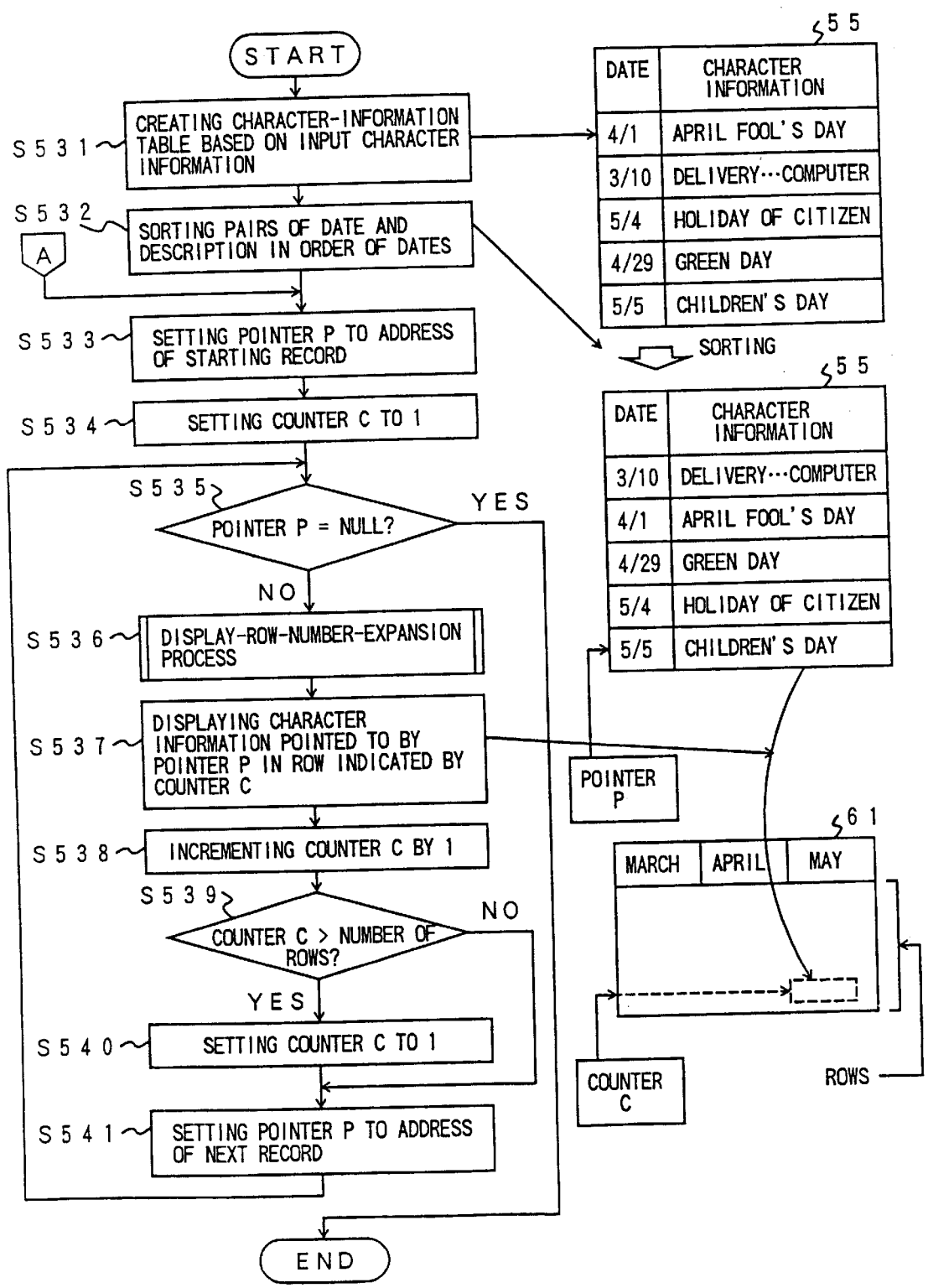
FIG. 45 is a flowchart of a process of displaying the character information according to the second embodiment of the third principle.

FIG. 45 shows a flowchart of a process of the third embodiment according to the third principle of the present invention.

At a step S531, the character-information table 55 is created based on the character information entered by using the input device 3. At a step S532, the pairs of a date and a description are sorted in the order of dates.

At a step S533, an address of the starting record in the character-information table 55 is stored into a point P. At a step S534, a counter C is set to 1.

At a step S535, a check is made if the pointer P is null. If it is, the procedure ends at this point. If the pointer P is not null, the procedure goes to a step S536.

At a step S536, the display-row-number-expansion processing unit 58 is called up to perform a display-row-number-expansion process, which will be described later. At a step S537, the character information pointed to by the pointer P is displayed in a row indicated by the counter C at a position of a corresponding date within the character-information display 61. At a step S538, the counter C is incremented by 1.

At a step S539, a check is made whether the counter C is larger than the number of the rows of the character-information display 61. If it is larger, the procedure goes to step S540, where the counter C is set to 1.

If it is not larger, the procedure goes to step S541, the pointer P is set to the next record address. Then, the procedure goes back to the step S535 to repeat the following steps. Here, at the step S541, if the address stored in the pointer P is that of the last record, the pointer P is set to null.

Figure 46:
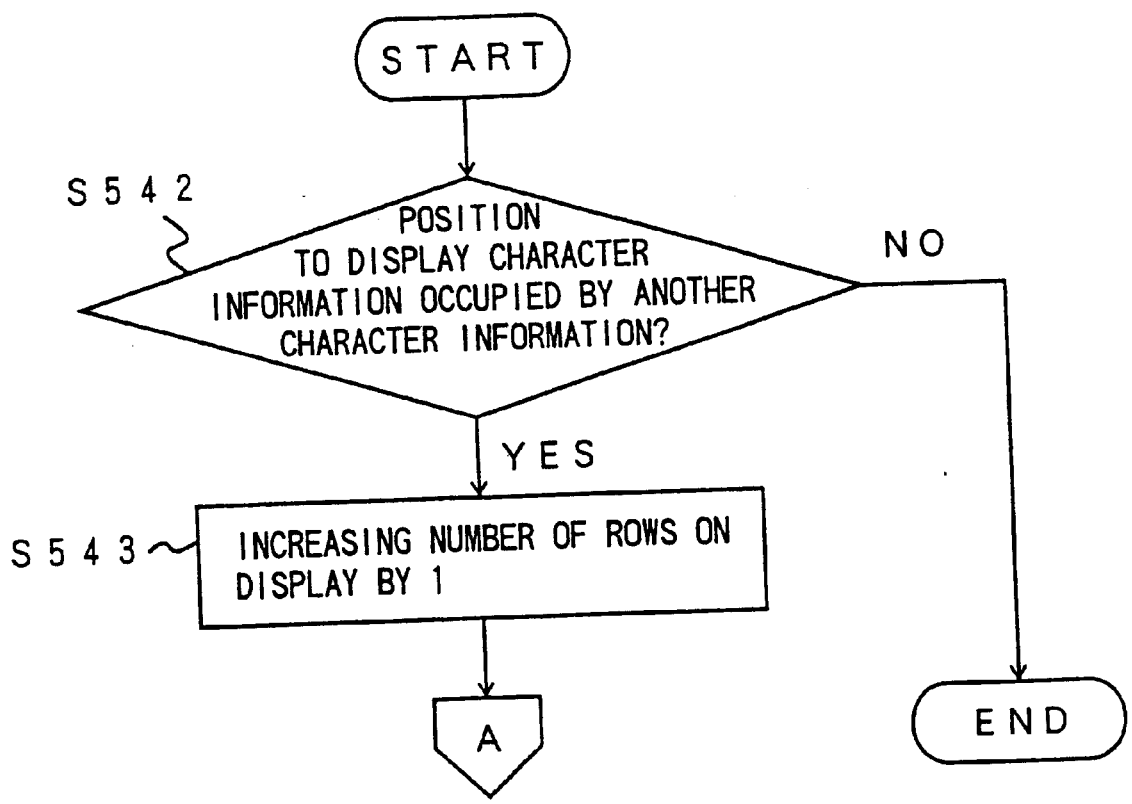
FIG. 46 is a flowchart of a display-tow-number-expansion process used in the process of FIG. 45.

FIG. 46 shows a flowchart of the display-row-number-expansion process. At a step S542, a check is made whether a position to display the character information on the character-information display 61 is occupied by other character information. If it is occupied, the procedure goes to a step S543. If it is not occupied, the procedure ends at this point. At the step S543, the number of the rows of the character-information display 61 is incremented by 1. Then, the procedure goes back to the step S533 of FIG. 45.

In the third principle of the present invention, more than one of the first embodiment, the second embodiment, and the third embodiment can be combined together.

Figure 47:
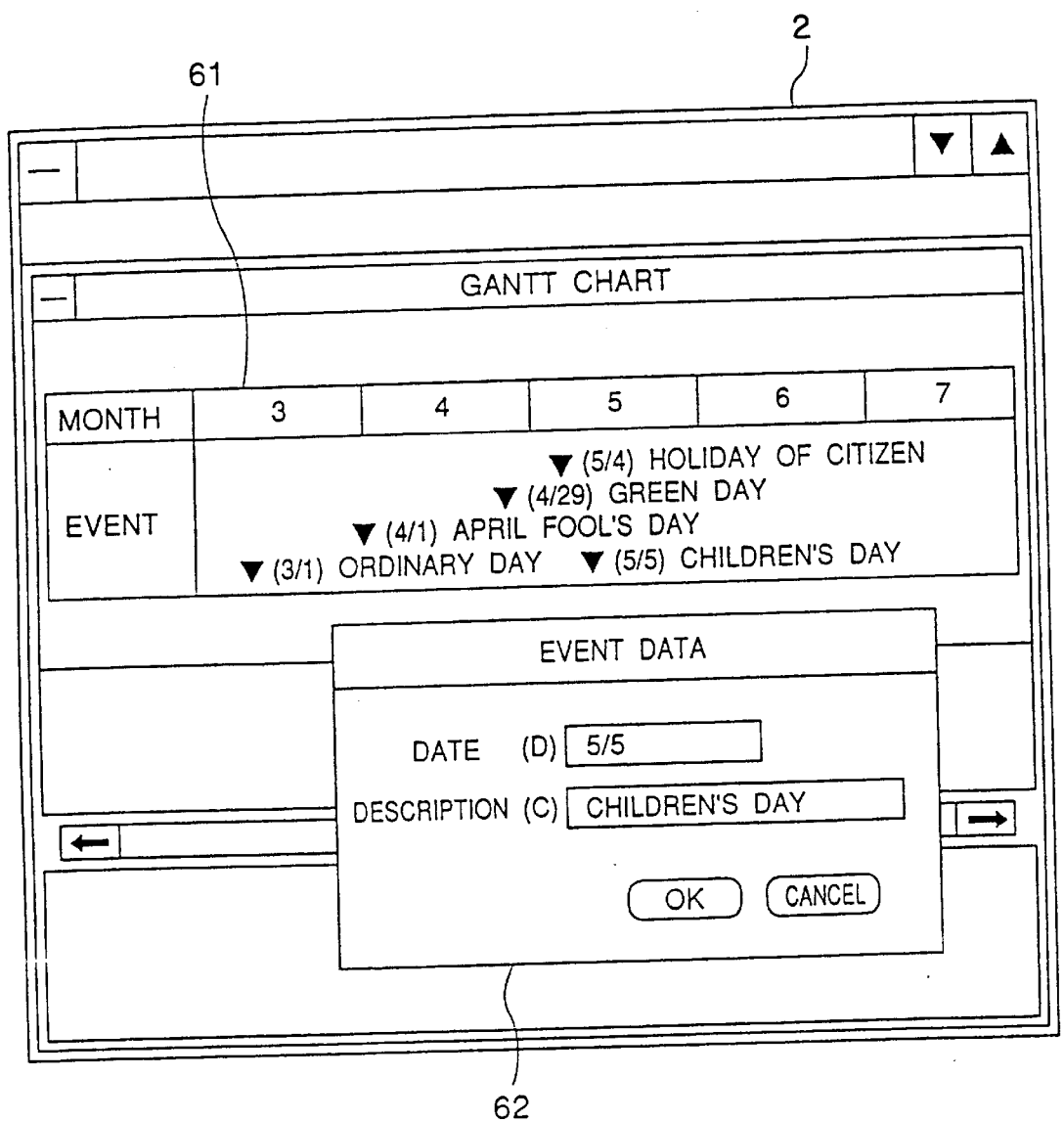
FIG. 47 is an illustrative drawing showing an example of a display showing the character information.

FIG. 47 shows an example of the character-information display 61 shown on the display 2. In this example, the character information is entered through an event data window 62. When the character information displayed in the character information display 61 is selected by the cursor shift keys or the mouse, a dialog box is opened as the event data window 62. In the event data window 62, the date and the description of the selected character information are shown in an event-date input frame and an event-description input frame, respectively. The date and the description can be modified in the event data window 62 so as to change the character information shown in the character-information display 61. Also, when a blank position on the character-information display 61 is pointed to by the cursor keys or the mouse, the dialog box is opened in order for a description of new character information to be entered. Here, the event-date input frame is provided with a date corresponding to the blank position, and the event-description input frame is blank for a description to be entered.

As described above, according to the third principle of the present invention, the character information relating to dates are sorted in the order of dates regardless of the order in which the character information is entered, and are displayed without an overlap to fully utilize the limited area of the display. Also, the character information is displayed orderly from the bottom left to the top right or from the top left to the bottom right, so that the time sequence of the events can be grasped with ease.

A fourth principle of the present invention concerns gathering achievement data for assessing an aptitude of each project member prior to laying out a project plan.

Figure 48:
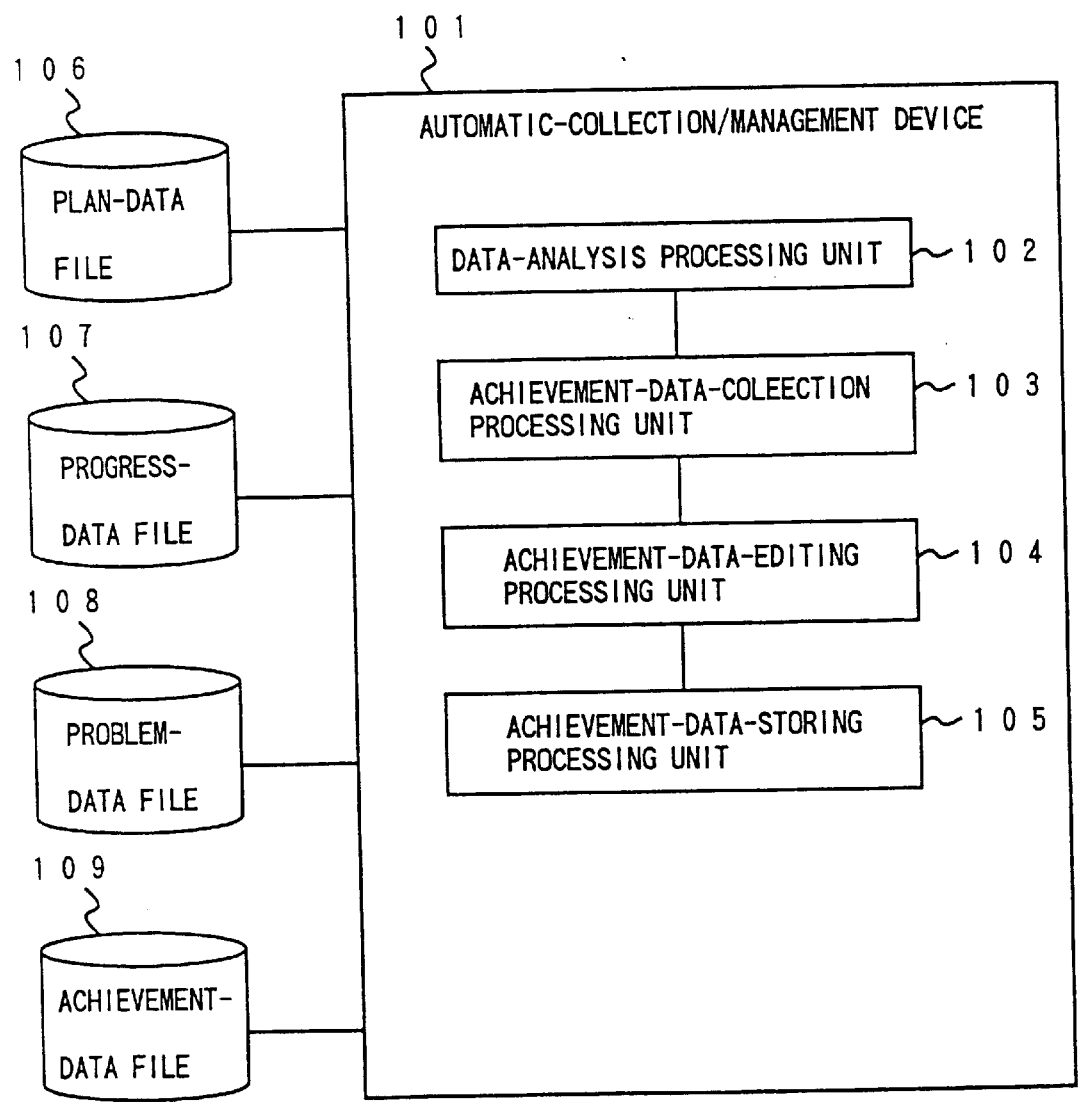
FIG. 48 is a block diagram of a fourth principle of the present invention.

FIG. 48 shows a block diagram of the fourth principle of the present invention. In the figure, an automatic-collection/ management device 101 including a CPU and memories are connected with a plan-data file 106, a progress-data file 107, a problem-data file 108, and an achievement-data file 109. The plan-data file 106 contains data regarding project plans. The progress-data file 107 contains data regarding a scheduled period, a progress, and the like for each work step. The problem-data file 108 contains data regarding the number of the problems and the like for each work step. The data file 107, and the problem-data file 108 is collectively called work data. The achievement-data file 109 stores achievement data in a predetermined format which is collected by the automatic-collection/management device 101.

The automatic-collection/management device 101 includes a data-analysis processing unit 102, an achievement-data-collection processing unit 103, an achievement-data-editing processing unit 104, and an achievement-data-storing processing unit 105. The data-analysis processing unit 102 checks whether the work data is stored in the files. Then, it checks if items which are necessary for generating the achievement data are present in the work data.

The achievement-data-collection processing unit 103 collects the work data while classifying it according to the necessary items. For example, the achievement-data-collection processing unit 103 collects and classifies the work data by using a unit name as a keyword. The achievement-data-editing processing unit 104 generates the achievement data by editing the data collected by the achievement-data-collection processing unit 103. The achievement-data-storing processing unit 105 stores the achievement data into the achievement-data file 109 by using the predetermined format.

As shown in FIG. 48, the automatic-collection/ management device 101 automatically collects the work data from the plan-data file 106, the progress-data file 107, and the problem-data file 108. Then, it generates and stores the achievement data. Thus, the work load of and time for collecting the work data is reduced.

Creation of a plan for a project is helped by an evaluation and an analysis of the achievement data stored in the achievement-data file 109. As a result, an effective, accurate plan can be laid out.

Also, since a common data format is used for the achievement data stored in the achievement-data file 109, the achievement data of different projects can be compared with each other. Thus, the analysis of the achievement data becomes easier, resulting in a creation of a more appropriate plan.

Figure 49:
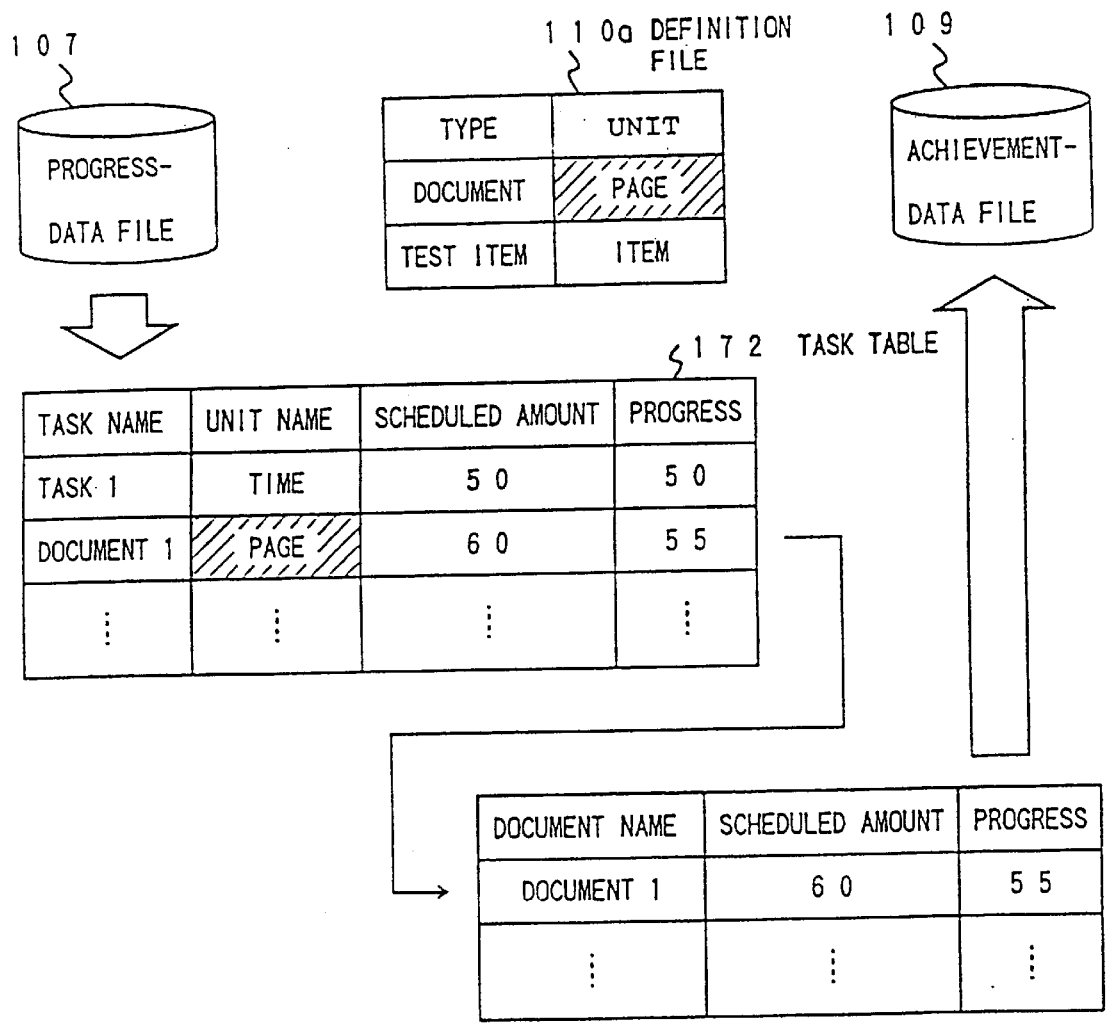
FIG. 49 is an illustrative drawing for explaining a process of generating achievement data according to an embodiment of the fourth principle.

FIG. 49 shows an illustrative drawing for explaining a process of generating the achievement data according to an embodiment of the fourth principle.

FIG. 49 shows a case in which information about an amount of manuals produced so far, as in software development, is automatically collected as the achievement data. Here, a unit name "page" is used as a keyword for collecting the work data. The use of the unit name "page" can be indicated in a definition file 110*a*.

Here, the use of the unit name as a keyword offers an advantage over the use of other information such as a name of a task. Since the name of a task can vary from project to project, it cannot be used as a keyword for collecting the work data. Deciding a common task name which will be used among different projects can be one solution, but it would be difficult to enforce the use of the common name without exceptions. Using a plurality of keywords which may be used as a task name is another solution, but is far from perfect. However, the unit name "page" is common regardless of projects, so that it is an appropriate choice as a keyword.

The data regarding the amount of the manual which has been written so far is automatically collected from the progress-data file 107 by using the unit name "page" as the keyword. Here, a task table 172 is stored into the progress-data file 107, and the unit name "page" is searched for in the task table 172. In FIG. 49, a task "document 1" is recorded in the task table 172 with the unit name "page", so that data of this item is gathered as the achievement data. Then, this achievement data is stored in the achievement-data file 109.

Here, the progress data shown in FIG. 49 contains a task name, a scheduled amount, and a progress. However, a rate of the progress to the scheduled amount, a delay (an actual finishing data minus a scheduled finishing date), etc., can be used a indicators of a progress of the project.

In collecting the work data, the keyword to be used can be changed by modifying the definition file 110*a*. Thus, the process of collecting the work data can be customized according to the user need, which results in a more efficient way to collect the work data.

After the work data is automatically collected based on conditions set forth in the definition file 110*a,* there might be a need to modify the achievement data. That is, since the conditions cannot cover all the possible exceptions, the collected data may include unnecessary data, or some necessary data may not have been collected. Thus, there may be a need to add data to or remove data from the achievement data by identifying the data manually.

Figure 50:
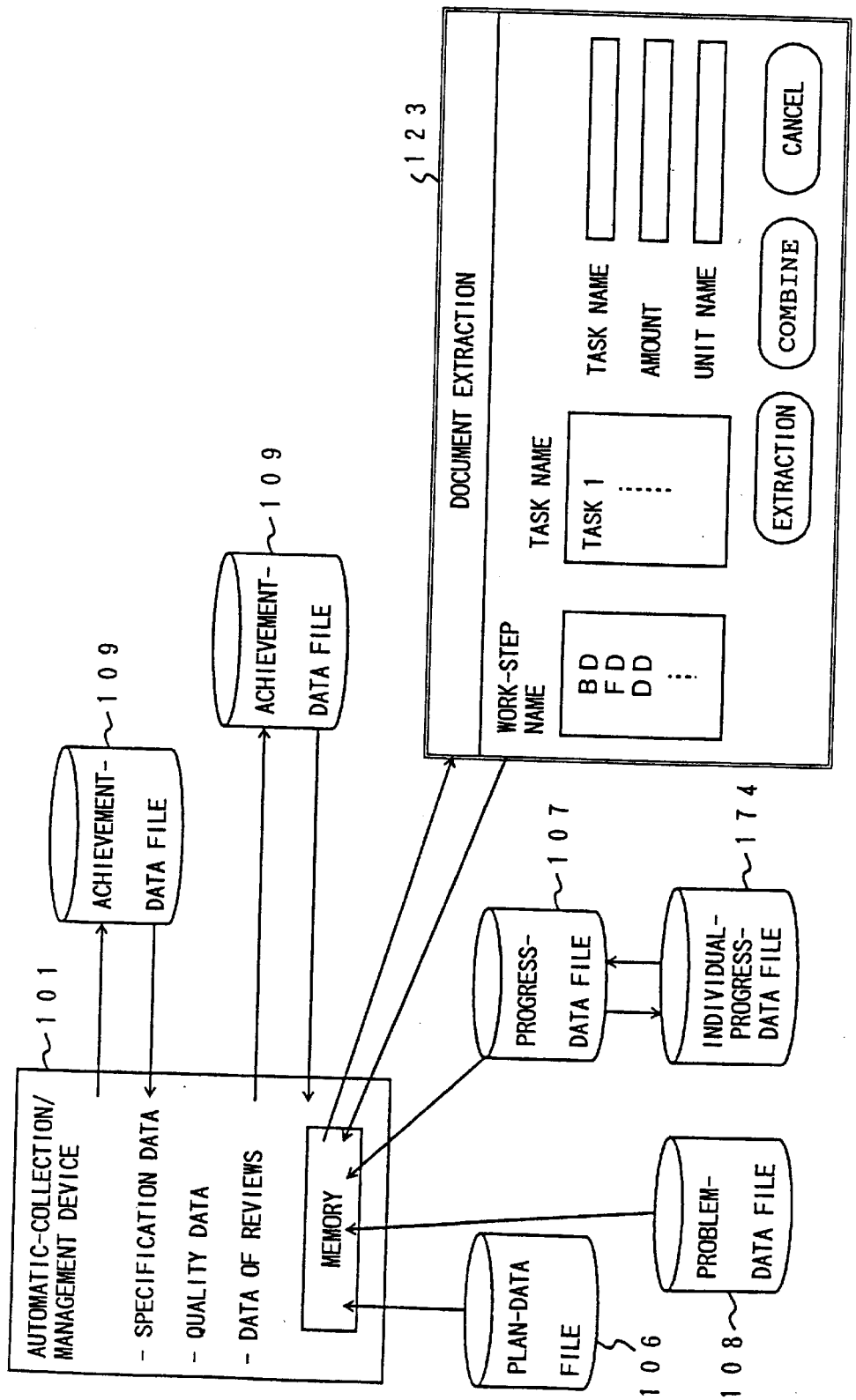
FIG. 50 is an illustrative drawing for explaining an extraction of a data file by using an automatic-collection/management device of FIG. 48.

FIG. 50 is an illustrative drawing for explaining an extraction of a data file by using the automatic-collection/management device 101. Here, the extraction of a data file refers to an action to manually add the data file to the collected achievement data. As shown in FIG. 50, the automatic-collection/management device 101 displays a window 123, in which the work data (a task name, a progress, etc.) is stored, for example in the progress-data file 107, the individual progress-data file 174, and the like is shown to a user. Through a cursor indication, the user can identify data files which the user wishes to include in the achievement data. By clicking an extraction button, the user can add the data files to the achievement data. In the window 123, another function to edit the achievement data is provided. The user can identify a set of data files, and collect these data files as one single data by clicking a combine button. In this manner, the automatic-collection/management device 101 provides a function of manual addition of the data files while allowing the user to look at information regarding the data files in the window 123. An example of removal of data files from the achievement data will be provided later.

Figure 51:
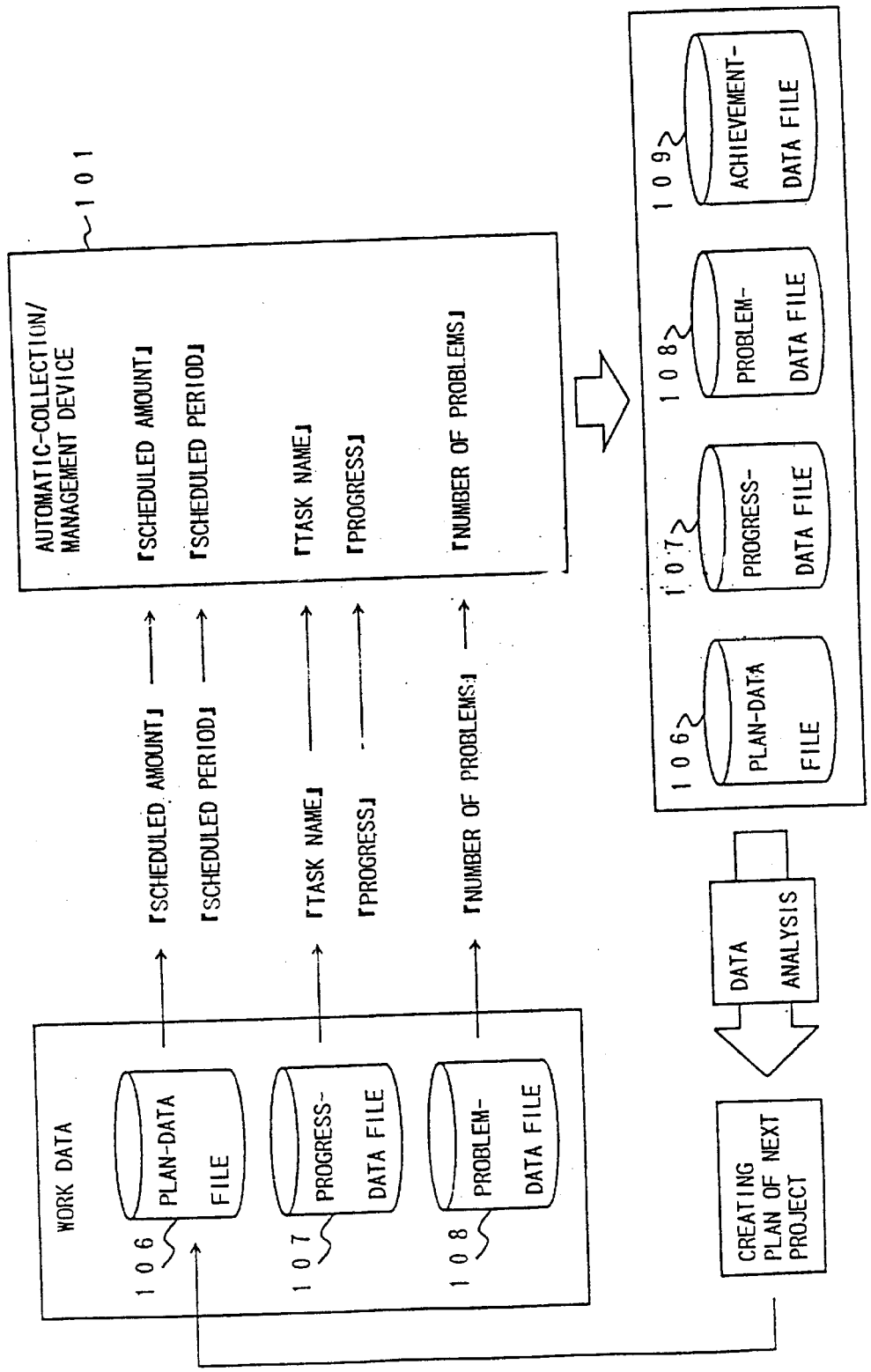
FIG. 51 is an illustrative drawing for explaining the use of the automatic-collection/management device.

FIG. 51 shows an illustrative drawing for explaining the use of the automatic-collection/management device 101 according to the embodiment of the fourth principle. In the figure, the achievement data is stored in the same storage by using the same classification as that used for storing the work data. For example, the work data is generally stored according to project names and task names (hereinafter called theme names and component names, respectively). Here, theme names are sued for referring to, or referencing separate, independent projects, and the component names are used for referring to, or referencing smaller units of work constituting one project. When the achievement data is stored according to the theme names and the component names in the same storage, the achievement data can be managed together with the work data.

For example, a scheduled amount and a scheduled period may be collected from the plan-data file 106 with regard to a component 1 of a theme A. Also, a task name and a progress may be collected for the component 1 of the theme A from the progress-data file 107. Finally, the number of problems of the component 1 of the theme A is obtained from the problem-data file 108. The collected data is then stored into the achievement-data file 109 as the achievement data of the component 1 of the theme A.

As shown in FIG. 51, the achievement data thus collected, along with other data if necessary, is analyzed in order to create a plan of a next project. Thus, an effective and accurate plan can be created.

Figure 52A:
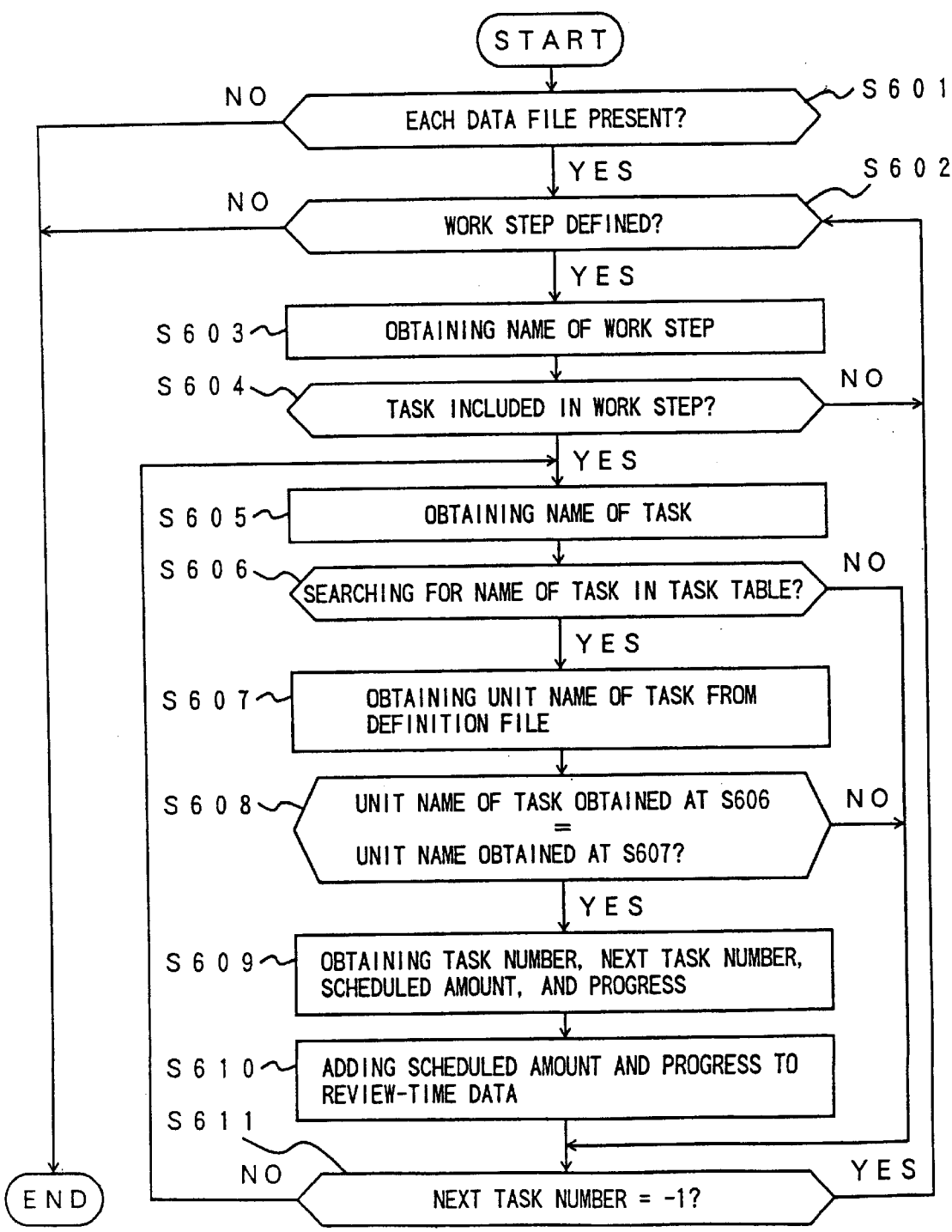
FIG. 52A is a flowchart of a process of automatically collecting the data by using the automatic-collection/management device.

FIG. 52A shows a flowchart of a process of automatically collecting the data by using the automatic-collection/management device 101. FIG. 52B is an illustrative drawing for aiding an explanation of the flowchart. Here, a description of the flowchart will be provided by taking an example in which an amount of time spent on reviews is to be collected and stored into a review-time data 111 shown in FIG. 52B. Before the start of the process, the review time stored in the review-time data 111 is set to zero for all work steps 1 through 6.

With reference to FIGS. 52A and 52B, the flowchart of the process of automatically collecting the data will be described below. At a step S601, a check is made whether each of the data files, i.e., the plan-data file 106, the progress-data file 107, and the problem-data file 108 are provided. If these files are absent, the procedure ends at this point.

If it turns out at the step S601 that each of the data files exists, a check is made at a step S602 whether work steps are defined. If they are not defined, the procedure ends at this point. If they are defined, the procedure goes to a step S603. In this example, since work steps are defined in the review-time data 111, the procedure proceeds to the step S603.

At the step S603, a name of a work step is obtained. In this example, a name "work step pb 1" is obtained first.

At a step S604, a check is made whether there is a task in the work step. If there is no task, the procedure goes back to the step S602 to examine a next work step. If there is a task, the procedure goes to a step S605.

At the step S605, a name of the task is obtained. In this example, a name "review" is obtained.

At a step S606, the name "review" is searched for in the task table 172. The name "review", used as a keyword, can be at the beginning or at the end of a character string. If not found ("NO"), the procedure goes to step S611. If a task "review 2" in the task table 172 is found in the search ("YES"), the procedure goes to step S607, at which a unit name of the task is obtained from the definition file 110a. Assume that the unit name "hours" is obtained.

At a step S608, a check is made whether a unit name of the task which was found at the step S606 is the same as the unit name obtained at the step S607. In this example, it is checked if a unit name of the task "review 2" is "hours". If they are not the same, the procedure goes to a step S611. If they are the same, the procedure goes to a step S609.

At the step S609, a task number, a next task number, a scheduled amount, and a progress (i.e., finished amount) of the task are obtained. In this example, since the unit name of the task "review 2" is "hours", a task number "2", a next task number "3", a scheduled amount "10", and a progress "10" of the task "review 2" are obtained.

At a step S610, the scheduled amount and the progress obtained at the step S609 are added to corresponding number of the review-time data 111. After the step S610, a review-time data 111' shown in FIG. 52B is obtained.

At a step S611, a check is made whether the next task number is "−1". this next task number "−1" is used for indicating that a pertinent task is the last task of a pertinent work step. That is, the last task in a given work step has "−1" in the column for the next task number. If the next task number is not "−1", the procedure goes back to the step S609 to continue working on the same work step. If the next task number is "−1", the procedure returns to the step S602 to repeat the process for the next work step.

In this example, since a task "review 3" has "−1" as the next task number, the procedure moves on to the next work step "work step 2" after obtaining data of the task "review 3". The process of the steps S603 through S610 is carried out for the work step "work step 2". After continuing the above-described processes, a review-time data 111" shown at the bottom of FIG. 52B is obtained.

The above description of the flowchart of FIG. 52A has been given along with the example of the collection of the review times. However, other achievement data can be gathered in the same manner as described above.

Figure 53:
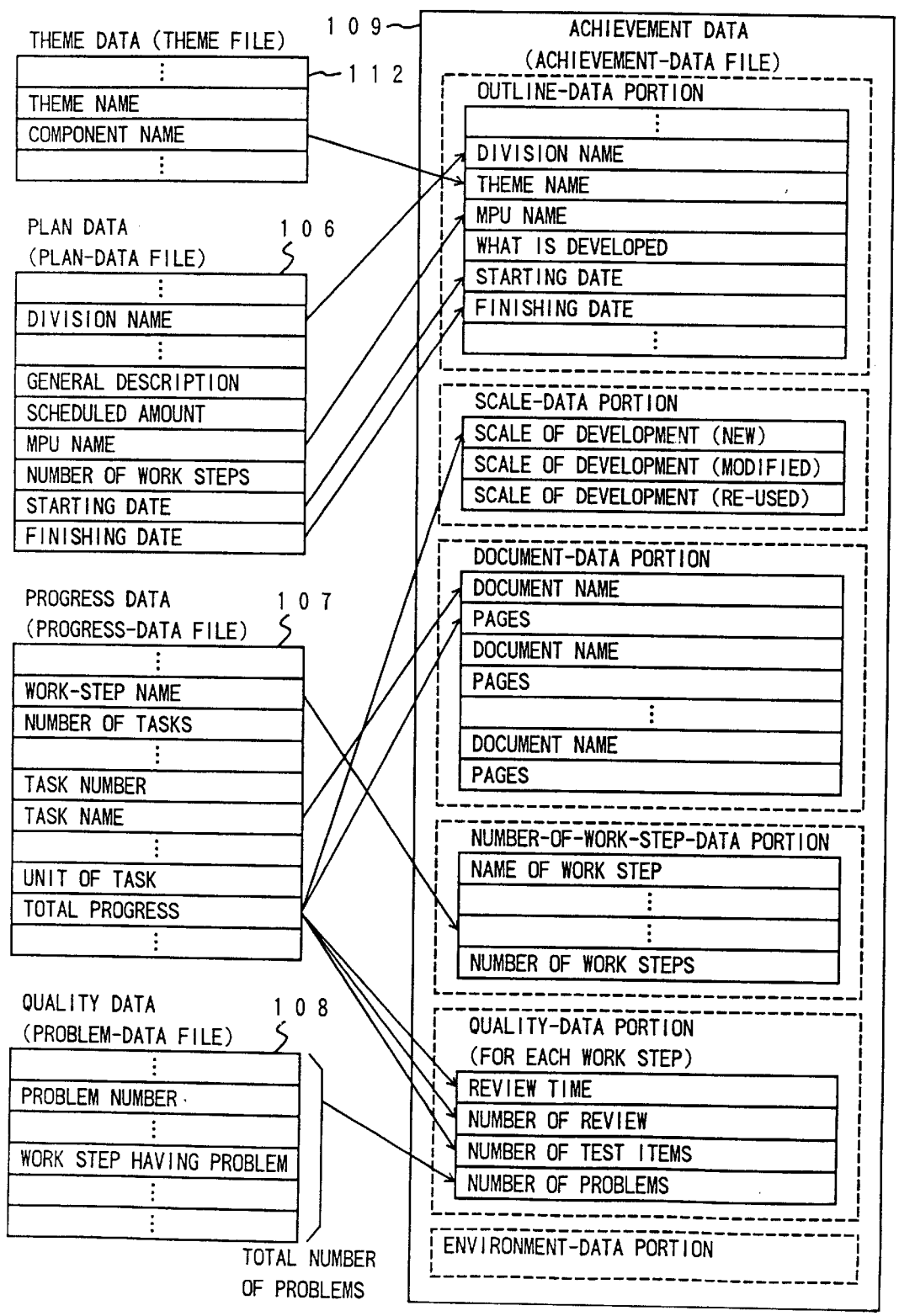
FIG. 53 is an illustrative drawing showing an example of a data structure of the achievement data.

After the collection of the data, the user checks on the collected data, and stores it as the achievement data into the achievement-data file 109. An example of a data structure of the achievement data is shown in FIG. 53. As shown in FIG. 53, the achievement data contains various types of data in their allocated portions. For example, document data is stored in a document data portion, and quality data is stored in a quality data portion. Here, the achievement-data-editing processing unit 104 of FIG. 48 is used for editing the achievement data prior to storing it.

In FIG. 53, data structures of each of the data files are shown along with the data structure of the achievement data. The achievement-data file 109 is stored in the same storage as that of the plan-data file 106, the progress-data file 107, and the problem-data file 108. Also, the achievement data is classified according to the theme names and the component names as are the other data files. In order to manage all the data files according to this classification, a theme file 112 containing the theme names and the component names is provided as shown in FIG. 53.

FIGS. 54A and 54B show examples of a display showing the achievement data collected by the automatic-collection/management device 101. In these examples, the achievement data regarding project documents is shown on the display. In FIG. 54A, the achievement data regarding project documents is shown for all the work steps. In FIG. 54B, the achievement data is edited to include only the achievement data regarding the work step of a detailed design. In this manner, the user can edit the collected achievement data while accessing the data files if necessary.

FIG. 55 through FIG. 60 show examples of a display for explaining an operation of the automatic-collection/management device 101.

Figure 55:
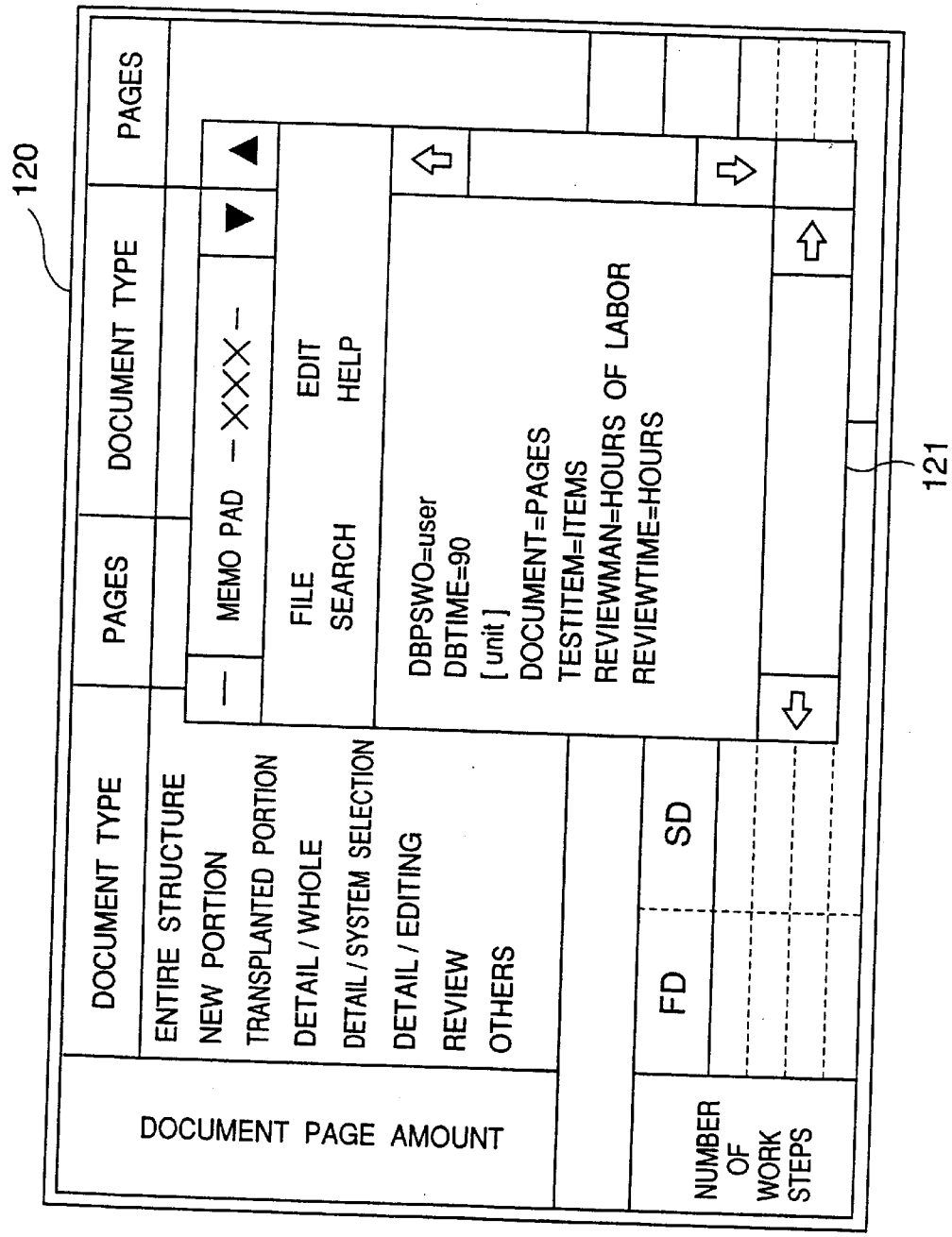
FIG. 55 is an illustrative drawing showing a first example of a display for explaining an operation of the automatic-collection/management device.

FIG. 55 shows a display 120 along with a memo-pad window 121 which shows information regarding data collection. The memo-pad window 121 is actually used for displaying text files. In the figure, the memo-pad window 121 is sued for displaying a text file which defines various conditions used for collecting the achievement data. From what is shown in the memo-pad window 121, it can be known that document data is collected by using the unit name "page" as a keyword. Also, it can be known that review-time data is collected by using a unit name "time".

Figure 56:
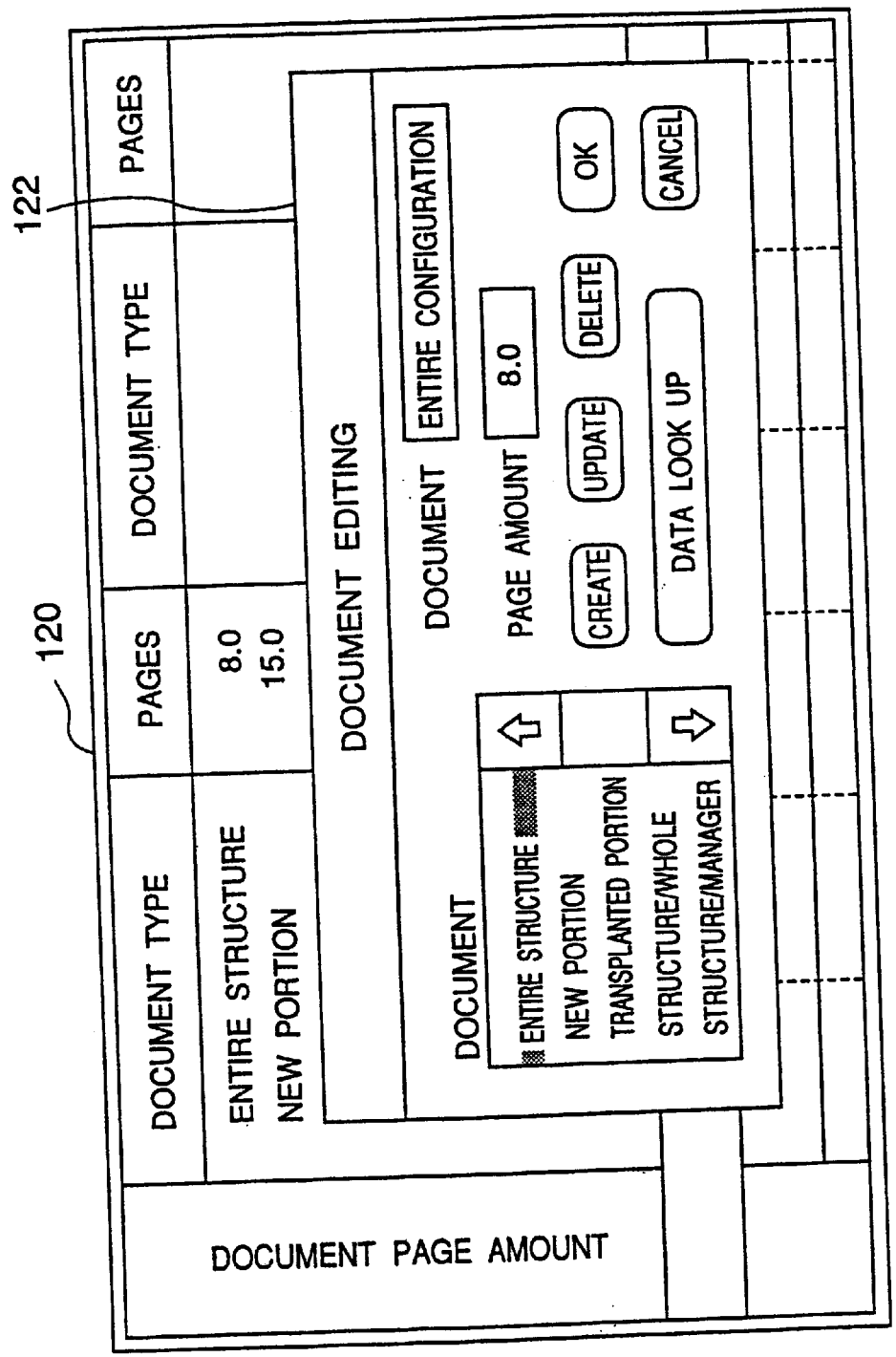
FIG. 56 is an illustrative drawing showing a second example of the display for explaining the operation of the automatic-collection/management device.

FIG. 56 shows the display 120 along with a document-edit window 122 which is provided to edit the document data stored in the document data portion of the achievement data. When there is a need to edit the document data, the document-edit window 122 is displayed by selecting it in a menu bar. In an example of FIG. 56, a document "entire configuration" is selected in the document-edit window 122. If a delete button is clicked at this point, for example, the document "entire configuration" is removed from the achievement data. When there is a need to add a new document to the achievement data, a data-look-up button is clicked. This brings up a document-extraction window 123 of FIG. 57.

Figure 57:
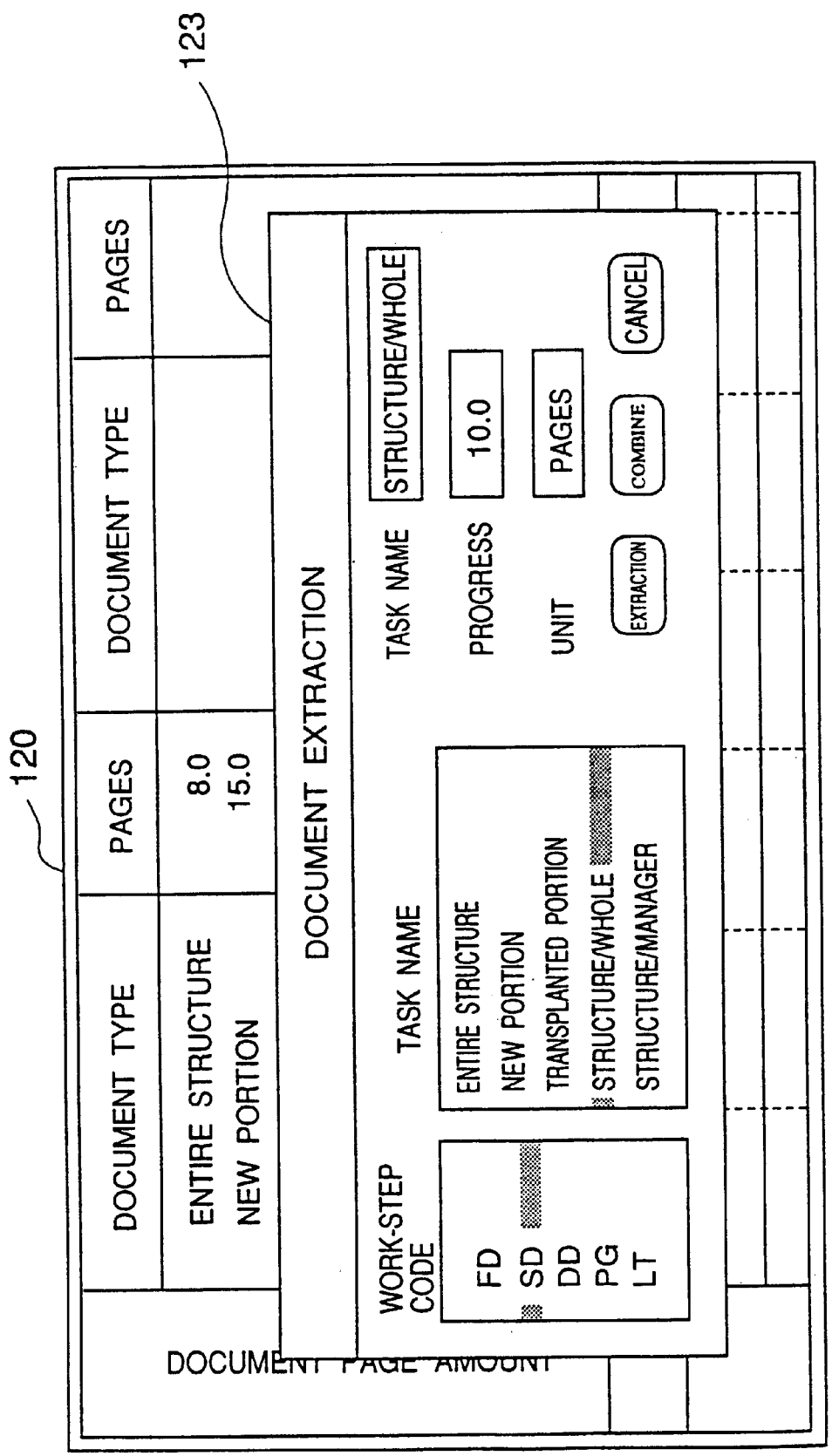
FIG. 57 is an illustrative drawing showing a third example of the display for explaining the operation of the automatic-collection/management device.

FIG. 57 shows the document-extraction window 123 which is provided to add new documents to the achievement data. In the document-extraction window 123, work-step codes and task names are displayed and used for selecting data files. Upon a selection of a data file, a progress and a unit name of the selected data file will be displayed. By clicking the extraction button, progress data of the selected data file is extracted from the progress-data file 107 and added to the achievement data.

FIG. 58 shows the display 120 along with a quality-input window 124 which is provided to display quality data as well as to edit the quality data. In the quality-input window 124, a work-step code is selected in order to display the quality data stored in the achievement data. New quality data can be entered in the quality-input window 124 by overwriting the new quality data on old quality data being displayed. Here, a click on a data-look-up button results in a display of a quality-acquiring window 125.

FIG. 59 shows the quality-acquiring window 125, which is sued for collecting the quality data. In the quality-acquiring window 125, quality-data items and task names are displayed and used for selecting data files. Upon a selection of a data file, a progress (review time in this example) of the selected data file will be displayed. By clicking an OK button, quality data (review time) of the selected data file is acquired from the quality-data file 108 and added to the achievement data.

Figure 60:
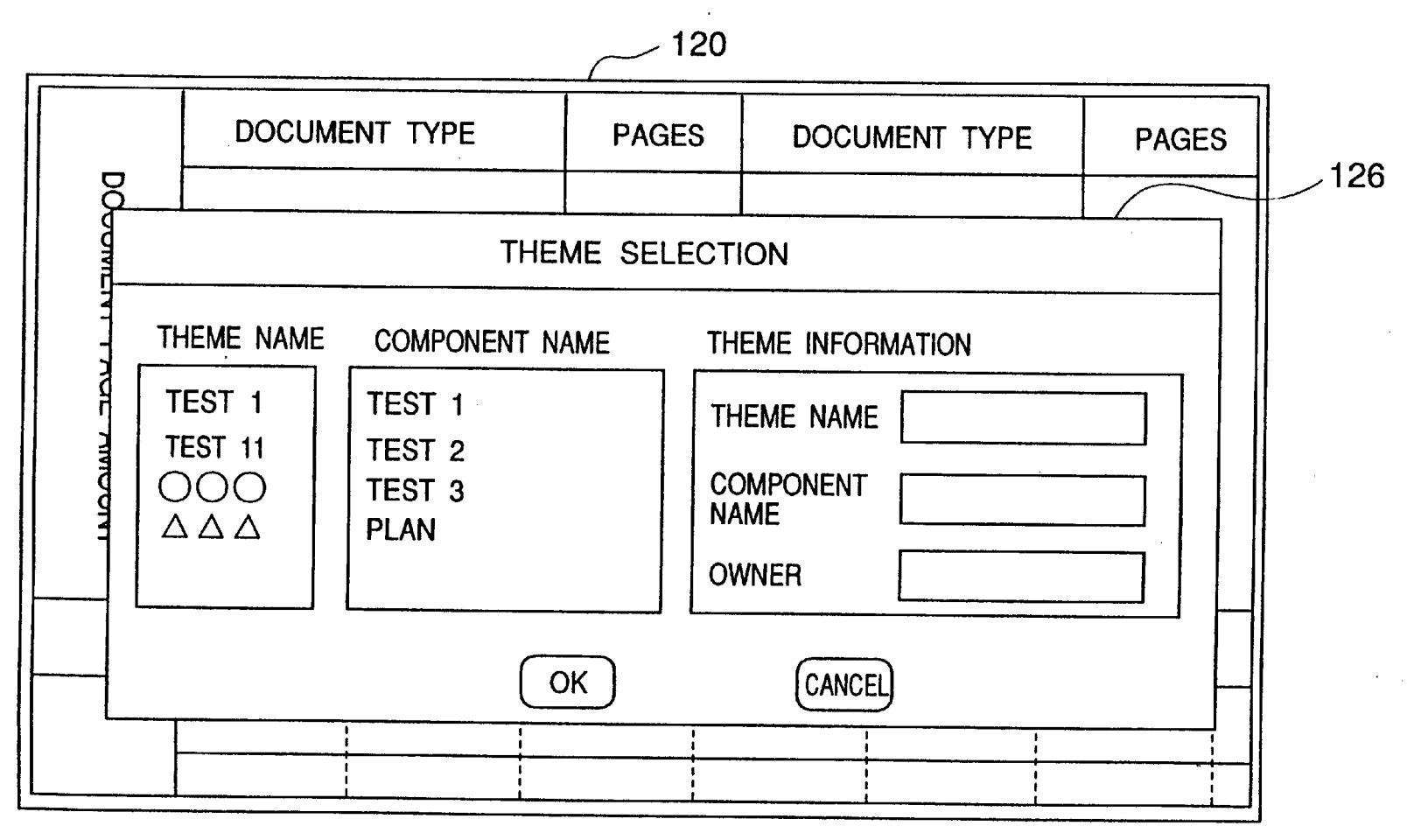

FIG. 60 shows the display 120 along with a theme-selection window 126 which is provided to select a theme name and a component name. As described above, the achievement data stored in the achievement-data file 109 is stored according to theme names and component names. Thus, when the achievement data is to be accessed, a theme name and a component name are selected first. For example, a name of a product which is developed by a project is sued as a theme name, and names of works within the project are used as component names.

As described above, according to the fourth principle of the present invention, the achievement data is automatically collected, and stored as files of a predetermined format. Since units, types, and formats of the collected data are standardized among different projects, the achievement data can be compared between the different projects. That is, a comparative analysis of the achievement data is relatively easy. Thus, an accurate, effective plan can be laid out without much difficulty.

A fifth principle of the present invention concerns a system for progress management which allows each project member to report his/her own progress at any time, and, also, allows supervisors to change a project schedule and to know a current situation of the progress at any time.

FIG. 61 shows a block diagram of the fifth principle of the present invention. In the figure, a supervising processing device 201 comprised of a personal computer or the like is connected to progress-reporting processing devices 202, 202', . . . , each of which is also comprised of a personal computer or the like. The supervising processing device 201 includes a plan-data processing unit 203, an individual-data-generation processing unit 204, a plan-modification/addition processing unit 205, and a data-connection processing unit 206. Each of the progress-reporting processing devices 202, 202', . . . , includes an individual-progress managing unit 207, 207', . . . .

The plan-data processing unit 203 obtains plan data regarding a plan of an entire project. Based on the plan data, the individual-data-generation processing unit 204 generates individual data which is handed over to each of the progress-reporting processing devices 202, 202', . . . . The individual-data-generation processing unit 204 also generates updated individual data based on data created by the data-connection processing unit 206, and hands it over to the progress-reporting processing devices 202, 202', . . . .

The plan-modification/addition processing unit 205 is used for modifying the plan data or adding information to the plan data, and stores differences between the original plan data and updated plan data. An example of modification or addition of the plan data may be modifications of tasks assigned to a project member or a change of a project member assigned to a given task.

The data-connection processing unit 206 receives progress reports (the individual data) from the progress-reporting processing devices 202, 202', . . . . Then, it merges information contained in the progress reports with the modified or added information so as to generate updated plan data.

The individual-progress managing units 207, 207', . . . of the progress-reporting processing devices 202, 202', . . . , are used for adding the progress information to the individual data, which have been handed over from the supervising processing device 201. Then, the individual-progress managing units 207, 207', . . . return the individual data to the supervising processing device 201.

In the fifth principle of the present invention, the supervising processing device 201 generates the individual data for each of the project members by using the plan data of the entire project. Then, the individual data is distributed to the progress-reporting processing devices 202, 202', . . . . Having added the progress information to the individual data, the progress-reporting processing devices 202, 202', . . . return the individual data to the supervising processing unit 201.

At the same time, the supervising processing unit 201 stores the difference between the original plan data and the updated plan data when the plan data is modified. Thus, after receiving the progress reports from the progress-reporting processing devices 202, 202', . . . , the supervising processing unit 201 can reflect the progress information and the modified information on the plan data. Furthermore, the updated individual data is created based on the updated plan data, and is distributed again to the progress-reporting processing devices 202, 202', . . . .

In the following, an embodiment of the fifth principle of the present invention will be described with the accompanying drawings.

Figure 62:
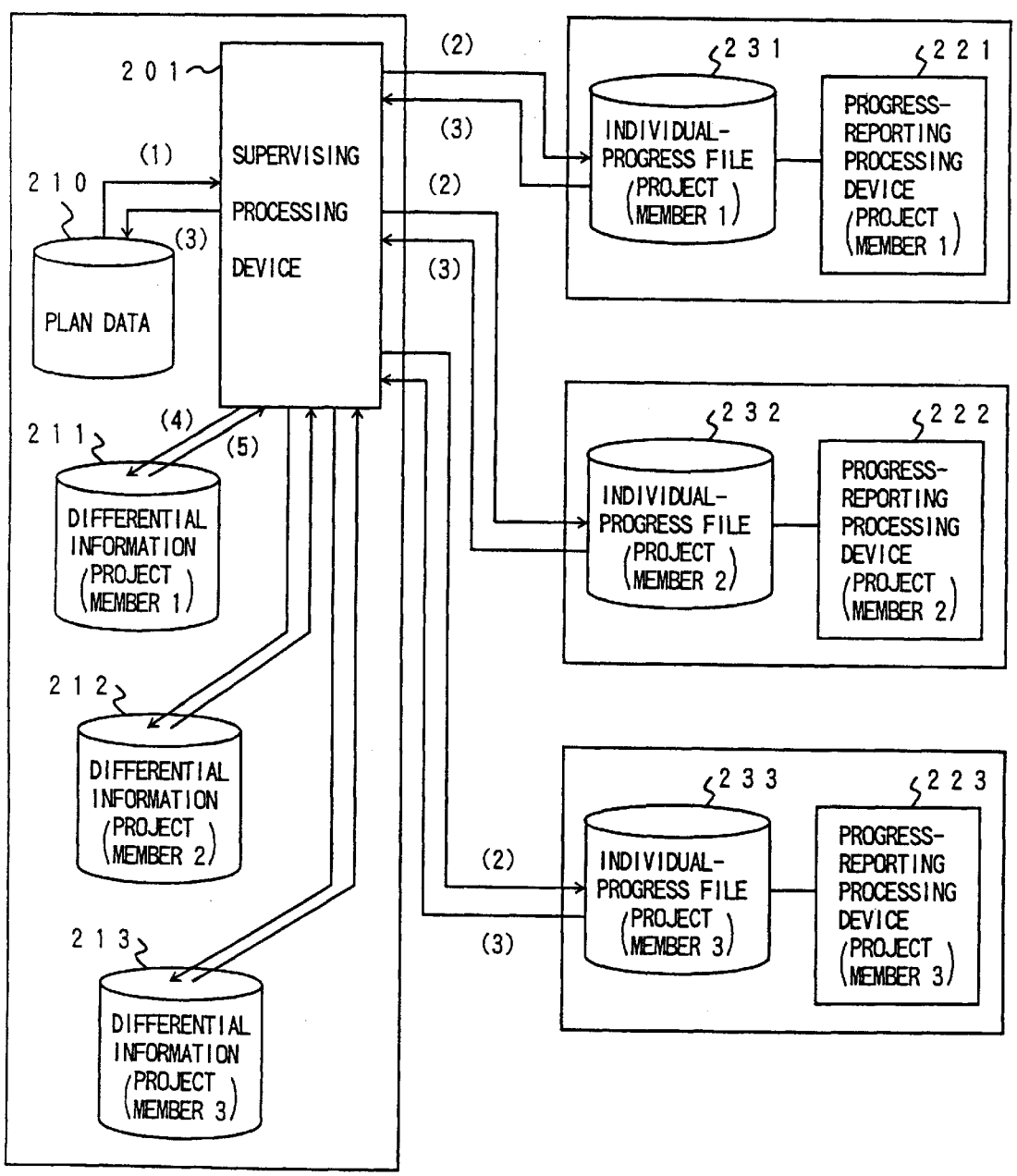
FIG. 62 is an illustrative drawing showing an embodiment of the fifth principle.

FIG. 62 shows an illustrative drawing for explaining the embodiment of the fifth principle. The supervising processing device 201 and progress-reporting processing devices 221 through 223 are comprised of personal computers, and are connected through a LAN (local area network) or the like. Instead of using the LAN or the like for connecting the personal computers, disk memory media such as floppy disks can be used for exchanging data between the supervising processing device 201 and the progress-reporting processing devices 221 to 223.

In the embodiment shown in FIG. 62, the progress management is carried out as follows. (In the following, descriptions numbered (1) through (5) correspond to the same numbers appearing in FIG. 62, respectively.)

(1) Based on plan data 210, the supervising processing device 201 generates individual-progress files 231 to 233, which are used for reporting the progress information. (2) The individual-progress files 231 to 233 are handed over to project members 1 to 3, respectively. The project members 1 to 3 use their own personal computers (the progress-reporting processing devices 221 to 223) at any time, and enter the progress information into the individual-progress files 231 to 233, respectively. (3) The progress-reporting processing devices 221 to 223 return the individual-progress files 231 through 233 to the supervising processing device 201. The supervising processing device 201 selects one of the project members 1 to 3 at a time of convenience, and merges his/her progress information into the updated plan data. (When the other project members do not need to report the progress, there is no update of the plan data for these project members.)

(4) When the supervising processing device 201 modifies the plan data, the differences between the original plan data and the updated plan data are stored in differential information storages, or memories, 211 through 213 provided individually for a corresponding one of the project members 1 to 3. Thus, the supervising processing device 201 can make modifications/additions on the plan data without interfering with the manipulation of the individual-progress files 231 to 233. (5) The supervising processing device 201 updates the plan data 210 by using the individual-progress files 231 to 233 and the differential information storages 211 to 213. Also, the supervising processing device 201 incorporates the update information into the individual-progress files 231 to 233.

Accordingly, when the plan data 210 is updated, it incorporates modifications made by the supervising processing device 201 as well as the progress reports made by the project members 1 to 3. Thus, an integrity of the files is maintained.

As described above, the individual-progress files 231 to 233 are owned by the project members. Thus, using their own personal computers, the project members 1 to 3 can incorporate their respective progress information into the individual-progress files 231 to 233, respectively, at any time they wish to do so.

Also, a supervisor can modify the plan data 210 even after handing the individual-progress files 231 through 233 over to the project members. That is, modifications on the individual-progress files 231 to 233 can be made while the progress of the project is being supervised. Furthermore, even when a replacement of a project member become necessary, an individual-progress file can be freely replaced without affecting the other individual-progress files. Thus, the assignment of the project members 1 to 3 can be changed without arousing, or creating confusions during the ongoing project.

Figure 63:
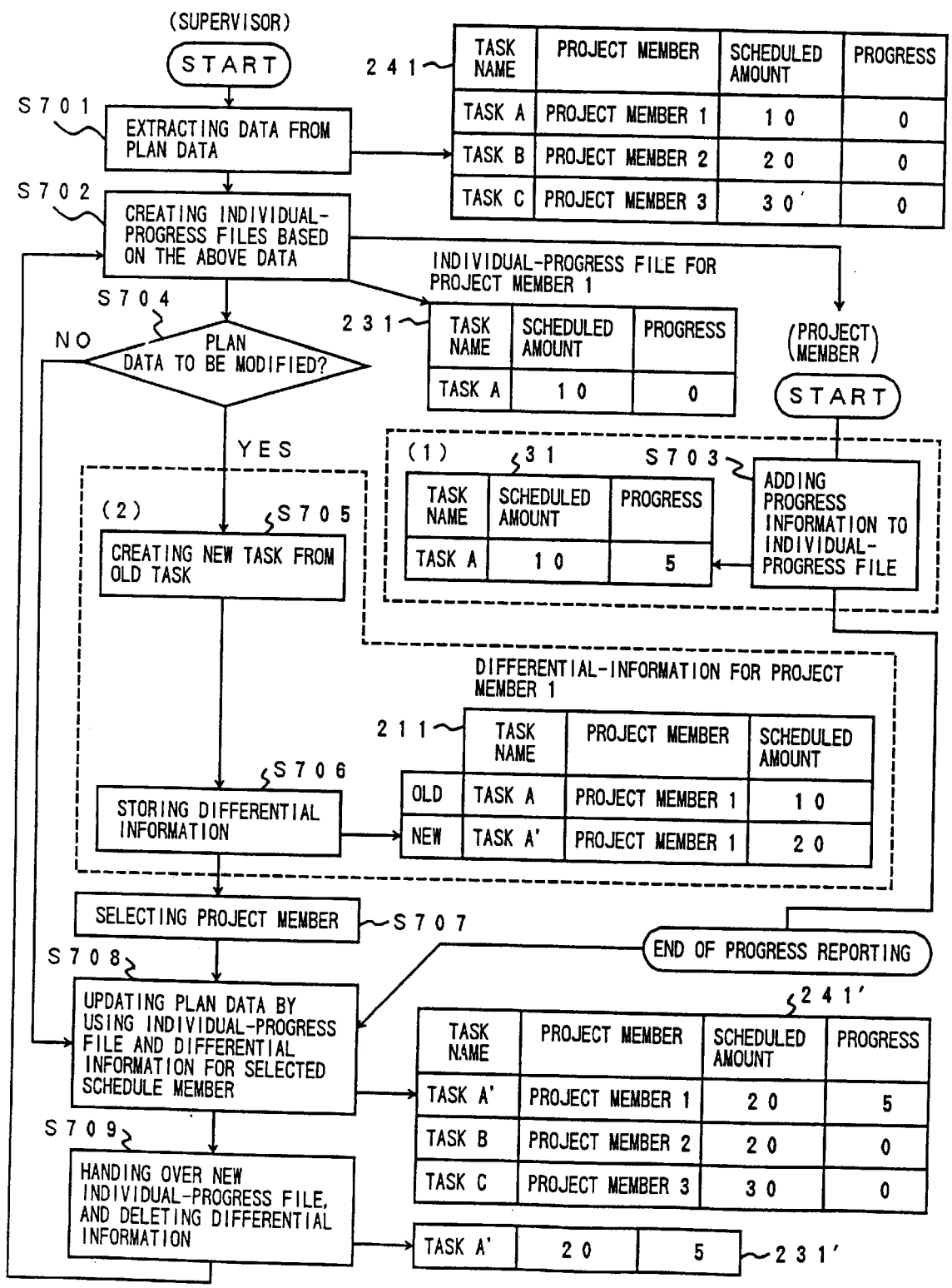
FIG. 63 is a flowchart of a process of modifying plan data of FIG. 62, in which a scheduled amount for a given task is modified.

FIG. 63 shows a flowchart of a process of modifying the plan data. In the figure, the supervising processing device 201 is simply referred to as a supervisor, and the progress-reporting processing devices 221, 222, . . . are simply referred to as project members 1, 2, . . . .

In FIG. 63, at a step 701, task names, assigned project members, and scheduled amounts are extracted from plan data 241, and are handed over to the project members. Here, the plan data 241 is generated based on information which is entered when the supervisor lays out the schedule.

At a step S702, the individual-progress files 231 to 233 are created, based on the data extracted from the plan data 241. An example of FIG. 63 shows only the individual-progress file 231, which contains "task A, scheduled amount 10, progress 0", and is provided for the project member 1.

At a step S703, the project members add the progress information into the individual-progress files 231 through 233 by using their own, respective, terminal (e.g., personal computers). In the example of FIG. 63, the amount of progress "5" is entered into the individual-progress file 231. After completing the entry of the progress information, the individual-progress files 231 to 233 are given back to the supervisor. Here, the progress information is entered when it is convenient for the project members.

On the side of the supervisor, at a step S704, a check is made whether the plan data is to be modified. If it is to be modified, the procedure follows, at steps S705 through S707. If it is not to be modified, the procedure goes to a step S708. Depending on the progress of the project, there is a case in which the modification has to be made even when it is right after the individual-progress files 231 to 233 were distributed. In such a case, the modification is made on the plan data 241 without collecting the individual-progress files 231 to 233.

At a step S705, a new task is created from an old task. At a step S706, differential information 211 is stored. In the example, the new task A' is made by changing the scheduled amount of the task A from 10 to 20. Then, the differential information 211 as shown in FIG. 63 is stored for the project member 1. At a step S707, one or more project members is or are selected for merging the individual-progress files and the differential information with the plan data 241. Here, the project member 1 is selected since the schedule for the project member 1 is modified at the step S705.

At the step S708, the individual-progress file 231 and the differential information 211 for the selected project member are used for updating the plan data 241. In this example, the plan data 241 is updated into a plan data 241' as shown in FIG. 63.

At a step S709, an individual-progress file 231', which is created based on the plan data 241', is handed over to the project member 1. Also, at the step S709, the differential information 211 is deleted. In the individual-progress file 231', the task name is stated as "task A'", and the scheduled amount is stated as "20".

After going through these steps, the procedure goes back to the step S702. Thus, the procedure repeats the steps S704 to S709 on the supervisor side and the step S703 on the project member side.

The process described above provides a measure which prevents a mismatch between the supervisor side and the project member side when the supervisor makes a modification without collecting the individual-progress file. That is, in order to maintain the integrity between both sides, the differential information is created and stored for each project member. This differential information includes task names, a name of an assigned project member, and scheduled amounts, and is linked with the individual-progress file by using the name of the assigned project member as a keyword. Here, although the differential information is provided for each project member, the name of the assigned project member is included as one item in the differential information. By doing so, information regarding an original project member will not be lost, even when the project member is replaced by another project member.

Figure 64:
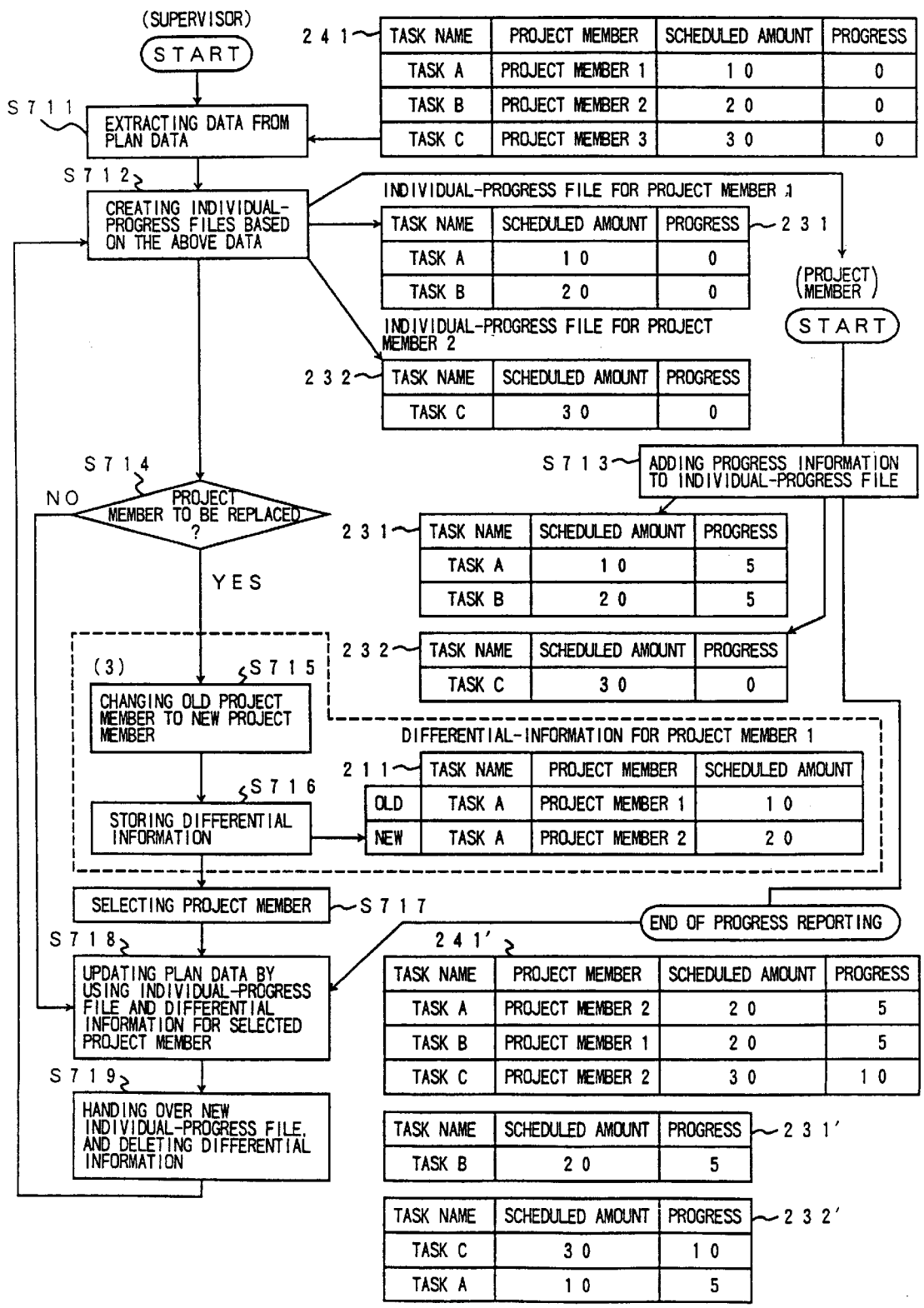
FIG. 64 is a flowchart of a process of modifying the plan data, in which a project member is replaced with another project member.

FIG. 64 shows a flowchart of a process of replacing a project member. In the figure, the supervising processing device 201 is simply referred to as a supervisor, and the progress-reporting processing devices 202, 202', . . . are simply referred to as project members.

In FIG. 64, at a step S711, task names, assigned project members, and scheduled amounts are extracted from plan data 241. At a step S712, the individual-progress files 231 to 233 are created based on the data extracted from the plan data 241, and are handed over to the project members. In an example of FIG. 64, the individual-progress file 231 is provided for the project member 1, and the individual-progress file 232 is provided for the project member 2.

At a step S713, the project members add the progress information into the individual-progress files 231 through 233 by using their own terminal (personal computer). In the example of FIG. 64, the amount of progress "5" is entered into the individual-progress file 231 for a task A and a task B. Also, the amount of progress "10" is entered into the individual-progress file 232 for a task C. After completing the entries of the progress information, the individual-progress files 231 to 233 are given back to the supervisor. Here, the progress information is entered when it is convenient for the project members.

In some cases, the supervisor has to replace a project member depending on situations of the project even after handing out the individual-progress files 231 through 233. In such cases, the supervisor carries through the replacement without collecting the individual-progress files 231 to 233. However, if changes are made only on the supervisor side, it is possible to create a mismatch between the supervisor side and the project member side. In order to prevent this, a counter measure is taken as follows, in which the differential information is created for each project member.

At a step S714, a check is made whether a project member is to be replaced. If one is to be replaced, the procedure follows steps S715 through S717. It one is not to be replaced, the procedure goes to a step S718.

At a step S715, an old project member is changed to a new project member while looking at the plan data 241. At a step S716, differential information regarding the replacement of the project member is stored. In the example, the differential information 211 for the project member 1 as shown in FIG. 64 shows that the project member of the task A is changed from the project member 1 to the project member 2. At a step S717, one or more project members are selected for merging the individual-progress files and the differential information with the plan data 241. Here, the project members 1 and 2 are selected since the member 1 is replaced by the member 2 for the task A.

At the step S718, the individual-progress files 231 and 232 and the differential information 211 for the selected project members are used for updating the plan data 241. In this example, the plan data 241 is updated into a plan data 241' as shown in FIG. 64.

At a step S719, individual-progress files 231' and 232', which are created based on the plan data 241', are handed over to the project members 1 and 2, respectively. Also, at the step S719, the differential information 211 is deleted. In the individual-progress file 231', the task A is deleted, leaving only one task, the task B. On the other hand, the individual-progress file 232' now contains two tasks, i.e., the task C and the task A.

After going through these steps, the procedure goes back to the step S712 to repeat the same steps.

In this manner, after the project members complete the entries of the progress information, the supervisor updates the plan data by using the individual-progress files and the differential information. Then, the individual-progress files are updated to be distributed to the project members.

Figure 65:
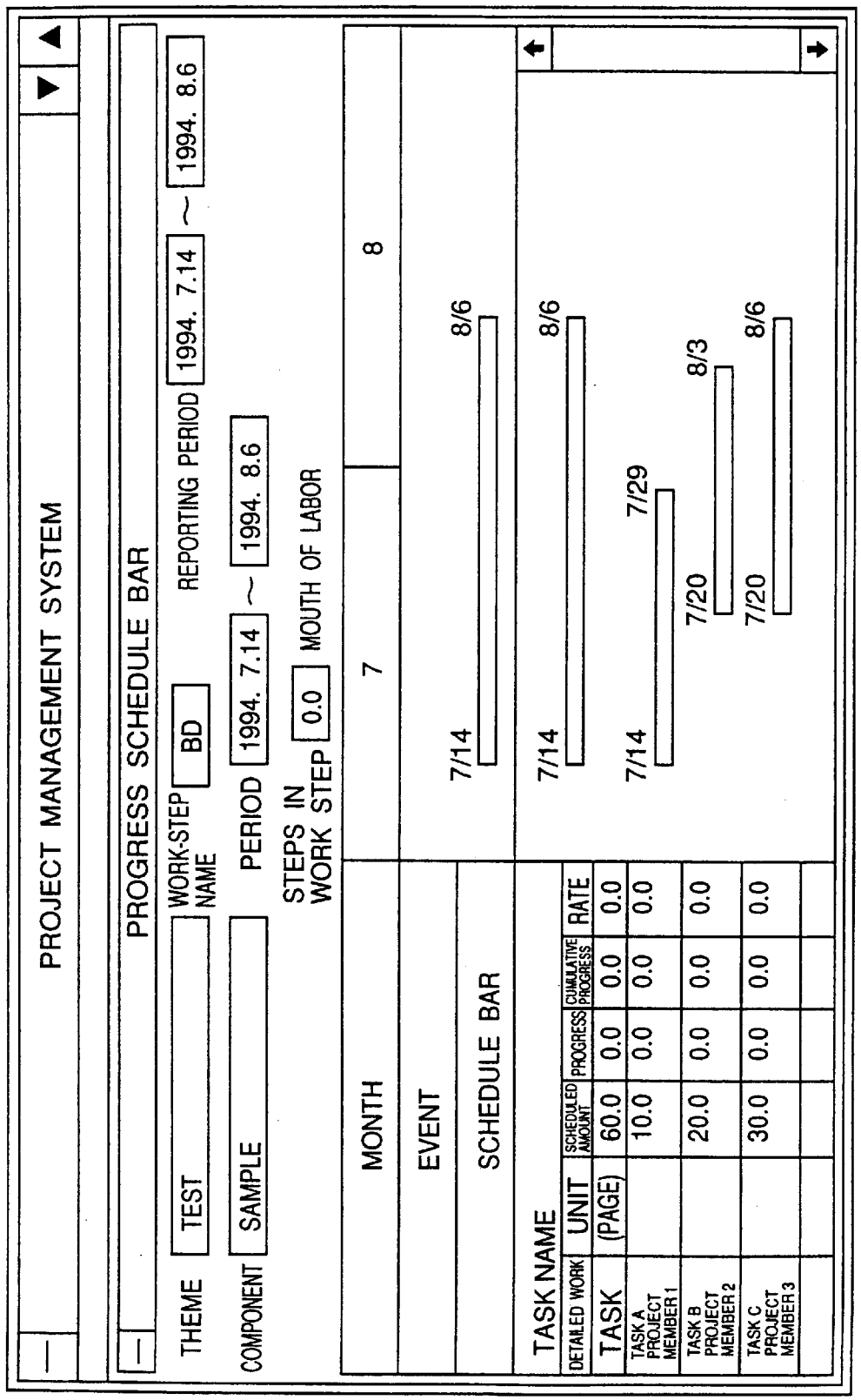
FIG. 65 is an illustrative drawing showing a first example of a display of a supervising processing device of FIG. 62.
Figure 66:
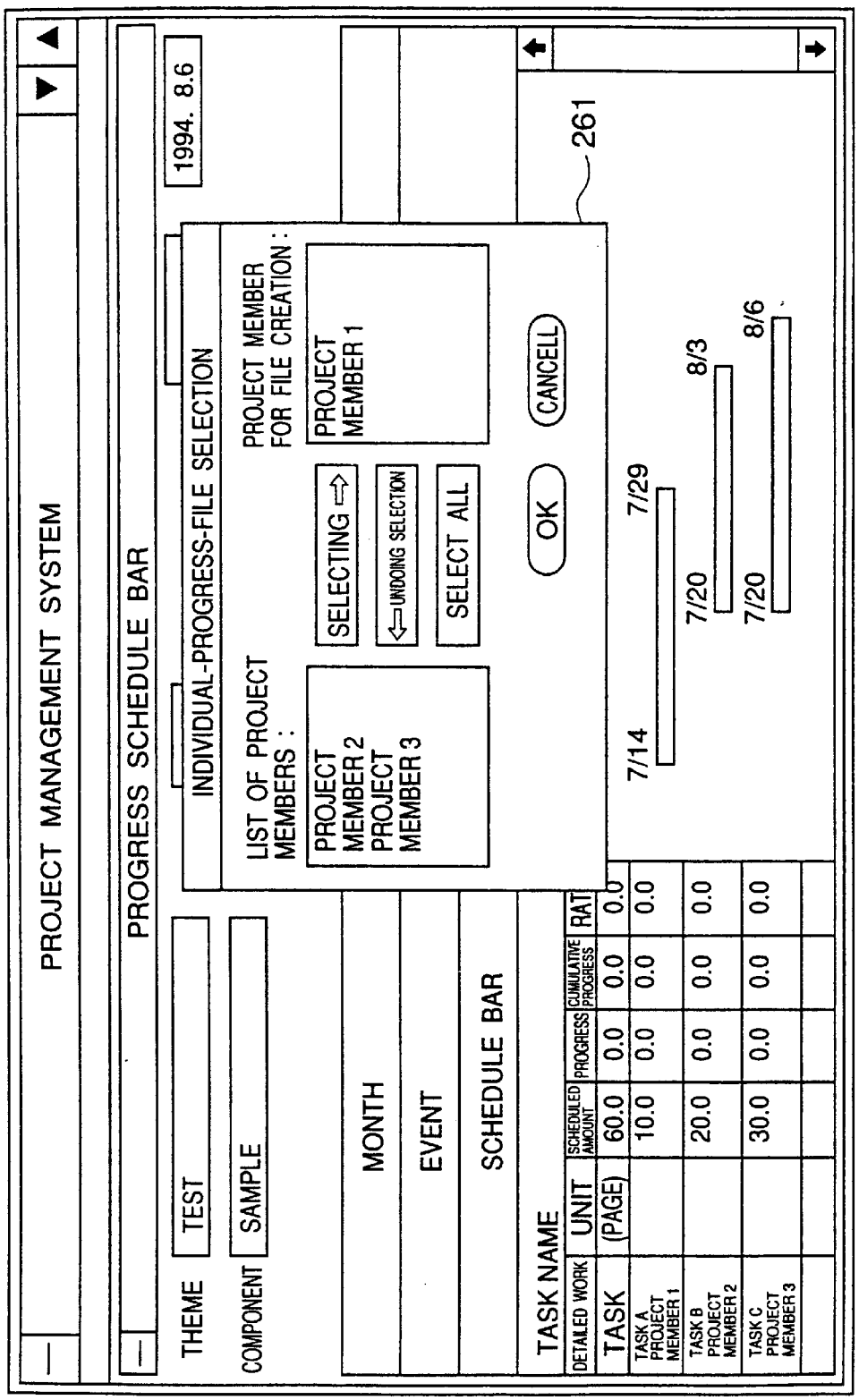
FIG. 66 is an illustrative drawing showing a second example of the display of the supervising processing device.

FIG. 65 and FIG. 66 show examples of a display of the supervising processing device 201. FIG. 65 shows an example of the display which is shown after extracting the task names, names of the project members, and the scheduled amount from the plan data. That is, this display is shown after the step S701 of FIG. 63. A scheduled amount and a schedule bar are shown for each of the tasks A, B, and C.

FIG. 66 shows an example of the display which is shown at the time when the supervising processing device 201 creates the individual-progress files at the step S702 of FIG. 63. An individual-progress-file selection display 261 is provided to select a project member for whom the individual-progress file is created. In the example of FIG. 66, the project member 1 is selected. However, as can be seen, a function of selecting all the project members is provided in the individual-progress-file selection display 261.

FIG. 67 shows an example of a display of the progress-reporting processing device 202, 202', . . . which is shown when the project member is about to enter the progress information. That is, the display of FIG. 67 will be shown at the step S703 of FIG. 63. A report-entry-and-updating display 271 is used for entering the date of reporting, a period for reporting, and a progress. In this example, a progress "5" is entered, while a scheduled amount "10" is shown in the report-entry-and-updating display 271.

Figure 68:
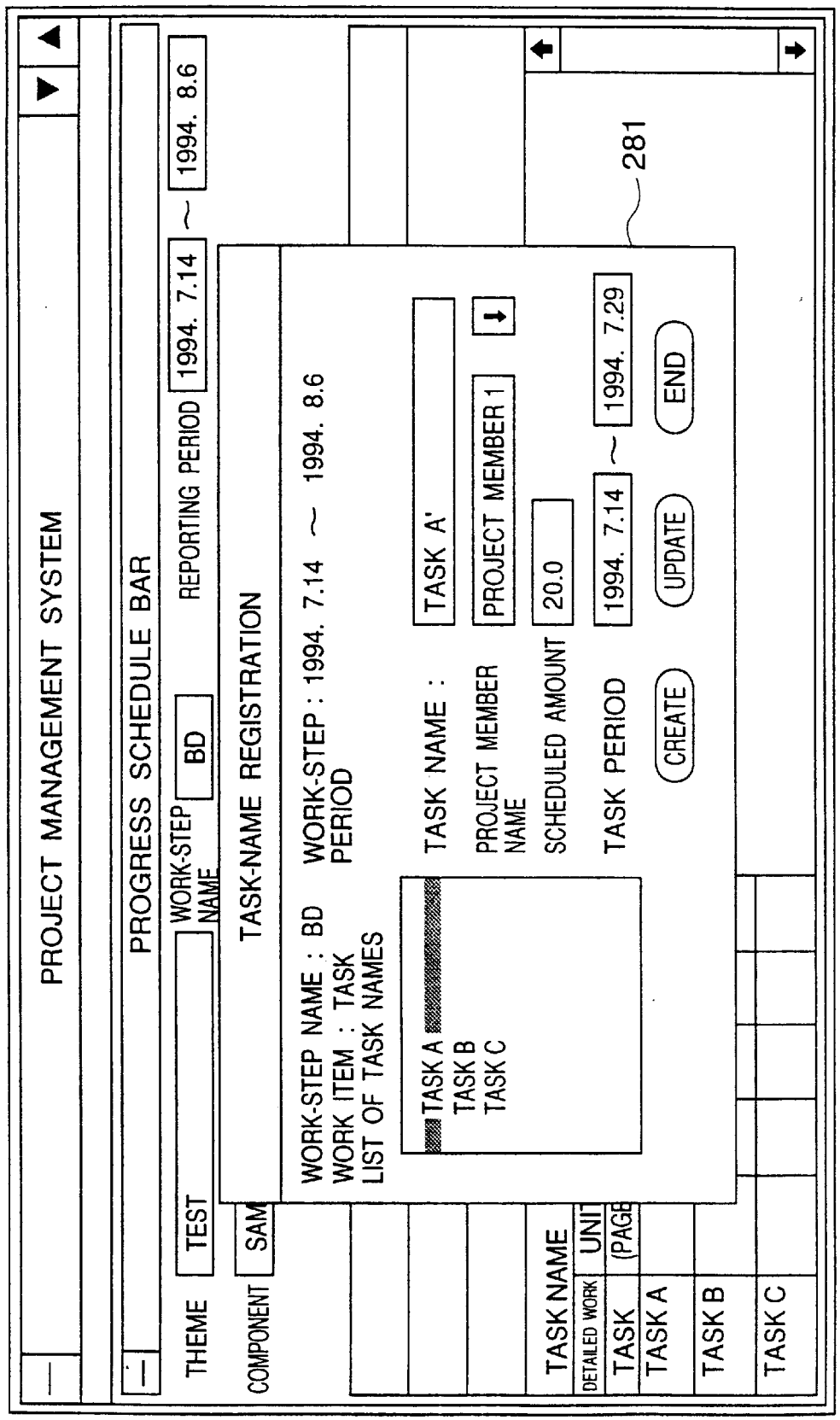
FIG. 68 is an illustrative drawing showing a third example of the display of the supervising processing device.

FIG. 68 shows another example of the display of the supervising processing unit 201, which display is shown at the time of modification. That is, the display of FIG. 68 will be shown at the step S705 of FIG. 63. In a task-name-registration display 281, a task to be modified is selected, and, then, a pertinent item is modified. In this example, a task A is selected and changed into a task A', and, also, a scheduled amount is changed into "20".

Figure 69:
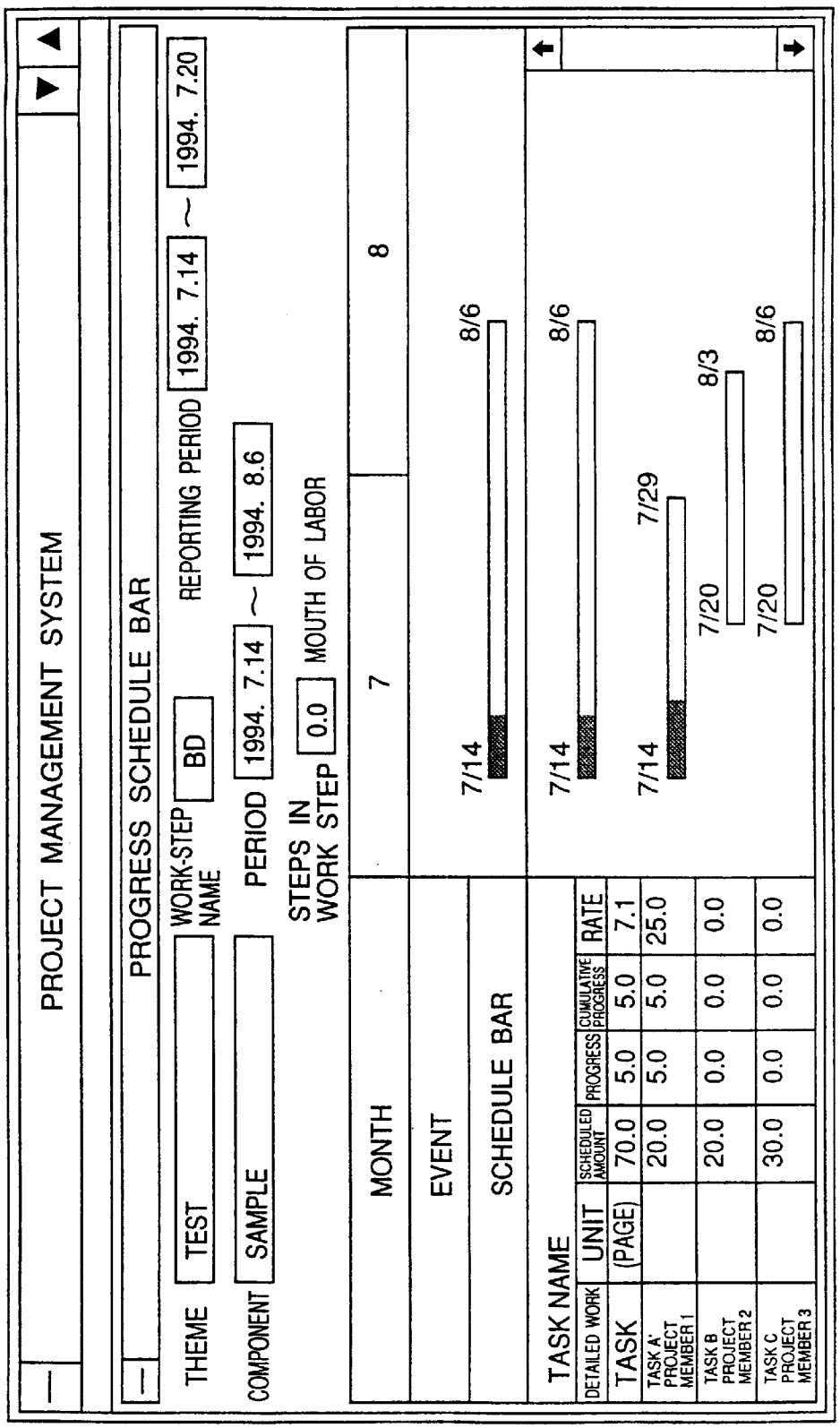
FIG. 69 is an illustrative drawing showing a fourth example of the display of the supervising processing device.

FIG. 69 shows yet another example of the display of supervising processing unit 201, which display is shown after updating the plan data by incorporating the individual-progress files and the differential information. That is, the display of FIG. 69 will be shown after the step S708 of FIG. 63. Progresses of tasks, which are reported in the individual-progress files, are shown in schedule bars.

As described above, according to the fifth principle of the present invention, the progress-reporting processing devices can be used at any time, independently of the supervising processing unit, in order to enter the progress information. Also, modifications can be made at the supervising processing device at any time without collecting the individual-progress files. Yet, the integrity of the information can be maintained by keeping the differential information for each project member in the supervising processing device.

Further, the present invention is not limited to these embodiments, but various variations and modifications may be made without departing from the scope of the present invention.

What is claimed is:

1. A system for managing a project made up of one or more works, said system comprising:
   a supervising processing device; and
   one or more progress-reporting processing devices used by respective project members to receive respective individual-progress files from said supervising processing device and to return the individual-progress files to said supervising processing device after adding information, on a progress of said one or more works, to the individual-progress files,
   wherein said supervising processing device includes:
      a memory unit storing plan data regarding a plan on said project,
      an individual-data-generation processing unit generating an individual-progress file based on said plan data and distributing said individual-progress file to a corresponding one of said one or more progress-reporting processing devices,
      a plan-modification/addition processing unit creating differential information regarding modifications to be made to said plan data, and
      a data-connection processing unit updating said plan data based on said differential information and said individual-progress file returned from said corresponding one of said one or more progress-reporting processing devices after the information, on a progress of said one or more works, is added to the individual-progress file.

2. The system as claimed in claim 1, wherein said plan-modification/addition processing unit creates said differential information for each of said project members.

3. The system as claimed in claim 1, wherein said individual-data-generation processing unit generates an updated one of said individual-progress file based on an updated one of said plan data and distributes said updated one of said individual-progress file to a corresponding one of said one or more progress-reporting processing devices.

4. The system as claimed in claim 1, wherein said differential information is about modifications on said one or more works or replacement of said project members.

5. The system as claimed in claim 1, wherein said supervising processing device is electrically connected to said one or more progress-reporting processing devices so as to exchange said individual-progress file.

6. A device for managing a project made up of one or more tasks, said device comprising:
   a memory unit storing plan data regarding a plan relating to said project;
   an individual-data-generation processing unit generating at least one individual-progress file based on said plan data and distributing said at least one individual-progress file to a corresponding one of plural project members, wherein information on a progress of said one or more tasks assigned to said corresponding one of said plural project members is added by said corresponding one of said plural project members to said at least one individual-progress file, which is subsequently returned from said corresponding one of said plural project members to said device;
   a plan-modification/addition processing unit creating differential information regarding modifications to be made on said plan data; and
   a data-connection processing unit updating said plan data based on said differential information and said at least one individual-progress file returned from said corresponding one of said project members after the information on a progress of said one or more works is added to the individual-progress file.

7. The device as claimed in claim 6, wherein said plan-modification/addition processing unit creates said differential information for each of said project members.

8. The device as claimed in claim 6, wherein said individual-data-generation processing unit generates an updated one of said at least one individual-progress file based on an updated one of said plan data and distributes said updated one of said at least one individual-progress file to said corresponding one of said project members.

9. The device as claimed in claim 6, wherein said differential information is about modifications on said one or more works or replacement of said project members.

10. The device as claimed in claim 6, further comprising means for exchanging said at least one individual-progress file with a computer used by said corresponding one of said project members through an electrical communication line.

11. A method for managing a project made up of one or more works, said method comprising the steps of:
   a) storing, in a memory, plan data regarding a plan on said project in a supervisor machine;
   b) generating, in said supervisor machine, an individual-progress file based on said plan data;
   c) distributing said individual-progress file from said supervisor machine to a corresponding plural project member machine;

d) adding, to said individual-progress file in said corresponding plural project member machines, a progress said work assigned to a corresponding project member;

e) creating differential information, regarding modifications to be made to said plan data, in said supervisor machine; and f) updating, in said supervisor machine, said plan data based on said differential information returned from said corresponding one of said plural project member machines after the progress, of said one or more works, is added to said individual-progress file.

12. The method as claimed in claim 11, wherein said step e) creates said differential information for each of said project members.

13. The method as claimed in claim 11, further comprising the steps of:

g) generating in said supervisor machine, an updated individual-progress file based on updated said plan data; and h) distributing said updated individual-progress file to a corresponding said project member machine.

14. The method as claimed in claim 11, wherein said differential information relates to modifications on said one or more works or replacement of said project members.

15. The method as claimed in claim 13, wherein each of said step c) and said step h) distributes said individual-progress file and said updated individual-progress file, respectively, through electrical communication lines.

* * * * *